(12) United States Patent
Shake et al.

(10) Patent No.: US 7,079,765 B2
(45) Date of Patent: Jul. 18, 2006

(54) OPTICAL WAVELENGTH DIVISION MULTIPLEX SIGNAL MONITORING APPARATUS

(75) Inventors: Ippei Shake, Yokohama (JP); Hidehiko Takara, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 686 days.

(21) Appl. No.: 10/091,575

(22) Filed: Mar. 7, 2002

(65) Prior Publication Data

US 2002/0126352 A1   Sep. 12, 2002

(30) Foreign Application Priority Data

Mar. 7, 2001 (JP) ............................ 2001-064042
Nov. 7, 2001 (JP) ............................ 2001-342257

(51) Int. Cl.
*H04B 10/08* (2006.01)
*H04B 17/00* (2006.01)

(52) U.S. Cl. .......................................... 398/25; 398/38
(58) Field of Classification Search .................. 398/24, 398/26, 27, 34, 38, 25, 9
See application file for complete search history.

(56) References Cited

U.S. PATENT DOCUMENTS

| | | | | |
|---|---|---|---|---|
| 5,790,285 A | * | 8/1998 | Mock .......................... | 398/21 |
| 5,986,782 A | * | 11/1999 | Alexander et al. ........... | 398/26 |
| 5,995,255 A | | 11/1999 | Giles | |
| 6,344,910 B1 | * | 2/2002 | Cao ............................. | 398/34 |
| 6,347,169 B1 | * | 2/2002 | Kang et al. ................... | 385/24 |
| 6,834,052 B1 | * | 12/2004 | Karasawa .................. | 370/230 |
| 2001/0028256 A1 | * | 10/2001 | Hayashi ...................... | 324/765 |
| 2003/0030859 A1 | * | 2/2003 | Youn et al. ................ | 359/110 |

FOREIGN PATENT DOCUMENTS

| | | |
|---|---|---|
| EP | 0 920 150 A2 | 6/1999 |
| JP | 11-223575 | 8/1999 |
| JP | 2001-217775 | 8/2001 |
| WO | WO 00/13350 | 3/2000 |
| WO | WO 00/41351 | 7/2000 |
| WO | WO 00/48337 | 8/2000 |

OTHER PUBLICATIONS

International Telecommunication Union, ITU-T Recommendation G.707/Y.1322, Oct. 2000.
D. Marcuse, "Derivation of Analytical Expressions for the Bit-Error Probability in Lightwave Systems with Optical Amplifiers," IEEE Journal of Lightwave Technology, vol. 8, No. 12, pp. 1816-1823, Dec. 1990.

(Continued)

*Primary Examiner*—Agustin Bello
*Assistant Examiner*—Quan-Zhen Wang
(74) *Attorney, Agent, or Firm*—Finnegan, Henderson, Farabow, Garrett & Dunner, LLP

(57) ABSTRACT

An optical signal quality degradation monitoring apparatus for monitoring an optical wavelength division multiplex signal is implemented in a small size. To monitor the optical signal quality degradation in the optical wavelength division multiplex signal by a configuration as simple as possible, the following configurations are used: A configuration using an optical wavelength division demultiplexer and a sampling clock generator to make one an electric signal processor; A configuration using an optical sampling pulse train generator, an optical multiplexer, a nonlinear optical medium, and an optical wavelength division demultiplexer to make one an electric signal processor; or a configuration using a selection wavelength control section, an optical wavelength selecting section, and a sampling clock generator to make one electric signal.

37 Claims, 60 Drawing Sheets

OTHER PUBLICATIONS

Takara Hidehiko et al., "Ultra High-Speed Optical Waveform Measurement Method Using Optical Sampling with Sum-Frequency Generation", The Journal of the Institute of Electronics, Information and Communication Engineers of Japan, B-I vol. J75-B-I, No. 5, pp. 372-380, May 1992.

H. Takara et al., "100 Gbit/s optical signal eye-diagram measurement with optical sampling using organic nonlinear optical crystals," Electronics Letters, vol. 32, No. 24, Nov. 21, 1996.

International Search Report from the European Patent Office dated Jan. 25, 2006, of corresponding European Patent Application No. 02251601.7.

* cited by examiner

FIG.26
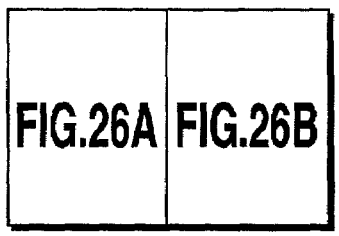
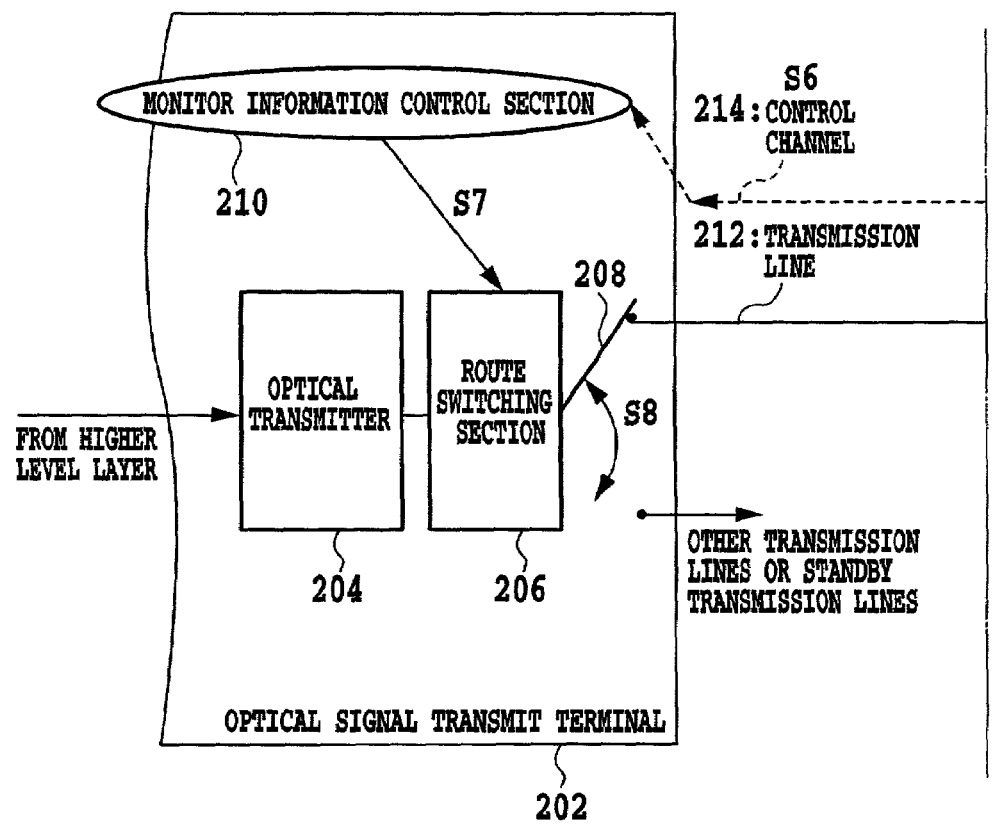
FIG.26A

$$Q = |m_1 - m_0| / (s_1 + s_0)$$

OPTICAL WAVELENGTH DIVISION MULTIPLEX SIGNAL MONITORING APPARATUS

This application is based on Japanese Patent Application Nos. 2001-064042 filed Mar. 7, 2001, and 2001-342257 filed Nov. 7, 2001, the contents of which are incorporated hereinto by reference.

BACKGROUND OF THE INVENTION

1. Field of the Invention

The present invention relates to an optical wavelength division multiplexed signal monitoring apparatus.

2. Description of the Related Art

Wavelength division multiplexing (WDM) is a technique that multiplexes a plurality of optical signal channels (called WDM channels from now on) with different carrier optical wavelengths into a single optical fiber and transmits them through the optical fiber. The technique is useful to deal with an increasing transmission capacity. The WDM technique includes the following as typical signal monitoring apparatuses.

Conventional technique 1: It identifies a faulty section and obtains a switching start signal for each WDM channel by carrying out parity check called bit interleaved parity between repeaters or multiplexing terminals by using overhead specified in the synchronous optical network (SONET)/synchronous digital hierarchy (SDH) transmission scheme (reference material [1]: ITU-T Recommendation G.707).

Conventional technique 2: It observes an optical spectrum, and measures signal quality degradation for each WDM channel by monitoring an optical signal-to-noise ratio.

FIG. 1 shows a configuration of a wavelength division multiplex signal monitoring apparatus of the conventional technique 1. The conventional signal monitoring apparatus comprises an optical wavelength division demultiplexer 61 for carrying out optical wavelength division demultiplexing of an optical wavelength division multiplexed signal consisting of N optical signals with a bit rate $f_0$ (bits/s) which are wavelength multiplexed, (where N is an integer greater than one); and N electric signal processors 62 for processing N-channel optical wavelength division demultiplexed signals which are demultiplexed by the optical wavelength division demultiplexer 61. Each electric signal processor 62 includes a photoelectric converter (receiving circuit) 63, a clock extracting section (clock extracting circuit) 64 and an error detecting section 65 consisting of a parity check circuit or a comparing circuit. With an increase in the signal bit rate or variety of the signal formats for each WDM channel, the conventional technique 1 requires an increasing number of receiving systems (electric signal processors 62) suitable for the bit rate, signal format or modulation method (NRZ (Non Return to Zero) or RZ (Return to Zero)) of each signal. In addition, when the number of the WDM channels increases by a factor of N, N receiving systems are required for each of them, thereby increasing the scale of the apparatus tremendously.

FIG. 2 shows a configuration of a wavelength division multiplex signal monitoring apparatus of the conventional technique 2. The conventional signal monitoring apparatus comprises an optical spectrum analyzer 62-1 for observing the optical spectrum of an optical wavelength division demultiplexed singal, and for measuring the signal quality degradation in each WDM channel by monitoring the optical signal-to-noise ratio. Although the conventional technique 2 can obtain the optical signal-to-noise ratio, it has a problem in that it cannot detect the waveform degradation due to the wavelength dispersion in an optical fiber, or the transmission degradation due to the waveform degradation by the polarization dispersion, and that it cannot reflect the bit error rate directly.

FIG. 3 shows a configuration of a conventional example 3 of a wavelength division multiplex signal monitoring apparatus. The conventional signal monitoring apparatus comprises a photoelectric converter 63 for converting a single-wavelength optical wavelength division demultiplexed singal into an electric intensity modulated signal; a sampling clock generator 66 for generating a sampling clock signal with a repetition frequency of $f_1$ (Hz)=$(n/m)f_0+a$, where n and m are a natural number and a is an offset frequency; and an electric signal processor 67. The electric signal processor 67 samples the electric intensity modulated signal output from the photoelectric converter 63 by the sampling clock signal the sampling clock generator 66 generates, obtains optical signal intensity distribution from the sampled signal, and evaluates an optical signal quality parameter on the basis of the optical signal intensity distribution.

FIG. 4 shows a configuration of an example 4 of the conventional wavelength division multiplex signal monitoring apparatus. The conventional signal monitoring apparatus comprises an optical sampling pulse train generator 68; an optical multiplexer 69; a nonlinear optical medium 70; an optical splitter 71; a photoelectric converter 72; and an electric signal processor 73. The optical sampling pulse train generator 68 generates an optical sampling pulse train, the repetition frequency of which is $f_1=(n/m)f_0+a$, where n and m are a natural number and a is an of offset frequency. The pulse width of the pulses of the optical sampling pulse train is much narrower than the time slot of an optical signal with a bit rate $f_0$ (bits/s). The optical multiplexer 69 combines the optical wavelength division demultiplexed singal of a certain wavelength and the optical sampling pulse train generated by the optical sampling pulse train generator 68. The nonlinear optical medium 70 induces nonlinear interaction between the optical wavelength division demultiplexed singal and the optical sampling pulse train, which are combined by the optical multiplexer 69. The optical splitter 71 splits a cross-correlation optical signal, which is brought about by the nonlinear interaction in the nonlinear optical medium 70, from the optical wavelength division demultiplexed singal or from the optical sampling pulse train. The photoelectric converter 72, receiving the cross-correlation optical signal the optical splitter 71 outputs, converts it into the electric intensity modulated signal. The electric signal processor 73 calculates the optical signal intensity distribution from the electric intensity modulated signal supplied from the photoelectric converter 72, and evaluates the optical signal quality parameter on the basis of the optical signal intensity distribution.

The conventional examples as shown in FIGS. 3 and 4 are a method that evaluates the optical signal quality parameter from the amplitude histogram (reference material [2]: EPC publication No. EP0920150A2, U.S. patent application Ser. No. 09/204,001 which is not yet laid-open). Although they can respond to an increase in the signal bit rate and an increase in the number of signal formats flexibly, and monitor the optical signal degradation such as waveform degradation due to the wavelength dispersion in the optical fiber, they are not applicable to a multi-wavelength optical signal.

FIG.5 shows a configuration of an example 5 of the conventional wavelength division multiplex signal monitoring apparatus. It consists of the configurations of FIG.3, which are connected in parallel by the number of the WDM channels using an optical wavelength division demultiplexer 74. FIG.6 shows a configuration of an example 6 of the conventional wavelength division multiplex signal monitoring apparatus. As the example 5, it consists of the configurations of FIG.4, which are connected in parallel by the number of the WDM channels using an optical wavelength division demultiplexer 78.

The conventional examples 5 and 6 consist of the configurations of the conventional examples 3 and 4 in parallel by the number of the WDM channels. Accordingly, they have a problem in that when the number of the WDM channels is N, the scale of the apparatus increases by a factor of N.

On the other hand, the multimedia service market has boomed in recent years, and communication capacity of individual services must be increased. In addition, networks are required that satisfy a variety of signal bit rates and signal formats for the video, sound and data. Thus, an optical wavelength division multiplexed signal monitoring apparatus is required that can respond flexibly to an increase in the number of the WDM channels, an increase in the signal bit rate per WDM channel, and diversification of the signal format. In connection with this, the optical signal degradation factors to be monitored are also diversified. In particular, it is necessary to monitor the waveform degradation involved in the wavelength dispersion in the optical fiber, and the waveform degradation due to the polarization dispersion.

Therefore, an optical wavelength division multiplexed signal monitoring apparatus is eagerly required that can monitor the optical signal degradation factors such as waveform degradation involved in the wavelength dispersion in the optical fiber, and can respond flexibly to an increase in the number of the WDM channels, an increase in the signal bit rate of each WDM channel, and the diversification of the signal formats.

SUMMARY OF THE INVENTION

The present invention is implemented to solve the foregoing problems. Therefore, an object of the present invention is to provide an optical wavelength division multiplexed signal monitoring apparatus capable of shrinking its size by reducing into one system an electric signal processing unit for evaluating an optical signal quality parameter on the basis of the optical signal intensity distribution, and by processing the plurality of wavelength channels at a time.

Another object of the present invention is to provide an optical wavelength division multiplexed signal monitoring apparatus capable of monitoring optical signal quality degradation such as SNR degradation and waveform distortion by a single circuit regardless of the bit rate, signal format and modulation method of the target optical wavelength division multiplexed signal to be measured.

To accomplish the foregoing objects, the optical wavelength division multiplexed signal monitoring apparatus in accordance with the present invention is characterized by the apparatus comprising optical wavelength division demultiplexing means for carrying out optical wavelength division demultiplexing of an optical wavelength division multiplexed signal including N optical signals with a bit rate $f_0$ (bits/s), which are wavelength multiplexed, where N is an integer greater than one, one or N opto-electric conversion means for receiving optical wavelength division demultiplexed signals demultiplexed by the optical wavelength division demultiplexing means, and for converting the optical wavelength division demultiplexed signals into electric intensity modulated signals, and electric signal processing means for carrying out optical signal quality evaluation based on the electric intensity modulated signals output from the opto-electric conversion means, the electric signal processing means is a single system.

Preferably, the electric signal processing means has N inputs, stores N channel electric signals supplied from the N opto-electric conversion means by N buffers for a predetermined time period, and processes the electric signals by sequentially reading them from the buffers.

Preferably, the electric signal processing means has N inputs, and processes N channel analog electric signals supplied from the N opto-electric conversion means by sequentially reading the analog electric signals by sequentially switching connections with the analog electric signals.

Preferably, the optical wavelength division multiplexed signal monitoring apparatus further comprises sampling clock generating means for generating a sampling clock signal whose repetition frequency is $f_1$ (Hz) ($f_1=(n/m)f_0+a$, where n and m are a natural number, and a is an offset frequency), the electric signal processing means samples N-channel electric intensity modulated signals supplied from the N opto-electric conversion means by the sampling clock signal generated by the sampling clock generating means, obtains optical signal intensity distribution from sampled signals generated thereby, and evaluates an optical signal quality parameter for each of the N channels based on the optical signal intensity distribution.

Preferably, the optical wavelength division multiplexed signal monitoring apparatus further comprises optical sampling pulse train generating means for generating an optical sampling pulse train whose repetition frequency is $f_1$ (Hz) ($f_1=(n/m)f_0+a$, where n and m are a natural number, and a is an offset frequency), and whose pulse width is sufficiently narrower than a time slot of the optical signal with the bit rate $f_0$ (bits/s), optical sampling pulse train splitting means for splitting the optical sampling pulse train generated from the optical sampling pulse train generating means into N sequences, N optical combining means for combining N-channel optical wavelength division demultiplexed signals demultiplexed by the optical wavelength division demultiplexing means with N sequence optical sampling pulse trains spitted by the optical sampling pulse train splitting means, N nonlinear optical media for inducing nonlinear interaction between the optical sampling pulse trains and the optical wavelength division demultiplexed signals combined by the optical combining means, and N optical splitting means for splitting cross-correlation optical signals generated by the nonlinear interaction in the nonlinear optical media from the optical wavelength division multiplexed signal and from the optical sampling pulse trains, the opto-electric conversion means consists of N opto-electric conversion means for receiving the N-channel cross-correlation optical signals splitted by the optical splitting means, and for converting the N-channel cross-correlation optical signals into electric intensity modulated signals, and the electric signal processing means obtains optical signal intensity distribution from the N-channel electric intensity modulated signals outputted by the opto-electric conversion means, and evaluates an optical signal quality parameter for each of the N channels based on the optical signal intensity distribution.

Preferably, the optical wavelength division multiplexed signal monitoring apparatus further comprises sampling clock generating means for generating a sampling clock signal whose repetition frequency $f_1$ (Hz) ($f_1 = (n/m)f_0 + a$, where n and m are a natural number, and a is an offset frequency), and N optical gating means, each of which is disposed for one of N channels, for sampling intensities of optical wavelength division demultiplexed signals with a bit rate of $f_0$ (bits/s), which are demultiplexed by the optical wavelength division demultiplexing means by using the sampling clock signal generated by the sampling clock generating means, the N opto-electric conversion means receive optical signals sampled by the optical gating means disposed for respective channels, and convert the optical signals into electric intensity modulated signals.

Preferably, the optical wavelength division multiplexed signal monitoring apparatus further comprises sampling clock generating means for generating a sampling clock signal whose repetition frequency $f_1$ (Hz) ($f_1 = (n/m)f_0 + a$, where n and m are a natural number, and a is an offset frequency), and single optical gating means for sampling N channels of the optical wavelength division multiplexed signal all at once by the sampling clock signal generated by the sampling clock generating means, before carrying out optical wavelength division demultiplexing, the optical wavelength division demultiplexing means carries out optical wavelength division of the optical gating signal produced by the optical gating means.

Preferably, the optical wavelength division multiplexed signal monitoring apparatus further comprises optical sampling pulse train generating means for generating an optical sampling pulse train whose repetition frequency is $f_1$ (Hz) ($f_1 = (n/m)f_0 + a$, where n and m are a natural number, and a is an offset frequency) and whose pulse width is sufficiently narrower than a time slot of the optical signal with the bit rate $f_0$ (bits/s), optical combining means for multiplexing an optical sampling pulse train generated by the optical sampling pulse train generating means with an optical wavelength division multiplexed signal consisting of N optical signals with a bit rate $f_0$ (bits/s), which are wavelength multiplexed, where N is an integer greater than one, and nonlinear optical medium for inducing nonlinear interaction between the optical sampling pulse train and the optical wavelength division multiplexed signal, which are combined by the optical combining means, the optical wavelength division demultiplexing means carries out wavelength division demultiplexing of a cross-correlation optical signal, which is generated by the nonlinear interaction in the nonlinear optical medium, into N channels, the opto-electric conversion means consists of N opto-electric conversion means for receiving the N-channel cross-correlation optical signals output from the optical wavelength division demultiplexing means, and for converting them into N-channel electric intensity modulated signals, and the electric signal processing means obtains optical signal intensity distribution from the N-channel electric intensity modulated signals the N opto-electric conversion means output, and evaluates an optical signal quality parameter for each of the N-channels from the optical signal intensity distribution.

Preferably, the optical wavelength division multiplexed signal monitoring apparatus further comprises wavelength selection means disposed before the electric signal processing means for making wavelength selection by wavelength division demultiplexing to reduce a number of inputs to the electric signal processing means to one, the electric signal processing means stores an electric signal supplied from the one opto-electric conversion means by a single buffer for a predetermined time period, and processes the electric signal by reading it from the buffer.

Preferably, the optical wavelength division multiplexed signal monitoring apparatus further comprises optical wavelength selection means for selecting and carrying out optical wavelength division demultiplexing of any one of channels of the optical wavelength division multiplexed signal consisting of N optical signals with a bit rate $f_0$ (bits/s), which are wavelength multiplexed, where N is an integer greater than one, and selection wavelength control means for controlling a wavelength to be selected by the optical wavelength selection means, and sampling clock generating means for generating a sampling clock signal with a repetition frequency $f_1$ (Hz) ($f_1 = (n/m)f_0 + a$, where n and m are a natural number, and a is an offset frequency), the opto-electric conversion means consists of single opto-electric conversion means for receiving optical wavelength division demultiplexed singal the optical wavelength selection means selects and demultiplexes, and converts it into an electric intensity modulated signal, and the electric signal processing means samples the one-channel electric intensity modulated signal the opto-electric conversion means outputs by using the sampling clock signal the sampling clock generating means generates, obtains optical signal intensity distribution from a sampled signal obtained, and evaluates an optical signal quality parameter from the optical signal intensity distribution.

Preferably, the optical wavelength division multiplexed signal monitoring apparatus as claimed in claim 4, further comprises optical wavelength selection means for selecting and carrying out optical wavelength division demultiplexing of any one of channels of the optical wavelength division multiplexed signal consisting of N optical signals with a bit rate $f_0$ (bits/s), which are wavelength multiplexed, where N is an integer greater than one, selection wavelength control means for controlling a wavelength to be selected by the optical wavelength selection means, sampling clock generating means for generating a sampling clock signal with a repetition frequency $f_1$ (Hz) ($f_1 = (n/m)f_0 + a$, where n and m are a natural number, and a is an offset frequency), and single optical gating means for sampling intensity of the one-channel optical wavelength division demultiplexed singal the optical wavelength selection means selects and demultiplexes by using the sampling clock signal the sampling clock generating means generates, the opto-electric conversion means consists of single opto-electric conversion means for receiving one-channel optical gate signal the optical gating means outputs, and converts it into an electric intensity modulated signal, and the electric signal processing means obtains optical signal intensity distribution from the one-channel electric intensity modulated signal, and evaluates an optical signal quality parameter from the optical signal intensity distribution.

Preferably, the optical wavelength division multiplexed signal monitoring apparatus further comprises optical wavelength selection means for selecting and carrying out optical wavelength division demultiplexing of any one of channels of the optical wavelength division multiplexed signal consisting of N optical signals with a bit rate $f_0$ (bits/s), which are wavelength multiplexed, where N is an integer greater than one, selection wavelength control means for controlling a wavelength to be selected by the optical wavelength selection means, optical sampling pulse train generating means for generating an optical sampling pulse train whose repetition frequency is $f_1$ (Hz) ($f_1=(n/m)f_0+a$, where n and m are a natural number, and a is an offset frequency) and whose pulse width is sufficiently narrower than a time slot of the optical signal with the bit rate $f_0$ (bits/s), optical combining means for combining the optical sampling pulse train the optical sampling pulse train generating means generates with one-channel optical wavelength division demultiplexed singal the optical wavelength selection means selects and demultiplexes, single nonlinear optical medium for inducing nonlinear interaction between the optical sampling pulse train and the optical wavelength division demultiplexed singal, which are combined by the optical combining means, and single optical splitting means for splitting a cross-correlation optical signal generated by the nonlinear interaction in the nonlinear optical medium from the optical wavelength division demultiplexed singal and from the optical sampling pulse train, the opto-electric conversion means consists of single opto-electric conversion means for receiving the one-channel cross-correlation optical signal the optical splitting means outputs, and converts it into an electric intensity modulated signal, and the electric signal processing means obtains optical signal intensity distribution from the one-channel electric intensity modulated signal the opto-electric conversion means produces, and evaluates the optical signal quality parameter from the optical signal intensity distribution.

Preferably, the optical wavelength division multiplexed signal monitoring apparatus further comprises sampling clock generating means for generating a sampling clock signal with a repetition frequency $f_1$ (Hz) ($f_1=(n/m)f_0+a$, where n and m are a natural number, and a is an offset frequency), single optical gating means for sampling intensity of an optical wavelength division multiplexed signal with a bit rate $f_0$ (bits/s) consisting of N optical signals which are wavelength multiplexed, where N is an integer greater than one, by using the sampling clock signal the sampling clock generating means generates, optical wavelength selection means for selecting and carrying out optical wavelength division demultiplexing of any one of channels of one-channel optical gating signal the optical gating means outputs, and selection wavelength control means for controlling a wavelength to be selected by the optical wavelength selection means, the opto-electric conversion means consists of single opto-electric conversion means for receiving one-channel optical wavelength division demultiplexed singal the optical wavelength selection means selects and demultiplexes, and converts it into an electric intensity modulated signal, and the electric signal processing means receives optical signal intensity distribution from the one-channel electric intensity modulated signal the opto-electric conversion means outputs, and evaluates an optical signal quality parameter from the optical signal intensity distribution.

Preferably, the optical wavelength division multiplexed signal monitoring apparatus further comprises optical sampling pulse train generating means for generating an optical sampling pulse train whose repetition frequency is $f_1$ (Hz) ($f_1=(n/m)f_0+a$, where n and m are a natural number, and a is an offset frequency) and whose pulse width is sufficiently narrower than a time slot of the optical signal with the bit rate $f_0$ (bits/s), optical combining means for combining an optical sampling pulse train the optical sampling pulse train generating means generates with an optical wavelength division multiplexed signal consisting of N optical signals with the bit rate $f_0$ (bits/s), which are wavelength multiplexed, where N is an integer greater than one, single nonlinear optical medium for inducing nonlinear interaction between the optical sampling pulse train and the optical wavelength division multiplexed signal, which are combined by the optical combining means, optical wavelength selection means for selecting and carrying out optical wavelength division demultiplexing any one of channels of N-channel cross-correlation optical signals generated by the nonlinear interaction in the nonlinear optical medium, and selection wavelength control means for controlling a wavelength to be selected by the optical wavelength selection means, the opto-electric conversion means consists of single opto-electric conversion means for receiving one-channel optical wavelength division demultiplexed singal the optical wavelength selection means selects and demultiplexes, and converts it into an electric intensity modulated signal, and the electric signal processing means receives optical signal intensity distribution from the one-channel electric intensity modulated signal the opto-electric conversion means outputs, and evaluates an optical signal quality parameter from the optical signal intensity distribution.

Preferably, the optical wavelength division multiplexed signal monitoring apparatus further comprises polarization control means for controlling a polarization state of all channels of the optical wavelength division multiplexed signal in their entirety, wherein the polarization control means controls the polarization state of all channels such that it maintains a fixed polarization relationship with a polarization state of the optical sampling pulse train said optical sampling pulse train generating means outputs, or with a polarization dependence of said optical gating means.

Preferably, the optical wavelength division multiplexed signal monitoring apparatus further comprises optical signal wavelength dispersion control means for controlling wavelength dispersion of the optical wavelength division multiplexed signal to compensate for wavelength dispersion of all channels of the optical wavelength division multiplexed signal in their entirety.

Preferably, the electric signal processing means is disposed in an optical signal receive terminal, and comprises a signal-to-noise ratio coefficient measuring section for measuring a signal-to-noise ratio coefficient of an optical signal transmitted on an optical signal route between an optical signal transmit terminal of a first optical node and an optical signal receive terminal of a second optical node, an initial state storing section for storing an initial signal-to-noise ratio coefficient the signal-to-noise ratio coefficient measuring section measures in a state without any failure at a system installation, and an optical signal quality evaluating section for comparing the initial signal-to-noise ratio coefficient stored in the initial state storing section with a signal-to-noise ratio coefficient the signal-to-noise ratio coefficient measuring section measures at every predetermined time interval during system operation, the optical wavelength division multiplexed signal monitoring apparatus carries out analog monitoring independent of an optical signal modulation method, format and bit rate.

Preferably, the signal-to-noise ratio coefficient measuring section comprises optical signal intensity distribution measurement means for measuring intensity distribution of the optical signal by sampling intensity of the electric intensity modulated signal at a clock signal frequency $f_1$ (Hz) ($f_1=(N/M)f_0+a$, where N and M are positive numbers, and a is an offset frequency), and signal-to-noise ratio coefficient evaluation means for evaluating the signal-to-noise ratio coefficient using an amplitude histogram obtained from the optical signal intensity distribution within a mean time, and the signal-to-noise ratio coefficient evaluation means comprises histogram evaluation means for obtaining the amplitude histogram from the intensity distribution of the optical signal within the mean time, distribution function evaluation means for estimating an amplitude histogram distribution function g1 corresponding to "level 1" from an amplitude histogram portion that is greater than a predetermined intensity threshold value A, and for estimating an amplitude histogram distribution function g0 corresponding to "level 0" from an amplitude histogram portion that is smaller than another predetermined intensity threshold value B; and optical signal quality evaluation means for obtaining mean value intensities and standard deviations of the "level 1" and "level 0" from the amplitude histogram distribution functions g1 and g0, and for evaluating the signal-to-noise ratio coefficient that is obtained as a ratio of a difference between the mean value intensities of the "level 1" and "level 0" to a sum of the standard deviations at the "level 1" and "level 0".

Preferably, the distribution function evaluation means obtains two relative maximum values from the amplitude histogram obtained from the intensity distribution of the optical signal to be measured, and makes the relative maximum value with greater amplitude intensity the intensity threshold value A, and the relative maximum value with smaller amplitude intensity the intensity threshold value B.

As described above, the present invention expands the method of monitoring the optical signal quality degradation such as SNR degradation and waveform distortion by a single circuit regardless of the signal bit rate, signal format and modulation method to the optical wavelength division multiplexed signal of N wavelengths by using the optical wavelength division demultiplexing means. According to the present invention, since the electric signal processing that evaluates the optical signal quality parameter from the optical signal intensity distribution has no wavelength dependence, only one electric signal processing unit is enough to perform the signal processing, thereby being able to reduce the size of the apparatus.

Besides, according to the present invention, the single circuit can monitor the optical signal quality degradation such as SNR degradation and waveform distortion regardless of the bit rate, signal format and modulation method of the target optical wavelength division multiplexed signal to be measured.

Furthermore, when nonlinear optical mediums are used in the present invention, it is not necessary for each of the nonlinear optical mediums to have a wide bandwidth because it can only handle the wavelength of the incident optical signal. In addition, although the nonlinear optical mediums as a whole must be applicable to all the optical signal wavelengths (wide bandwidth), since the optical combining means, nonlinear optical mediums, and opto-electric conversion means can each be composed of only one unit, the entire configuration can be simplified.

Moreover, the present invention can increase the range of the optical signal bit rate by using the optical sampling method as compared with the method using the electric sampling.

The above and other objects, effects, features and advantages of the present invention will become more apparent from the following description of embodiments thereof taken in conjunction with the accompanying drawings.

BRIEF DESCRIPTION OF THE DRAWINGS

FIGS. 25A and 25B are block diagrams showing a configuration of an optical network of a 16th embodiment in accordance with the present invention, wherein FIG. 25A shows an optical network with a ring configuration including a standby circuit, and FIG. 25B shows an optical network with a mesh configuration;

FIG. 26 is a diagram showing the relationship of FIGS. 26A and 26B;

FIGS. 26A and 26B are block diagrams showing a configuration of an optical transmit/receive terminal 104 of the 16th embodiment in accordance with the present invention;

FIGS. 36A and 36B are block diagrams showing a configuration of an optical network of a 17th embodiment in accordance with the present invention, wherein FIG. 36A shows an optical network with a ring configuration including a standby circuit, and FIG. 36B shows an optical network with a mesh configuration;

DETAILED DESCRIPTION OF PREFERRED EMBODIMENTS

The optical wavelength division multiplexed signal monitoring apparatus of the embodiments according to the present invention will now be described with reference to the accompanying drawings.

First Embodiment

Figure 1:
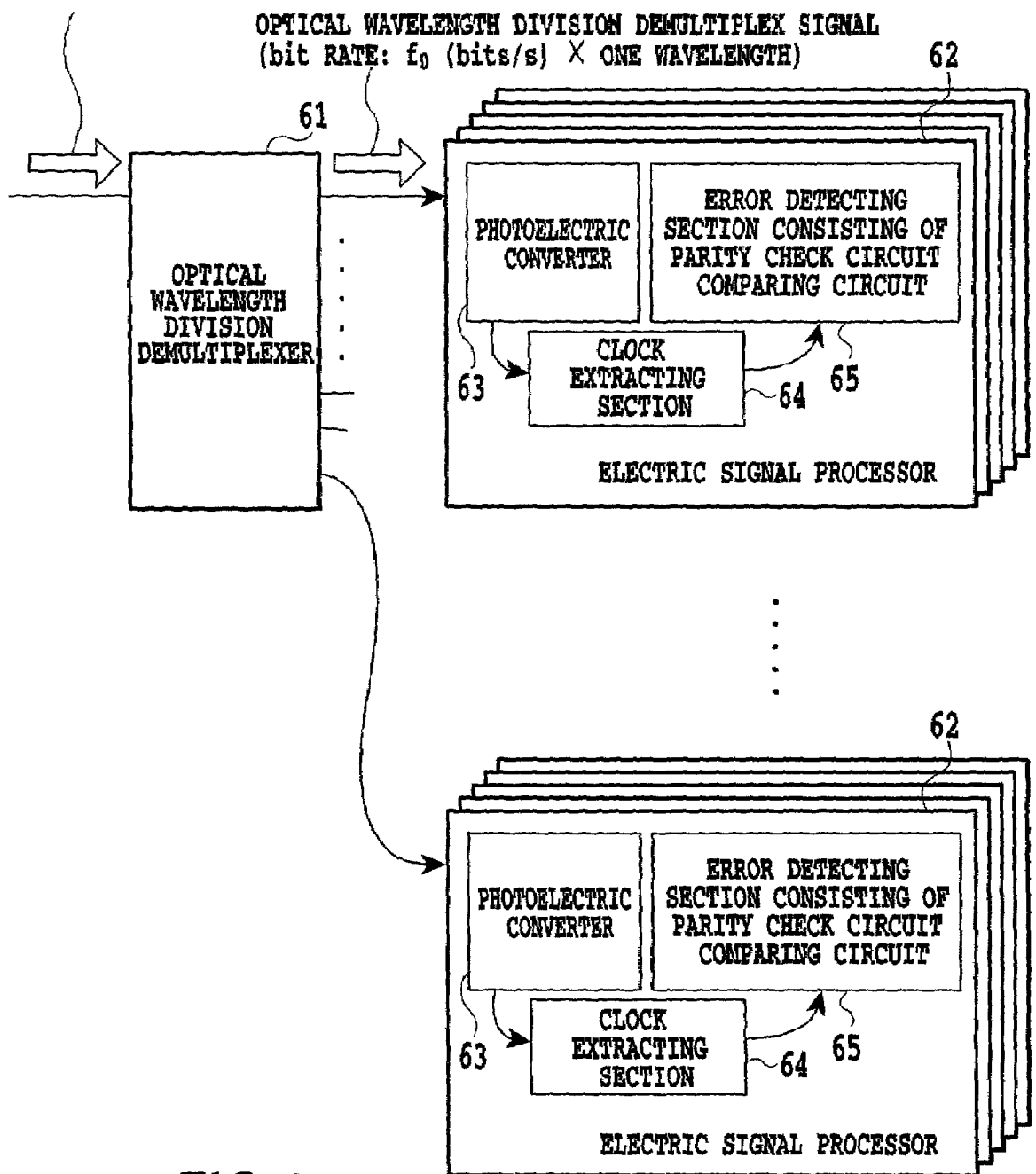
FIG. 1 is a block diagram showing a configuration of an example 1 of the conventional optical wavelength division multiplexed signal monitoring apparatus.
Figure 2:
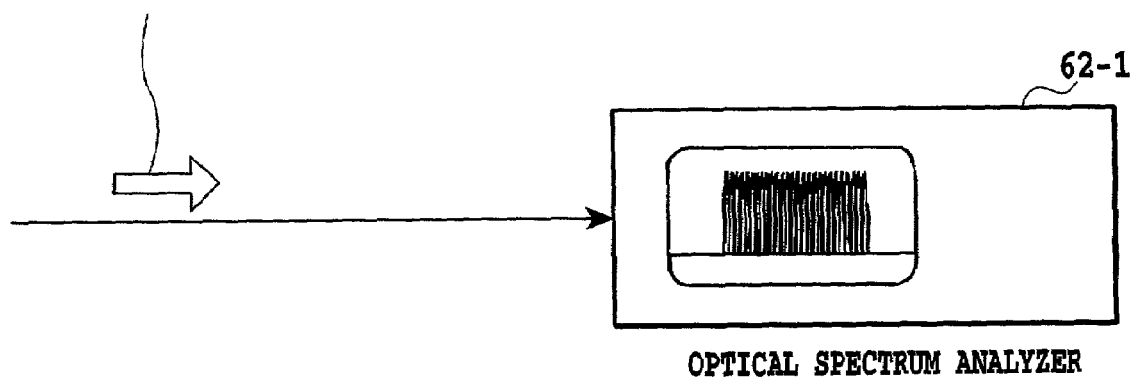
FIG. 2 is a block diagram showing a configuration of an example 2 of the conventional optical wavelength division multiplexed signal monitoring apparatus.
Figure 3:
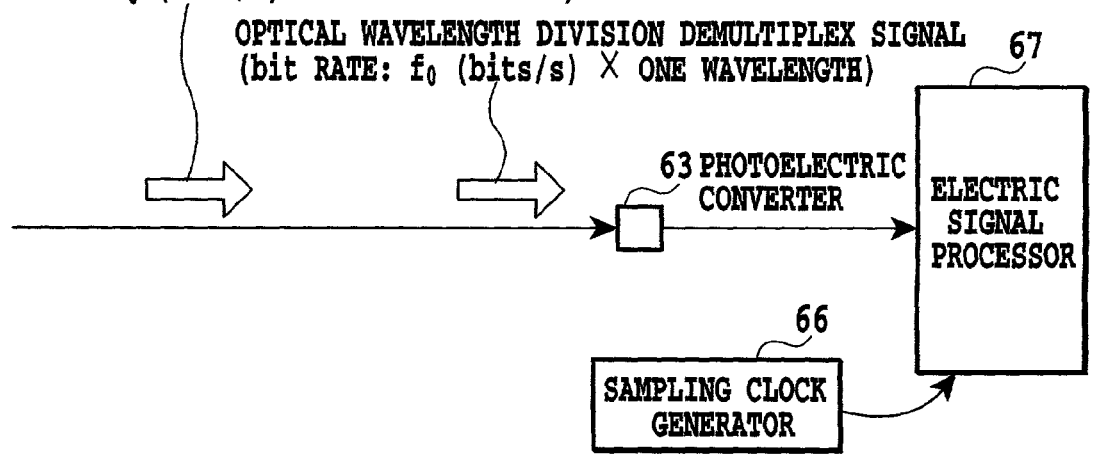
FIG. 3 is a block diagram showing a configuration of an example 3 of the conventional optical wavelength division multiplexed signal monitoring apparatus.
Figure 4:
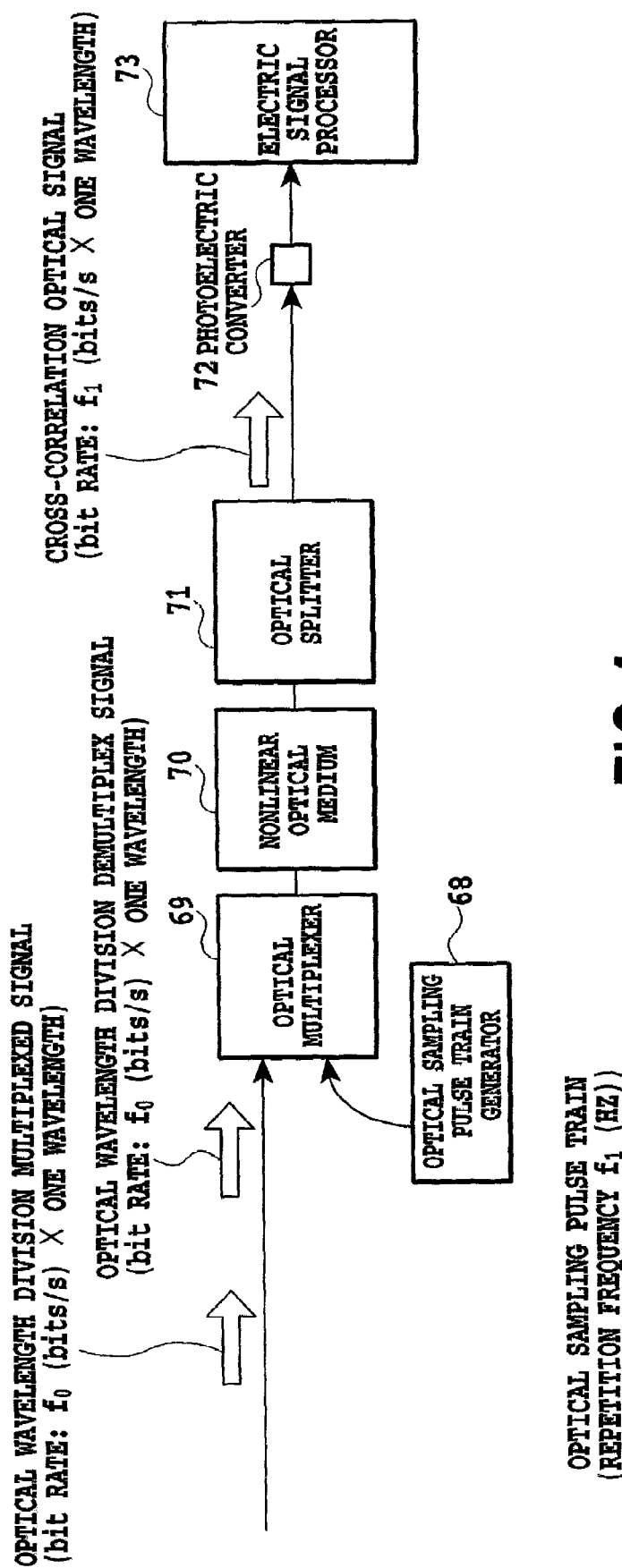
FIG. 4 is a block diagram showing a configuration of an example 4 of the conventional optical wavelength division multiplexed signal monitoring apparatus.
Figure 5:
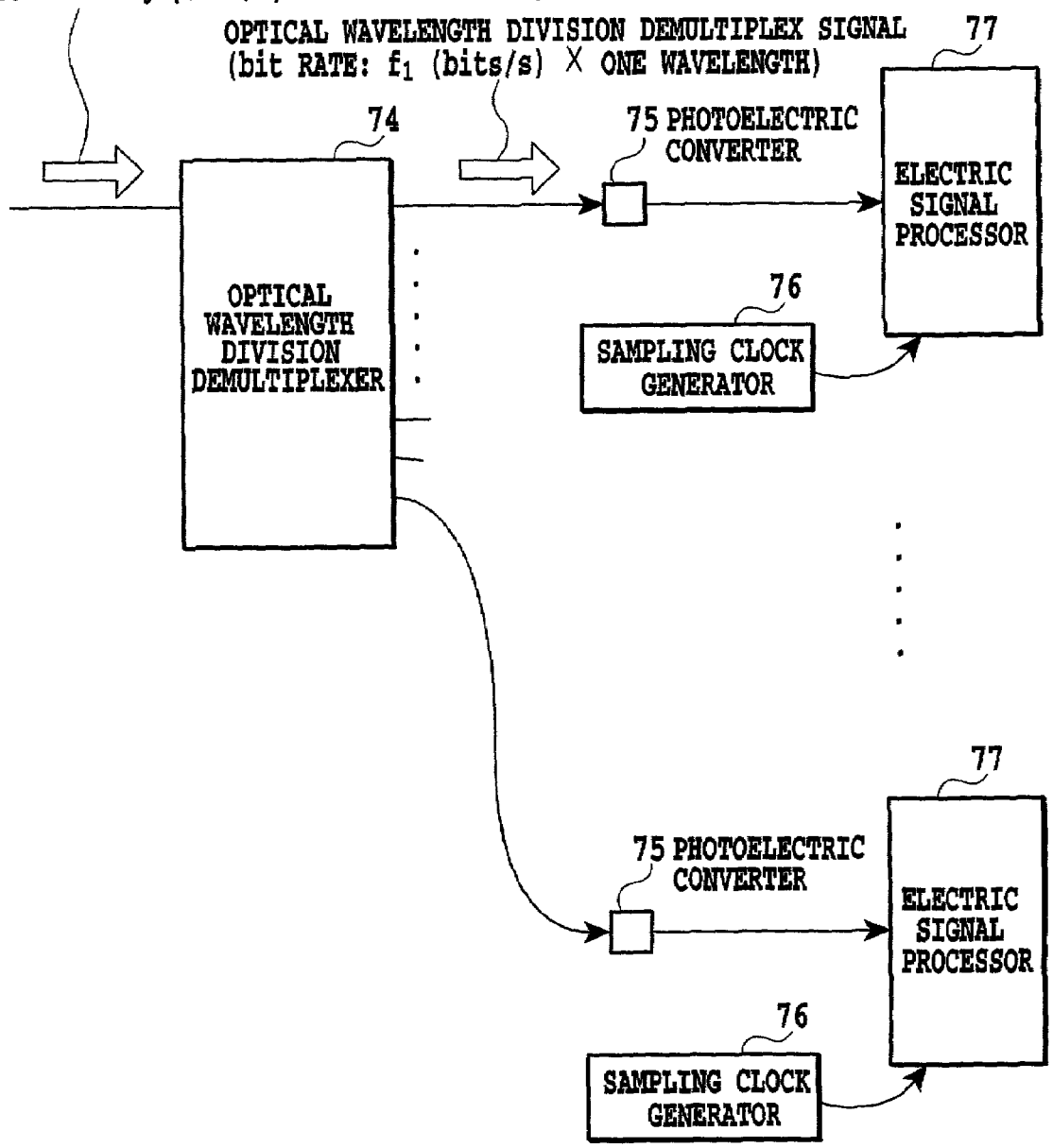
FIG. 5 is a block diagram showing a configuration of an example 5 of the conventional optical wavelength division multiplexed signal monitoring apparatus.
Figure 6:
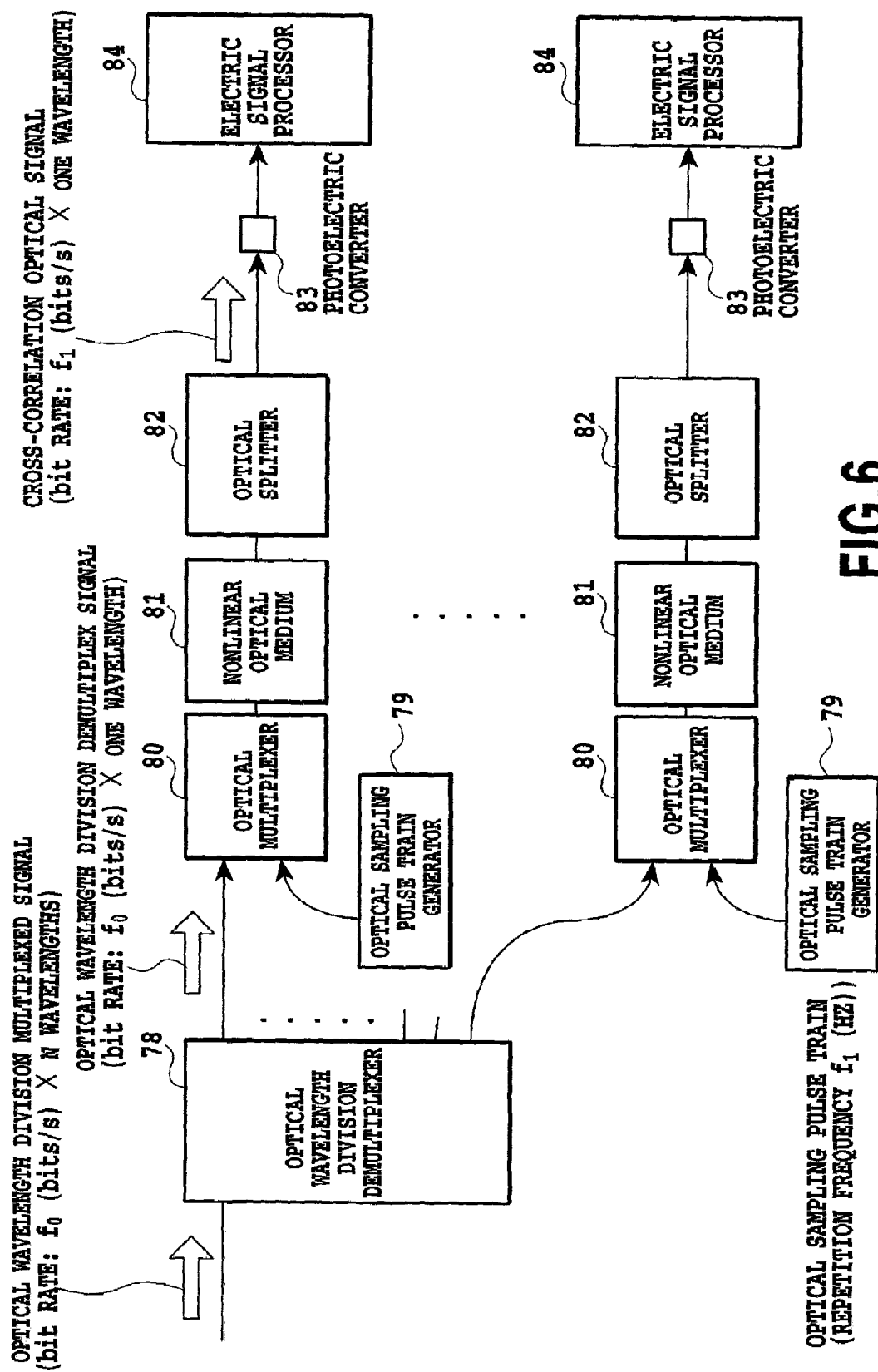
FIG. 6 is a block diagram showing a configuration of an example 6 of the conventional optical wavelength division multiplexed signal monitoring apparatus.
Figure 7:
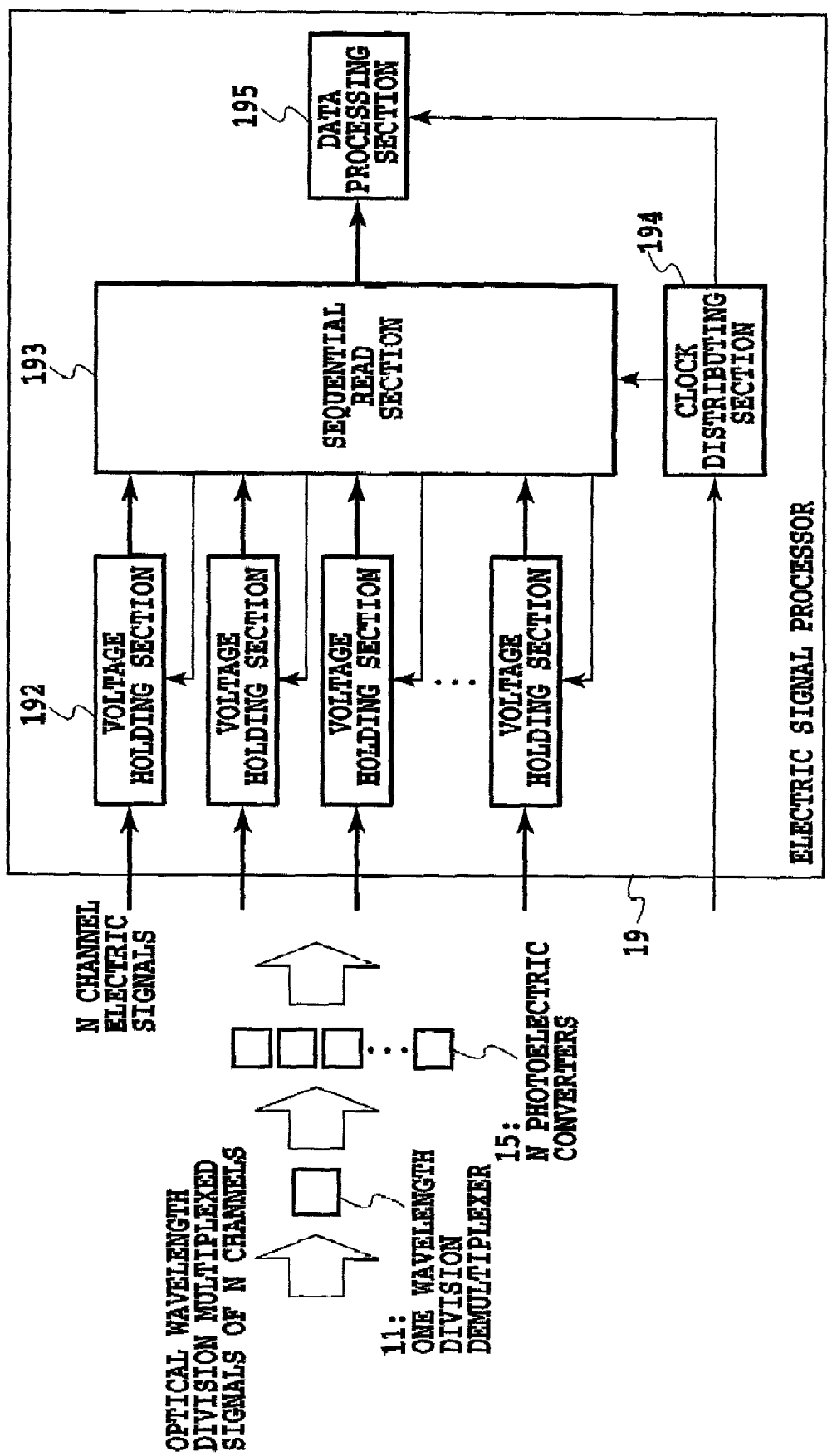
FIG. 7 is a block diagram showing a configuration of an optical wavelength division multiplexed signal monitoring apparatus of a first embodiment in accordance with the present invention.

FIG. 7 shows a configuration of an optical wavelength division multiplexed signal monitoring apparatus of a first embodiment in accordance with the present invention. A wavelength division demultiplexer 11 carries out the wavelength division demultiplexing of an optical wavelength division multiplexed signal consisting of N optical signals with a bit rate $f_0$ (bits/s) that undergo the wavelength multiplexing. Subsequently, N photoelectric converters 15 convert them into N channel electric signals to be supplied to an electric signal processor 19. As will be described later, the present embodiment is an example in which the electric signal processor 19 stores the N channel electric signals for a predetermined time period, and processes them by reading them sequentially, thereby reducing the electric signal processing process to a single system.

The electric signal processor 19 comprises N input ports for accepting the N channel electric signals and N voltage holding sections 192, and a sequential read section 193, a clock distributing section 194 and a data processing section 195. The voltage holding sections 192 carry out the analog-to-digital conversion of the input electric signals, hold the digital signal voltages for a time period, and output them in response to an external trigger signal. The sequential read section 193, operating in synchronism with the clock signal delivered from the clock distributing section 194, reads the digital signal voltages sequentially from the voltage holding sections 192 by supplying them, which are associated with channel 1 to N, with a trigger signal, and delivers the channel 1 to N data to the data processing section 195 in the time-series fashion. The data processing section 195 obtains the optical signal intensity distribution from the N-channel digital signal voltages, and evaluates the optical signal quality parameter of each of the N-channels from the optical signal intensity distribution. Although the detail of an evaluation method of the quality evaluation parameter will be described later, a known quality evaluation parameter evaluation method is applicable such as that disclosed in the reference material [2].

Second Embodiment

Figure 8:
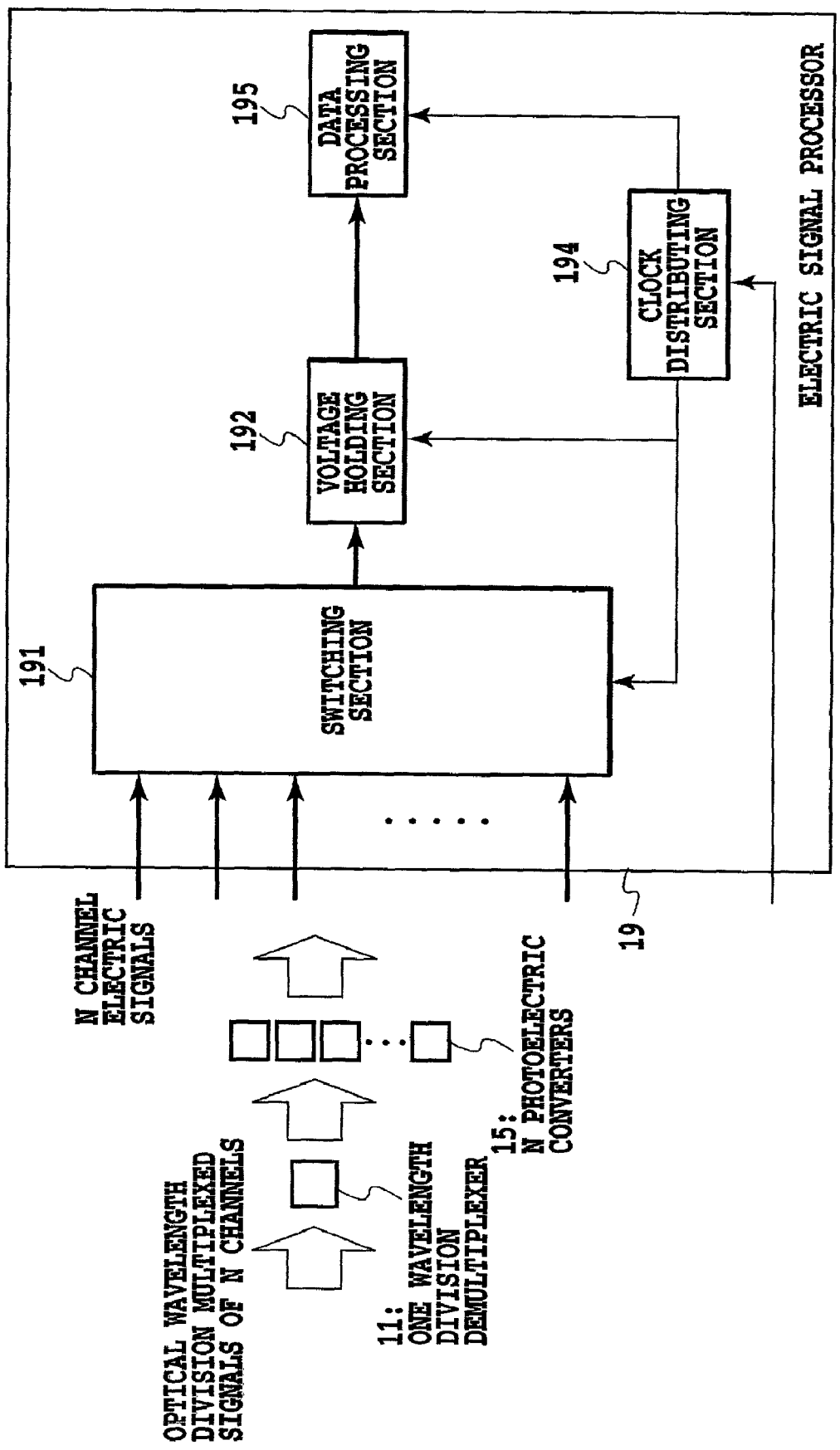
FIG. 8 is a block diagram showing a configuration of an optical wavelength division multiplexed signal monitoring apparatus of a second embodiment in accordance with the present invention.

FIG. 8 shows a configuration of an optical wavelength division multiplexed signal monitoring apparatus of a second embodiment in accordance with the present invention. The wavelength division demultiplexer 11 carries out the wavelength division demultiplexing of the optical wavelength division multiplexed signal consisting of N optical signals with a bit rate $f_0$ (bits/s) that undergo the wavelength multiplexing. Subsequently, the N photoelectric converters 15 convert them into N channel electric signals to be supplied to an electric signal processor 19. As will be described later, the present embodiment is an example in which a switching section 191 in the electric signal processor 19 sequentially switches connection of the N channel analog electric signals, thereby reducing the electric signal processing process to a single system.

The electric signal processor 19 comprises N input ports for accepting the N channel electric signals and the single switching section 191, and a voltage holding section 192, a clock distributing section 194 and a data processing section 195. The switching section 191 switches the connection between the N input ports and the single voltage holding section 192 sequentially from channel 1 to N in synchronism with the clock signal delivered from the clock distributing section 194. Here, the time period of the switching can be adjusted to any desired value. Here, the time period is approximately equal to the time a particular channel is connected to the voltage holder. The voltage holding section 192 carries out the analog-to-digital conversion of the input electric signal, holds the digital signal voltage for a time period, and outputs it in response to the external trigger signal delivered by the clock distributing section 194. The data processing section 195 obtains the optical signal intensity distribution from the N-channel digital signal voltages, and evaluates the optical signal quality parameter of each of the N-channels from the optical signal intensity distribution. Although the detail of the evaluation method of the quality evaluation parameter will be described later, a known quality evaluation parameter evaluation method is applicable such as that disclosed in the reference material [2].

Third Embodiment

Figure 9:
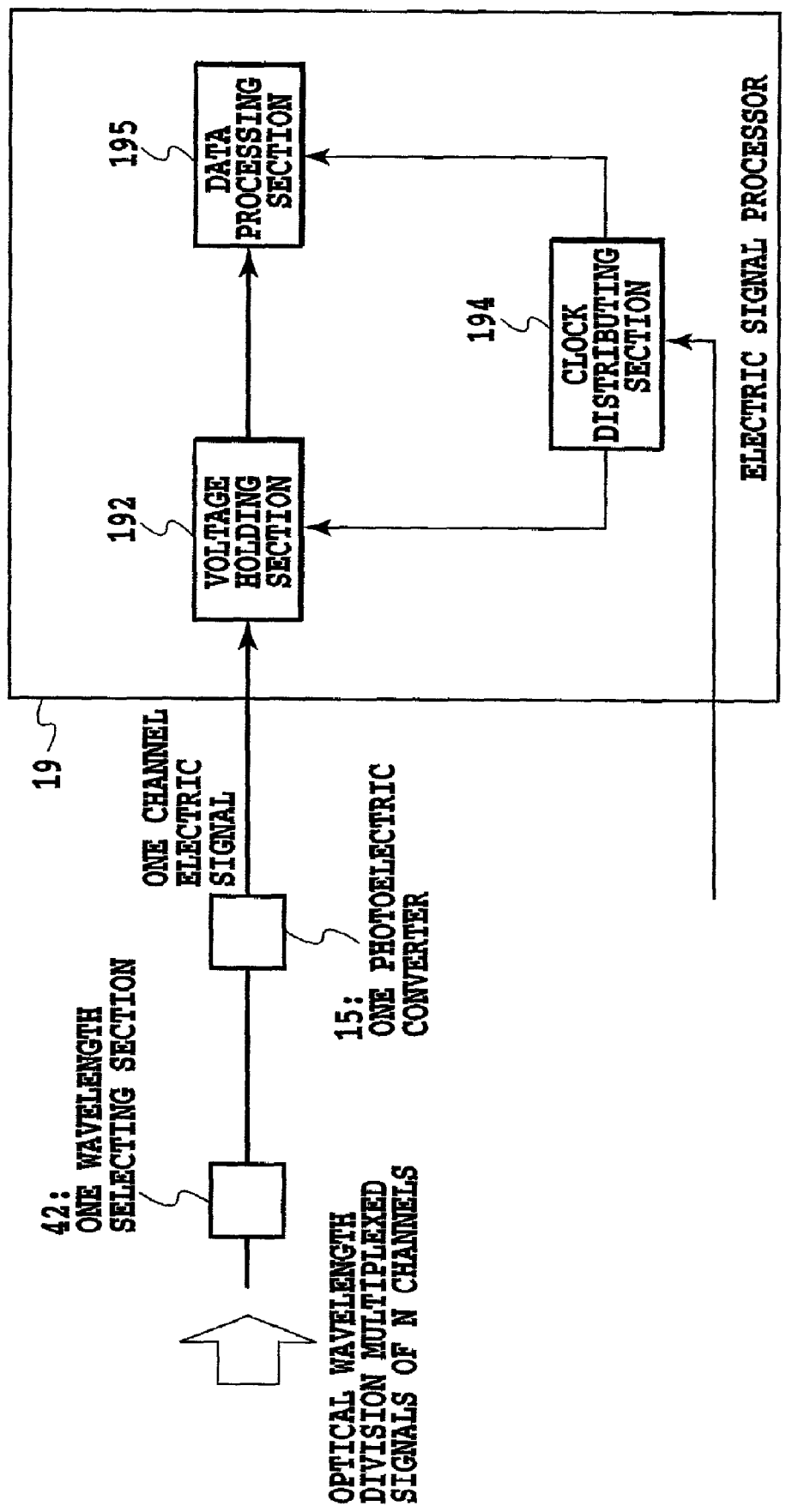
FIG. 9 is a block diagram showing a configuration of an optical wavelength division multiplexed signal monitoring apparatus of a third embodiment in accordance with the present invention.

FIG. 9 shows a configuration of an optical wavelength division multiplexed signal monitoring apparatus of a third embodiment in accordance with the present invention. A wavelength selecting section 42 selects one of N optical signals with a bit rate $f_0$ (bits/s) that are wavelength multiplexed into the optical wavelength division multiplexed signal, and the selected optical signal reaches the electric signal processor 19 as a single-channel electric signal through the single photoelectric converter 15.

The electric signal processor 19 comprises one input port for accepting the one-channel electric signal, a voltage holding section 192, a clock distributing section 194 and a data processing section 195. The voltage holding section 192 carries out the analog-to-digital conversion of the input electric signal, holds the digital signal voltage for a time period, and outputs it in response to the external trigger signal delivered by the clock distributing section 194. The data processing section 195 obtains the optical signal intensity distribution from the N-channel digital signal voltages, and evaluates the optical signal quality parameter of each of the N-channels from the optical signal intensity distribution. Although the detail of the evaluation method of the quality evaluation parameter will be described later, a known quality evaluation parameter evaluation method is applicable such as that disclosed in the reference material [2].

Fourth Embodiment

Figure 10:
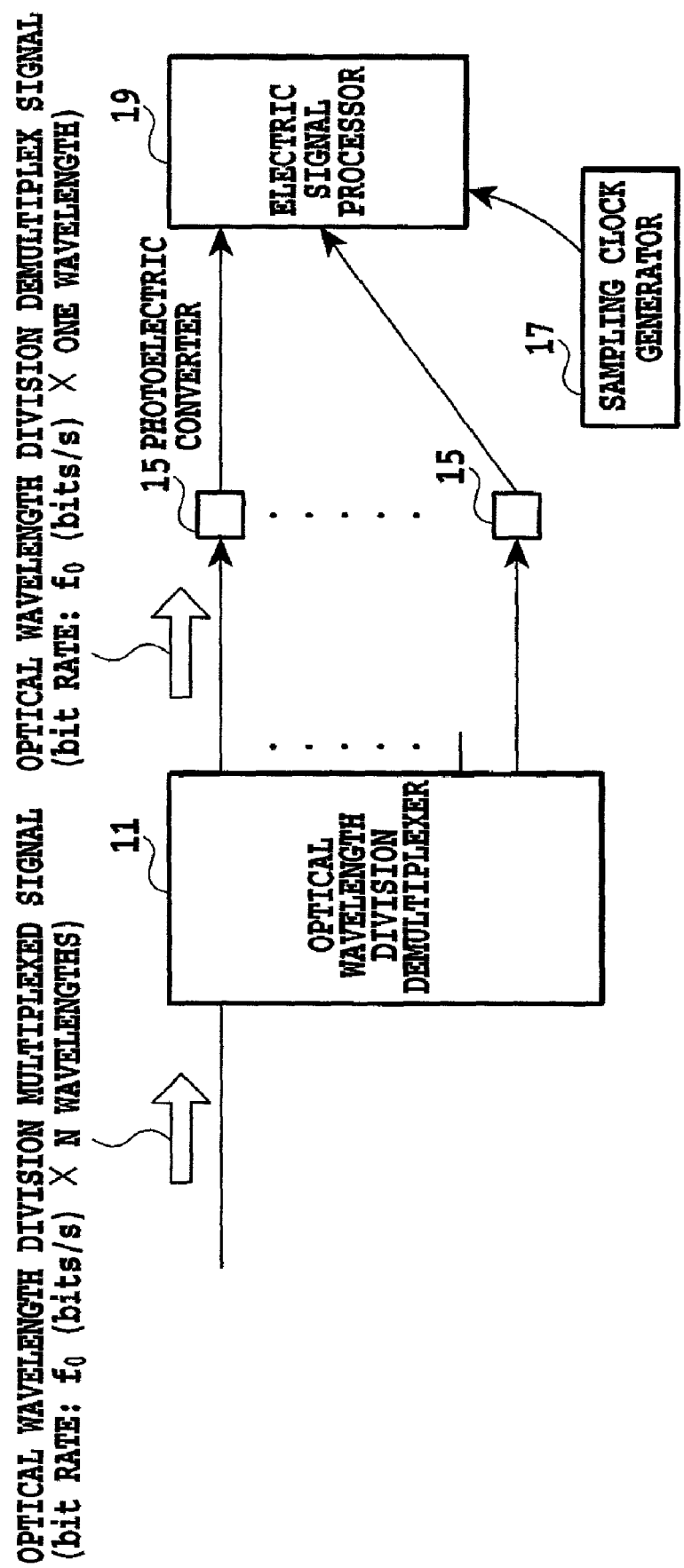
FIG. 10 is a block diagram showing a configuration of an optical wavelength division multiplexed signal monitoring apparatus of a fourth embodiment in accordance with the present invention.

FIG. 10 shows a configuration of an optical wavelength division multiplexed signal monitoring apparatus of a fourth embodiment in accordance with the present invention. The optical wavelength division multiplexed signal monitoring apparatus of the present embodiment comprises the optical wavelength division demultiplexer 11, N photoelectric converters 15, the sampling clock generator 17 and the electric signal processor 19. The optical wavelength division demultiplexer 11 carries out the optical wavelength division demultiplexing of the optical wavelength division multiplexed signal consisting of N optical signals with a bit rate $f_0$ (bits/s) that undergo the wavelength multiplexing, where N is an integer greater than one. The N photoelectric converters 15 receive the N-channel optical wavelength division demultiplexed signals demultiplexed by the optical wavelength division demultiplexer 11, and convert them into the electric intensity modulated signals. The sampling clock generator 17 generates the sampling clock signal with the repetition frequency of $f_1$ (Hz) ($f_1=(n/m)f_0+a$, where n and m are a natural number, and a is an offset frequency). The electric signal processor 19 samples the N-channel electric intensity modulated signals output from the N photoelectric converters 15 by the sampling clock signal generated by the sampling clock generator 17, obtains the optical signal intensity distribution from the sampled signals, and evaluates the optical signal quality parameter of each of the N channels from the optical signal intensity distribution.

In the foregoing configuration, the optical wavelength division demultiplexer 11 and photoelectric converters 15 convert the optical signals with the bit rate $f_0$ (bits/s) into the electric intensity modulated signals. The electric signal processor 19, which uses the electric sampling method, measures the optical signal intensity distribution by sampling the intensity of the electric intensity modulated signal using the sampling clock signal with a frequency $f_1$ (Hz) ($f_1=(N/M)f_0+a$, where a is an offset frequency), which is generated by the sampling clock generator 17.

For the measurement of the optical signal intensity distribution by the electric sampling method, a commercially available electric sampling apparatus can be used. In addition, although the detail of the evaluation method of the quality evaluation parameter will be described later, the known quality evaluation parameter evaluation method disclosed in the foregoing reference material [2] is applicable.

The present embodiment extends the monitoring method, which monitors by the single circuit the optical signal quality degradation such as the SNR degradation and waveform distortion regardless of the signal bit rate, signal format and modulation method, to the N wavelength optical wavelength division multiplexed signal by using the optical wavelength division demultiplexer 11. Thus, it can monitor the optical signal quality of the optical wavelength division multiplexed signal. The method of evaluating the optical signal quality parameter from the optical signal intensity distribution has no wavelength dependence in the electric signal processing, and can achieve the processing in the time-series fashion because of its statistical method. Therefore, it can be implemented by using only one electric signal processor 19, and hence serve to reduce the size and cost of the apparatus.

In addition, since the present embodiment utilizes the electric sampling, the size of the apparatus can be made smaller than that using an optical sampling method. However, the optical signal bit rate achieved is limited by the bandwidth of the photoelectric converters 15.

Fifth Embodiment

Figure 11:
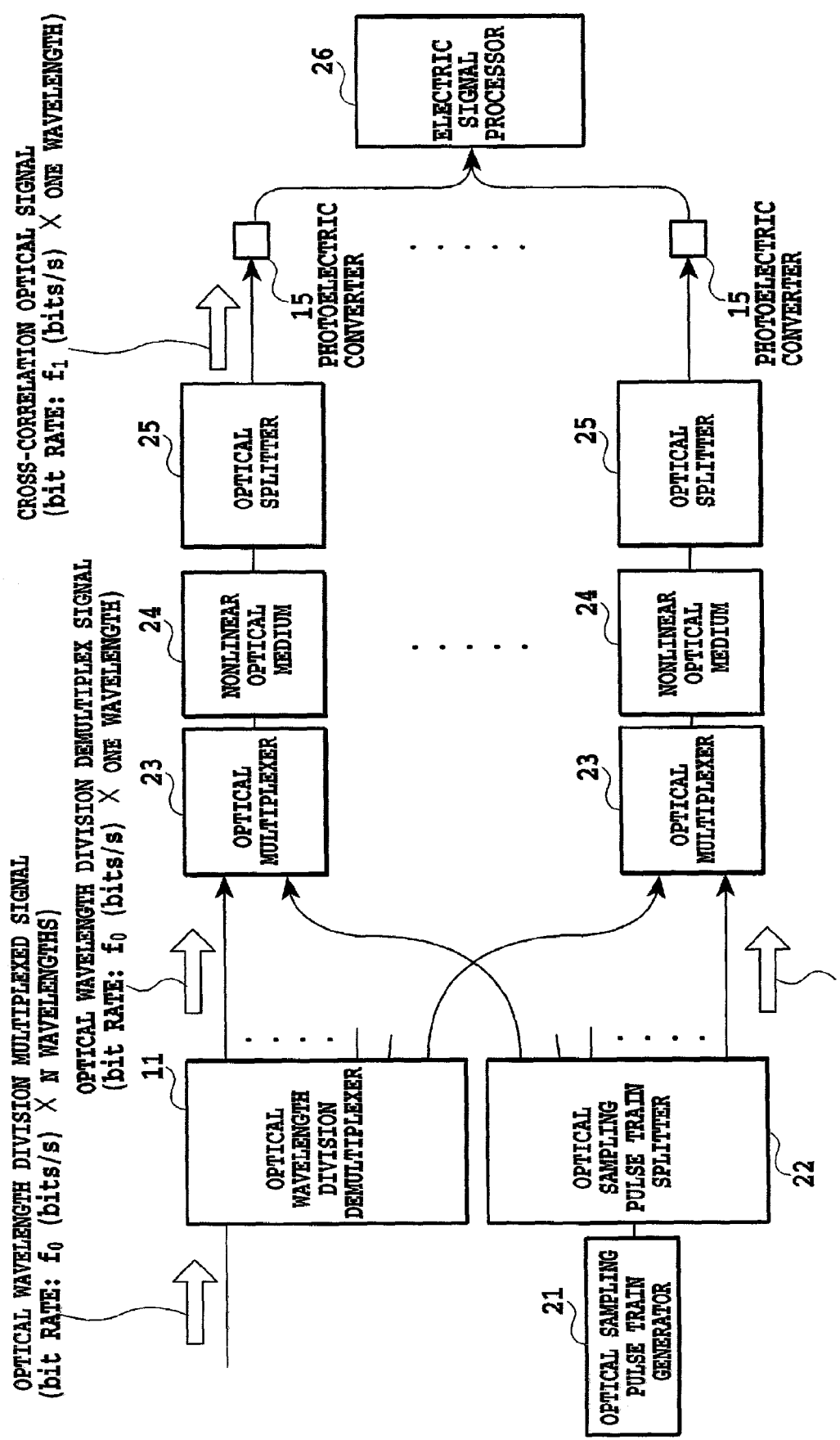
FIG. 11 is a block diagram showing a configuration of an optical wavelength division multiplexed signal monitoring apparatus of a fifth embodiment in accordance with the present invention.

FIG. 11 shows a configuration of an optical wavelength division multiplexed signal monitoring apparatus of a fifth embodiment in accordance with the present invention. The optical wavelength division multiplexed signal monitoring apparatus of the present embodiment comprises the optical wavelength division demultiplexer 11, an optical sampling pulse train generator 21, an optical sampling pulse train splitter 22, N optical multiplexers 23, where N is an integer greater than one, N nonlinear optical media 24, N optical splitters 25, N photoelectric converters 15, and an electric signal processor 26.

The optical wavelength division demultiplexer 11 carries out the optical wavelength division demultiplexing of the optical wavelength division multiplexed signal consisting of the N optical signals of the bit rate $f_0$ (bits/s) which are wavelength multiplexed, where N is an integer greater than one. The optical sampling pulse train generator 21 generates the optical sampling pulse train whose repetition frequency is $f_1$ (Hz) ($f_1=(n/m)f_0+a$, where n and m are a natural number, and a is an offset frequency), and whose pulse width is sufficiently narrower than the time slot of the optical signal with the bit rate $f_0$ (bits/s). The optical sampling pulse train splitter 22 splits the optical sampling pulse train generated by the optical sampling pulse train generator 21 into N sequences. The N optical multiplexers 23 combines one of the N-channel optical wavelength division demultiplexed signals output from the optical wavelength division demultiplexer 11 with one of the N sequence optical sampling pulse trains output from the optical sampling pulse train splitter 22.

The N nonlinear optical media 24 induces the nonlinear interaction between the optical wavelength division demultiplexed singal and the optical sampling pulse train combined by the optical multiplexer 23. The N optical splitters 25 each split the cross-correlation optical signal, which is produced by the nonlinear interaction in the nonlinear optical medium 24, from the optical wavelength division multiplexed signal and the optical sampling pulse train. The N photoelectric converters 15 each receive one of the N-channel cross-correlation optical signals from the corresponding optical splitter 25, and convert it to the electric intensity modulated signal.

The electric signal processor 26 obtains the optical signal intensity distribution from the N-channel electric intensity modulated signals output from the photoelectric converter 15, and evaluates for each of the N-channel the optical signal quality parameter from the optical signal intensity distribution. Although the detail of the evaluation method of the quality evaluation parameter will be described later, the known quality evaluation parameter evaluation method is applicable which is disclosed in the reference material [2].

With the foregoing configuration, the present embodiment utilizes the optical sampling methode for measuring the intensity distribution of the optical signal. Namely, the optical wavelength division demultiplexer 11, optical sampling pulse train generator 21, optical sampling pulse train splitter 22, N optical multiplexers 23 (N is an integer greater than one), N nonlinear optical media 24, and N optical splitters 25, utilizing the optical signal with the bit rate $f_0$ (bits/s), and the optical sampling pulse train whose repetition frequency is $f_1$ (Hz) ($f_1=(N/M)f_0+a$, a is an offset frequency) and whose pulse width is sufficiently narrower than the time slot of the optical signal, generate the cross-correlation signals with the optical frequency different from those of the two optical signals. Then, after the N photoelectric converters 15 carry out the optoelectric conversion of the optical cross-correlation signals, the electric signal processor 26 performs electric signal processing for measuring the intensity distribution of the optical signal.

The foregoing optical signal intensity distribution measurement using the optical sampling method can utilize the known technique such as the optical sampling of the reference material [3] (reference material [3]: Takara Hidehiko, et al. "Ultra-fast Optical Waveform Measuring Method by Optical Sampling Using Sum Frequency Optical Signal Generation", The Journal of the Institute of Electronics, Information and Communication Engineers of Japan, B-1, vol. J75-B-1, No.5, pp.372–380, 1992).

In addition, the cross-correlation signal can be obtained by utilizing the second-order harmonic optical signal generation, sum frequency optical signal generation, difference frequency optical signal generation, or four wave mixing. Incidentally, it is enough for the nonlinear optical media 24 to handle the wavelengths of the incident optical signals, and hence a wide wavelength range is not required of them.

As the foregoing fourth embodiment, the present embodiment extends the monitoring method, which monitors by the single circuit the optical signal quality degradation such as the SNR degradation and waveform distortion regardless of the signal bit rate, signal format and modulation method, to the N wavelength optical wavelength division multiplexed signal by using the optical wavelength division demultiplexer 11. Thus, it can monitor the optical signal quality of the optical wavelength division multiplexed signal. Since the electric signal processing method of evaluating the optical signal quality parameter from the optical signal intensity distribution has no wavelength dependence, it is implemented by only one electric signal processor 26, thereby being able to reduce the size and cost of the apparatus.

In addition, since the present embodiment uses the optical sampling, the optical signal bit rate is not limited by the bandwidth of the photoelectric converters 15. Accordingly, the present embodiment can handle a wider range of the optical signal bit rate than that of the foregoing fourth embodiment using the electric sampling. Furthermore, since the bandwidth of the opto-electric conversions is determined by $f_1$ that can be set at a small value even if the signal bit rate $f_0$ is large, the bandwidth required by the photoelectric converters and the following electric processing section can be made small. This makes it possible to reduce the cost of the portion that executes the electric processing.

Sixth Embodiment

Figure 12:
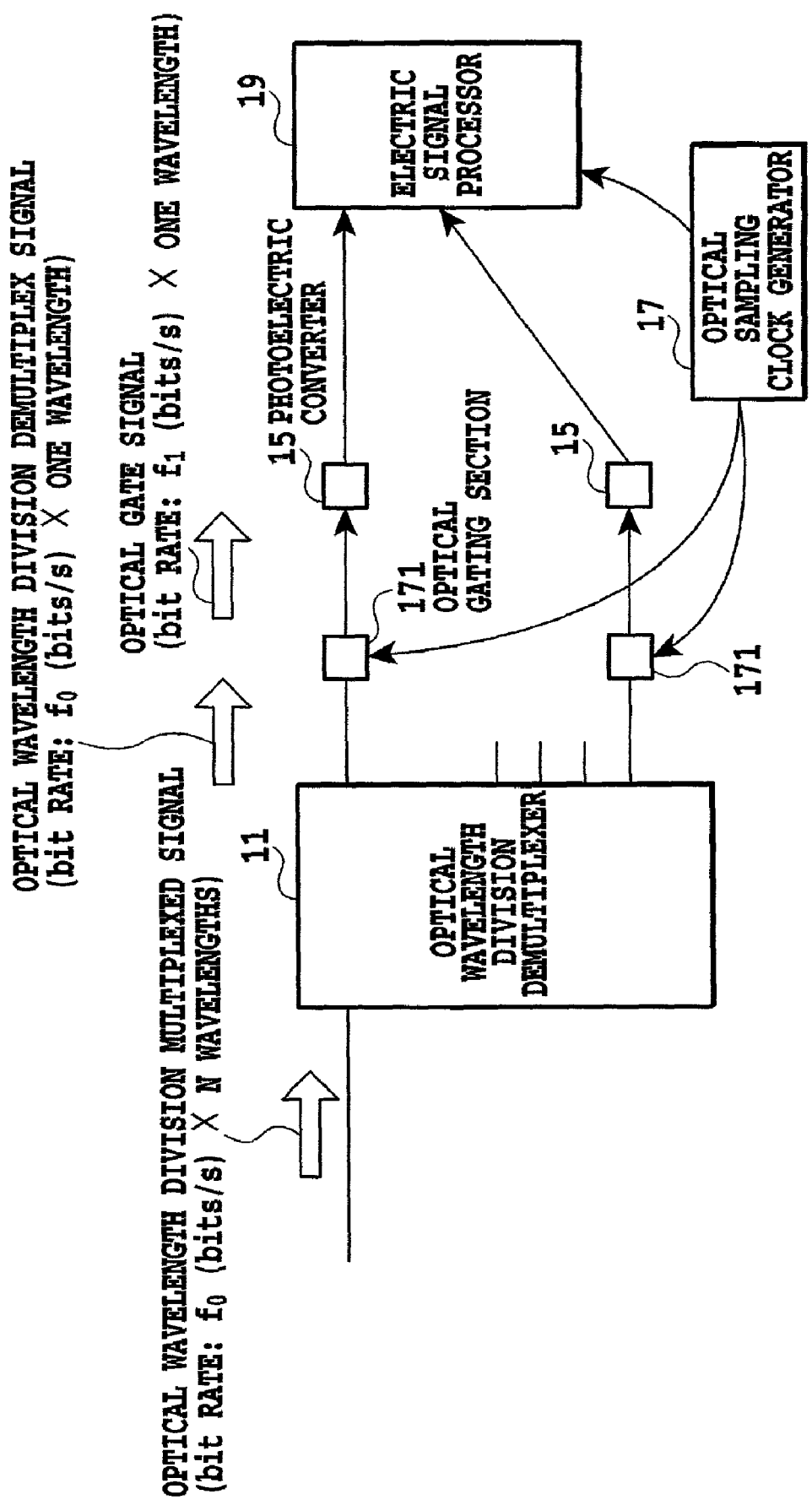
FIG. 12 is a block diagram showing a configuration of an optical wavelength division multiplexed signal monitoring apparatus of a sixth embodiment in accordance with the present invention.

FIG. 12 shows a configuration of an optical wavelength division multiplexed signal monitoring apparatus of a sixth embodiment in accordance with the present invention. The optical wavelength division multiplexed signal monitoring apparatus of the present embodiment comprises the optical wavelength division demultiplexer 11, N optical gating sections 171, N photoelectric converters 15, a sampling clock generator 17, and an electric signal processor 19. The optical wavelength division demultiplexer 11 carries out the optical wavelength division demultiplexing of the optical wavelength division multiplexed signal consisting of the N optical signals of the bit rate $f_0$ (bits/s) which are wavelength multiplexed, where N is an integer greater than one. The sampling clock generator 17 generates the sampling clock signal with a repetition frequency $f_1$ (Hz) ($f_1=(n/m)f_0+a$, where n and m are a natural number, and a is an offset frequency).

The optical gating sections 171, each of which is provided for one of the channels, sample the intensity of the N-channel optical wavelength division demultiplexed signals with the bit rate $f_0$ (bits/s), which are demultiplexed by the optical wavelength division demultiplexer 11, using the sampling clock signal generated by the sampling clock generator 17. The N photoelectric converters 15 receive the optical signals sampled by the optical gating sections 171 for respective channels, and convert them to the electric intensity modulated signals. The electric signal processor 19 measures the optical signal intensity distribution by carrying out the signal processing of the N-channel electric intensity modulated signals supplied from the N photoelectric converters 15, and evaluates for each of the N channels the optical signal quality parameter from the optical signal intensity distribution.

More specifically, the optical gating sections 171 sample the signal light with a gate width less than the time slot ($=1/f_0$) with the repetition frequency $f_1$ (Hz). In parallel with this, the electric signal processor 19 stores the sampled electric signals the photoelectric converters 15 produce in synchronism with the sampling of the optical gating sections 171, obtains the optical signal intensity distribution from the sampled electric signals, and checks the quality of the optical signal by calculating mean value levels and standard deviations at "level 1" and "level 0" within a certain mean time from the distribution.

Thus, the optical signal quality monitor with the configuration employs an electric-optical sampling method that samples the optical signal by the electric signal of the sampling clock signal, which differs from the conventional optical signal quality monitor that utilizes an optical-optical sampling method or electric-electric sampling method. The evaluation method of the quality evaluation parameter is the same as that disclosed in the reference material [2].

Figure 13:
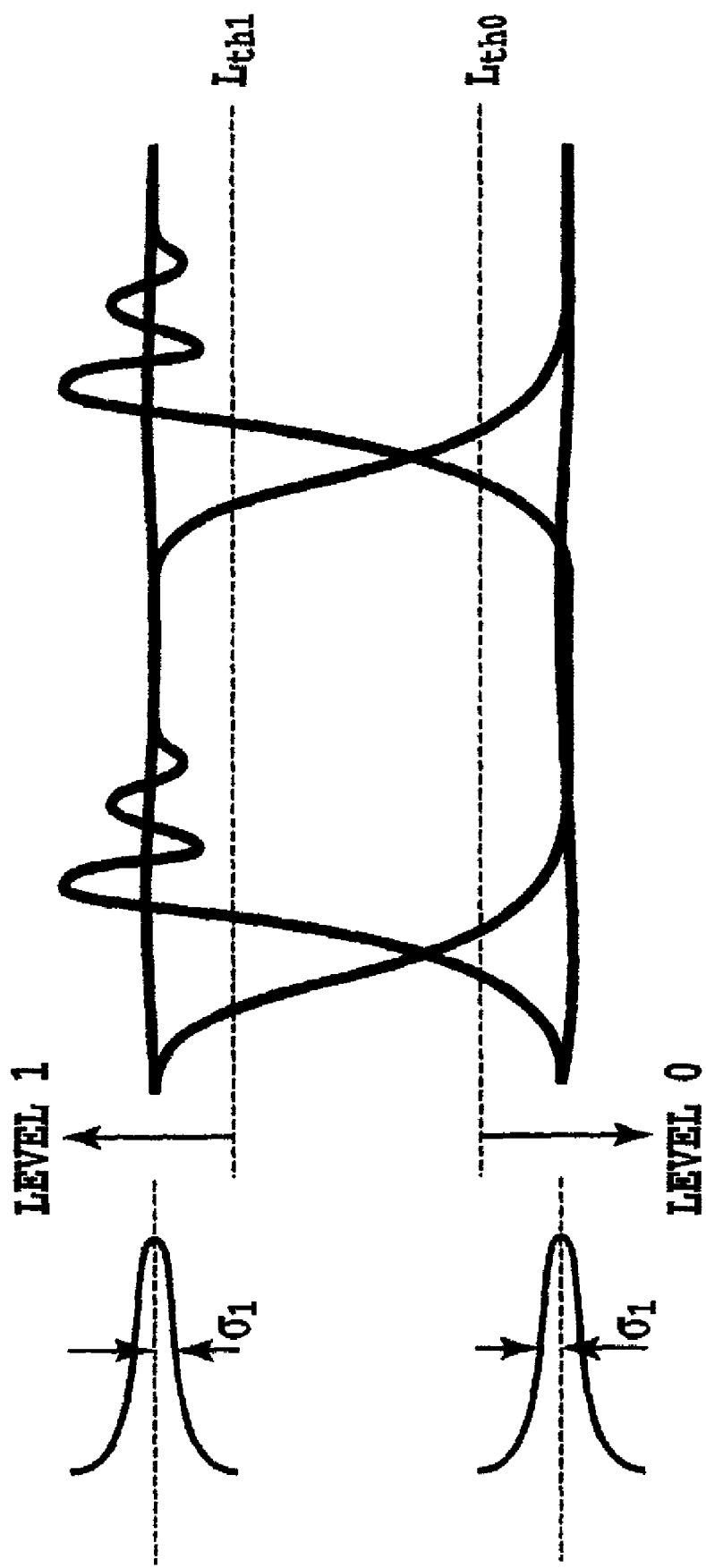
FIG. 13 is a diagram illustrating an example of a level measuring method of a light intensity histogram an electric signal processor measures of optical wavelength division multiplexed signal monitoring apparatus of a sixth embodiment in accordance with the present invention.

FIG. 13 is a diagram illustrating a level setting method of light intensity histograms the electric signal processor 19 measures which is installed in the optical signal quality monitor in accordance with the present invention. Receiving the electric signals the photoelectric converters 15 output by converting the optical signals, the electric signal processor 19 detects and analyzes the peak value of the electric signals, and measures the light intensity histograms as illustrated in FIG. 13. Among the sampled points constituting the light intensity histograms, the electric signal processor 19 makes a decision of "level 1" point group as those points that are higher than a predetermined threshold level $L_{th1}$, and "level 0" point group as those points that are lower than a predetermined threshold level $L_{th0}$. Then, it evaluates the quality of the optical signal by calculating the mean value levels and standard deviations ($\sigma_1$ and $\sigma_0$) at the "level 1" and "level 0" within the certain mean time.

Figure 14:
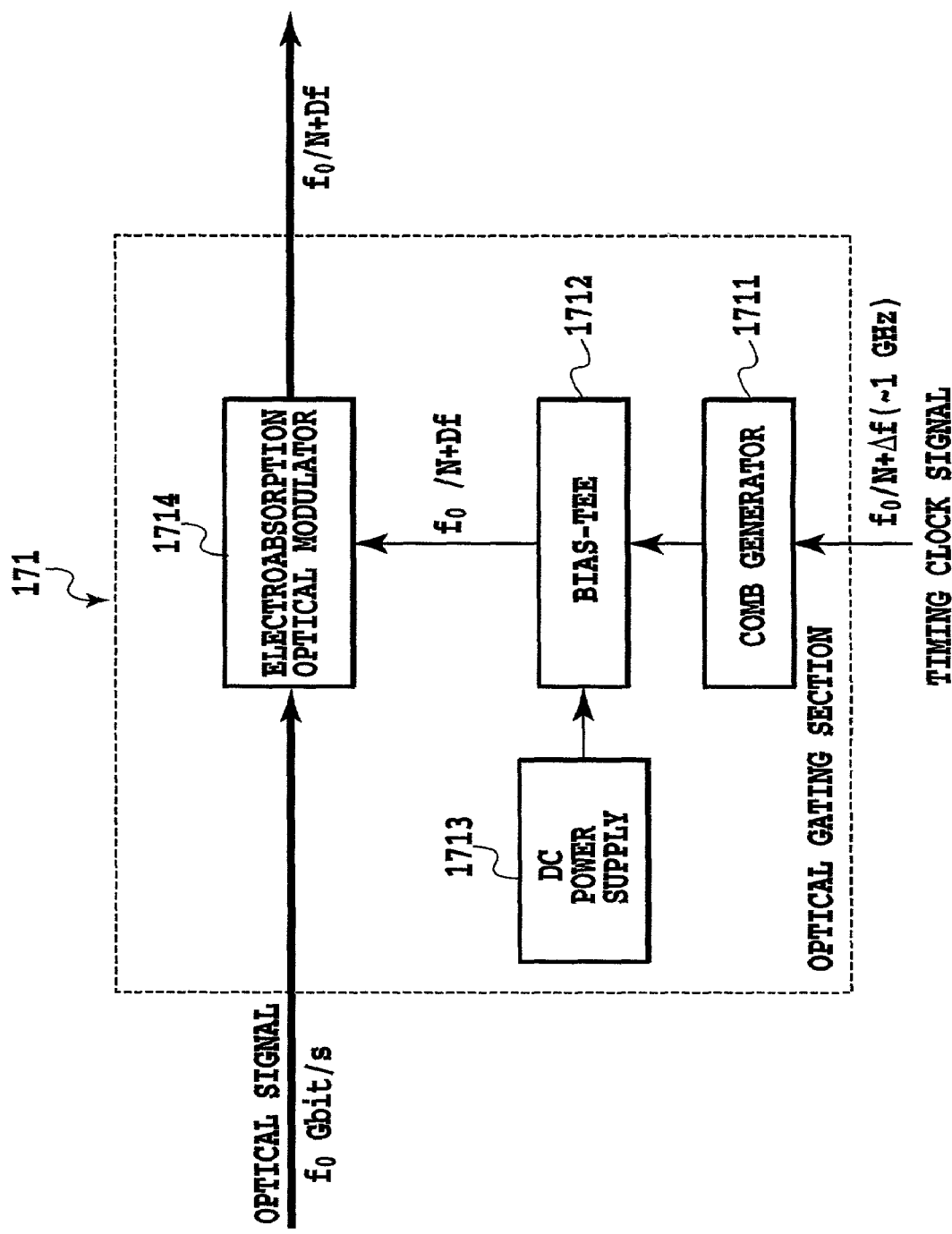
FIG. 14 is a block diagram showing a first configuration of an optical gating section of the optical wavelength division multiplexed signal monitoring apparatus of the sixth embodiment in accordance with the present invention.

FIG. 14 is a block diagram illustrating a first configuration of the optical gating section 171 of the optical signal quality monitor in accordance with the present invention. The optical gating section 171 comprises a comb generator 1711, bias-Tee 1712, DC power supply 1713, electroabsorption optical modulator 1714.

The comb generator 1711 generates the driving signal of the electroabsorption optical modulator 1714 by converting sinusoidal sampling clock signal with a frequency $f_1$ into an electric pulse train with a repetition frequency $f_1$ and small duty, and by superimposing the electric pulse train and the DC voltage fed from the DC power supply 1713 by the bias-Tee 1712. The gate width is adjustable by setting the peak value of the electric pulses and the DC voltage appropriately. For example, as with the sampling clock signal with a frequency 1 GHz, a gate width of about 8 ps can be achieved. The gate width is narrower than the time resolution of about 10 ps achieved by a combination with a commercially available photoelectric converter with an electric sampling apparatus, thereby making it possible to handle the optical signal with a bit rate of 40 Gbits/s.

Figure 15:
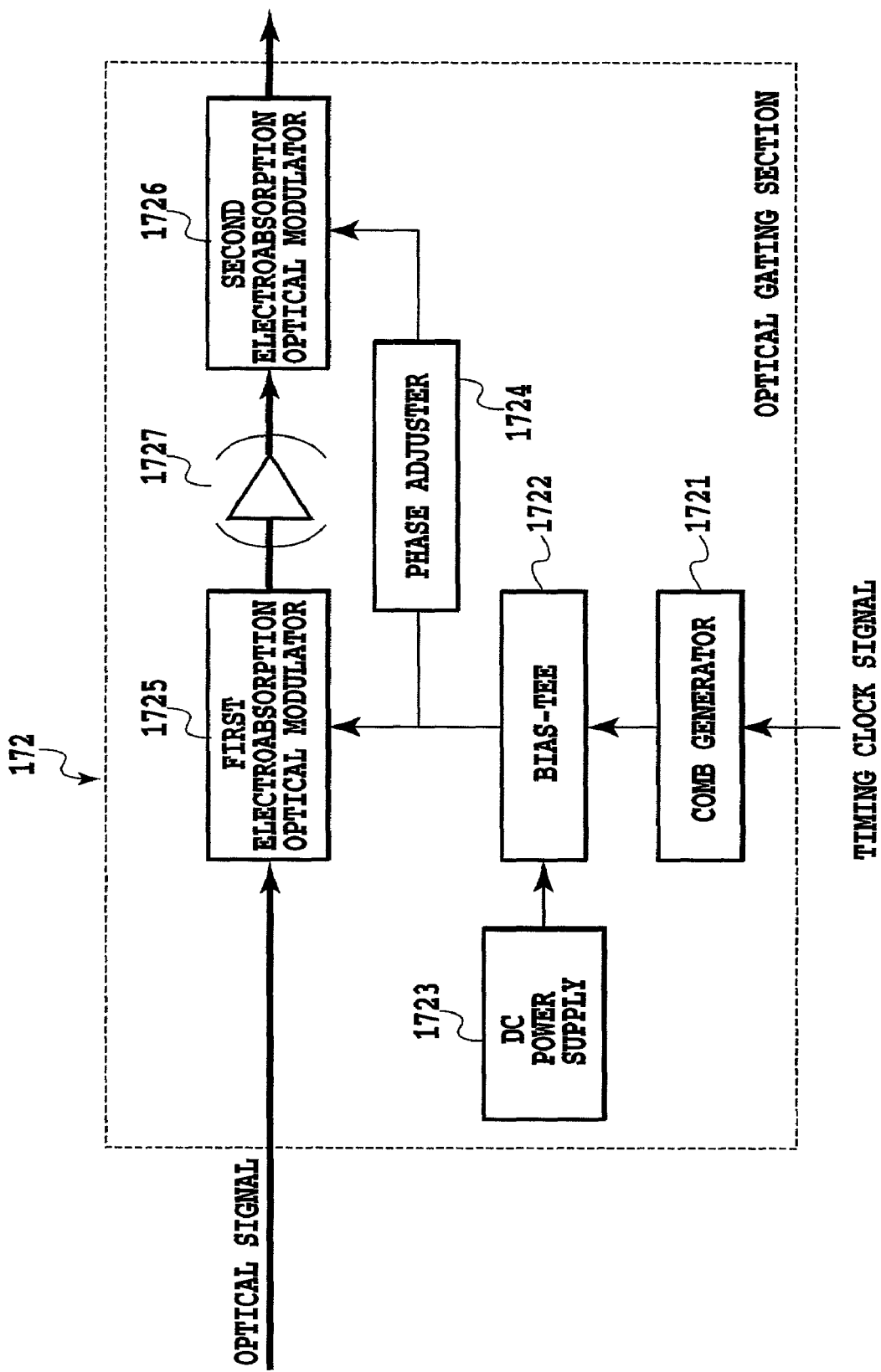
FIG. 15 is a block diagram showing a second configuration of an optical gating section of the optical wavelength division multiplexed signal monitoring apparatus of the sixth embodiment in accordance with the present invention.

FIG. 15 is a block diagram illustrating a second configuration of the optical gating section 172 of the optical signal quality monitor in accordance with the present invention. The optical gating section 172 comprises a comb generator 1721, a bias-Tee 1722, a DC power supply 1723, a phase adjuster 1724, a first electroabsorption optical modulator 1725 and a second electroabsorption optical modulator 1726.

In the optical gating section 172 with such a configuration, the electric signal from the bias-Tee 1722 is split into two portions, which are supplied to the first electroabsorption optical modulator 1725 and second electroabsorption optical modulator 1726, respectively. The two electroabsorption optical modulators 1725 and 1726 sample the optical signals alternately. By adjusting the timing the first electroabsorption optical modulator 1725 and the second electroabsorption optical modulator 1726 sample the optical signals, the sampling with a gate width narrower than the one stage optical gating section 171 as illustrated in FIG. 14 is implemented. For example, as for the sampling clock signal with a frequency of 1 GHz, the gate width of about 5–6 ps is achieved, which makes it possible to monitor the quality of the optical signal with a bit rate of about 70–80 Gbits/s.

Incidentally, in the two-stage optical gating section as shown FIG. 15, since the loss of the electroabsorption optical modulators doubles, the level of the sampled optical signal passing through the modulators is reduced. In such a case where characteristic degradation in the signal quality monitoring takes place, an optical amplifier 1727 such as a rare-earth-doped optical fiber amplifier and semiconductor optical amplifier can be interposed between the first electroabsorption optical modulator 1725 and the second electroabsorption optical modulator 1726, or before or after these electroabsorption optical modulators 1725 and 1726.

Seventh Embodiment

Figure 16:
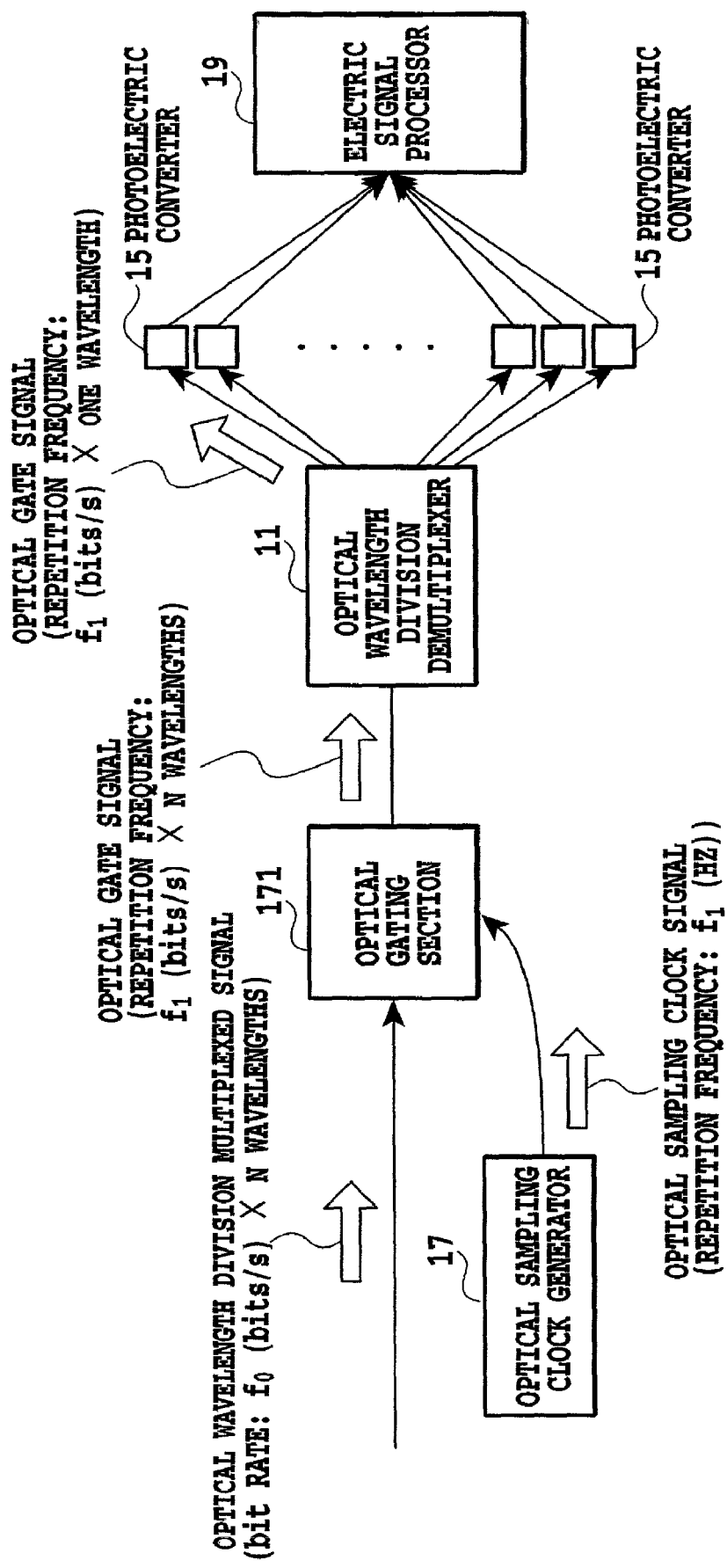
FIG. 16 is a block diagram showing a configuration of an optical wavelength division multiplexed signal monitoring apparatus of a seventh embodiment in accordance with the present invention.

FIG. 16 shows a configuration of an optical wavelength division multiplexed signal monitoring apparatus of a seventh embodiment in accordance with the present invention. The optical wavelength division multiplexed signal monitoring apparatus of the present embodiment comprises an optical gating section 171, a sampling clock generator 17, an optical wavelength division demultiplexer 11, N photoelectric converters 15, and an electric signal processor 19. The sampling clock generator 17 generates a sampling clock signal whose repetition frequency is $f_1$ (Hz) ($f_1=(n/m)f_0+a$, where n and m are a natural number, and a is an offset frequency), and whose pulse width is sufficiently narrower than the time slot of the optical signal with the bit rate $f_0$ (bits/s). Although the operation of the optical gating section 171 is the same as that of the foregoing sixth embodiment, the present embodiment is characterized in that the optical wavelength division multiplexed signal including N channel optical signals, which passes through the optical gating section 171 before the optical wavelength division demultiplexing, is supplied to the optical wavelength division demultiplexer 11 that carries out the optical wavelength division demultiplexing.

Eighth Embodiment

Figure 17:
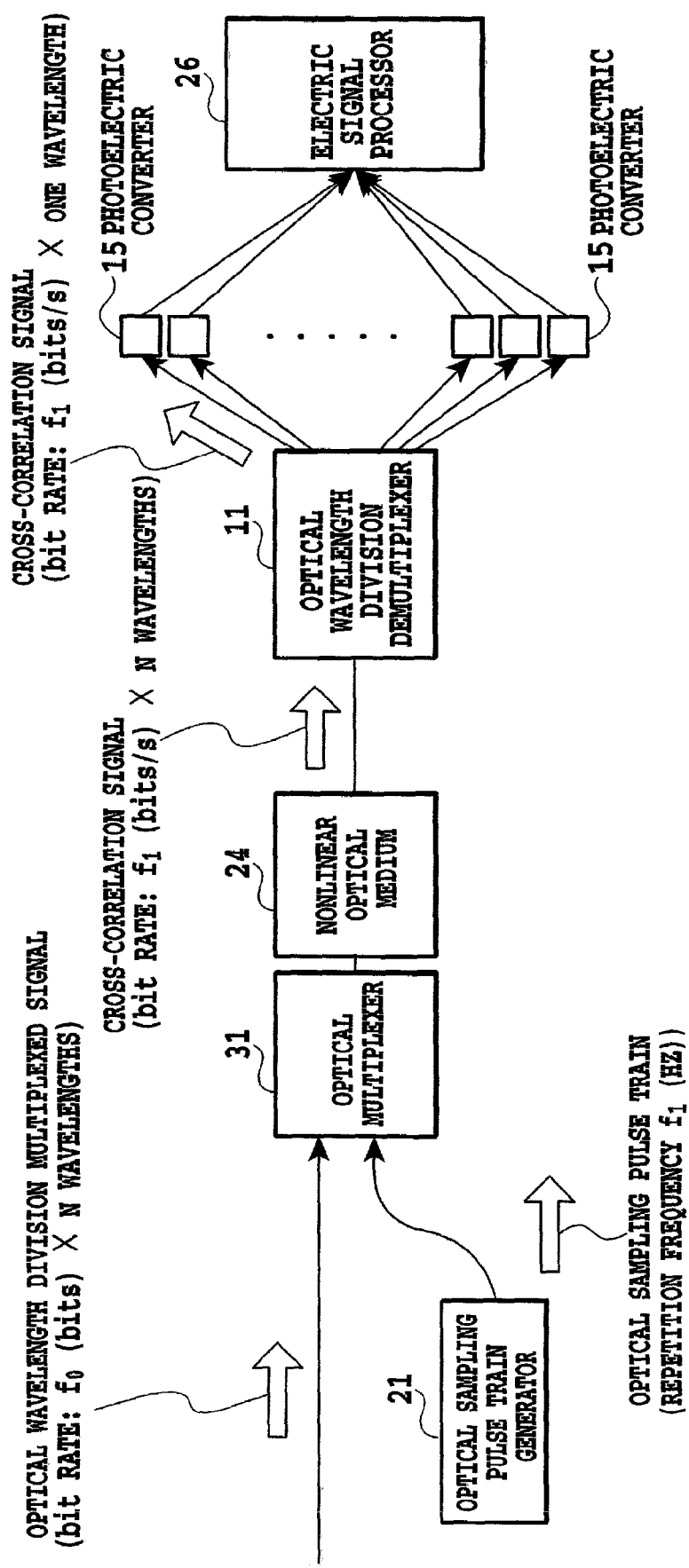
FIG. 17 is a block diagram showing a configuration of an optical wavelength division multiplexed signal monitoring apparatus of an eighth embodiment in accordance with the present invention.

FIG. 17 shows a configuration of an optical wavelength division multiplexed signal monitoring apparatus of an eighth embodiment in accordance with the present invention. The optical wavelength division multiplexed signal monitoring apparatus of the present embodiment comprises an optical sampling pulse train generator 21, an optical multiplexer 31, a nonlinear optical medium 24, an optical wavelength division demultiplexer 11, N photoelectric converters 15, and an electric signal processor 26.

The optical sampling pulse train generator 21 generates an optical sampling pulse train whose repetition frequency is $f_1$ (Hz) ($f_1=(n/m)f_0+a$, where n and m are a natural number, and a is an offset frequency), and whose pulse width is sufficiently narrower than the time slot of the optical signal with the bit rate $f_0$ (bits/s). The optical multiplexer 31 combines the optical sampling pulse train generated by the optical sampling pulse train generator 21 with the optical wavelength division multiplexed signal consisting of N optical signals with the bit rate $f_0$ (bits/s) which are wavelength multiplexed, where N is an integer greater than one. The nonlinear optical medium 24 induces the nonlinear interaction between the optical wavelength division multiplexed signal output from the optical multiplexer 31 and the optical sampling pulse train. The optical wavelength division demultiplexer 11 carries out the wavelength division demultiplexing of the cross-correlation optical signal caused by the nonlinear interaction in the nonlinear optical medium 24 into N-channels.

The N photoelectric converters 15 receive the N-channel cross-correlation optical signals from the optical wavelength division demultiplexer 11, and convert them into the N-channel electric intensity modulated signals. The electric signal processor 26 obtains the optical signal intensity distribution from the N-channel electric intensity modulated signals output from the photoelectric converters 15, and evaluates for each of the N channels the optical signal quality parameter from the optical signal intensity distribution. Although the detail of the evaluation method of the quality evaluation parameter will be described later, a known quality evaluation parameter evaluation method such as that disclosed in the reference material [2] is applicable.

In the configuration, the optical sampling pulse train generator 21, optical multiplexer 31, nonlinear optical medium 24 and optical wavelength division demultiplexer 11, using the optical signal with the bit rate $f_0$ (bits/s) and the optical sampling pulse train whose repetition frequency is $f_1$ (Hz) ($f_1=(N/M)f_0+a$, a is an offset frequency) and whose pulse width is sufficiently narrower than the time slot of the optical signal, generates the cross-correlation signals with an optical frequency different from those of the two optical signals used.

Subsequently, after the N photoelectric converters 15 carry out the opto-electric conversion of the cross-correlation optical signals, the electric signal processor 26 executes the optical sampling method of measuring the intensity distribution of the optical signals by performing the electric signal processing. The optical signal intensity distribution measurement by the optical sampling method can employ the optical sampling disclosed in the foregoing reference material [3]. The cross-correlation signals can be obtained by utilizing the second-order harmonic optical signal generation, sum frequency optical signal generation, difference frequency optical signal generation, or four wave mixing.

The present embodiment can reduce the optical combining means, nonlinear optical medium and optical spitting means into one system by employing as the nonlinear optical medium 11 the nonlinear optical medium with large generation efficiency of the cross-correlation signals over a wide bandwidth, thereby making it possible to reduce the size and cost of the entire circuit.

In addition, the present embodiment can monitor the optical signal quality degradation such as SNR degradation and waveform distortion by a single circuit regardless of the bit rate, signal format and modulation method of the target optical wavelength division multiplexed signal to be measured. Furthermore, the present embodiment can use a wider range of the optical signal bit rate than the fourth embodiment using the electric sampling. Moreover, although the nonlinear optical medium 11 must be applicable to all the optical signal wavelengths, that is, must possess a wide wavelength range, since the number of the optical multiplexer 31 and nonlinear optical medium 24 is one, the present embodiment has a simpler configuration than that of the first or fifth embodiment.

Ninth Embodiment

Figure 18:
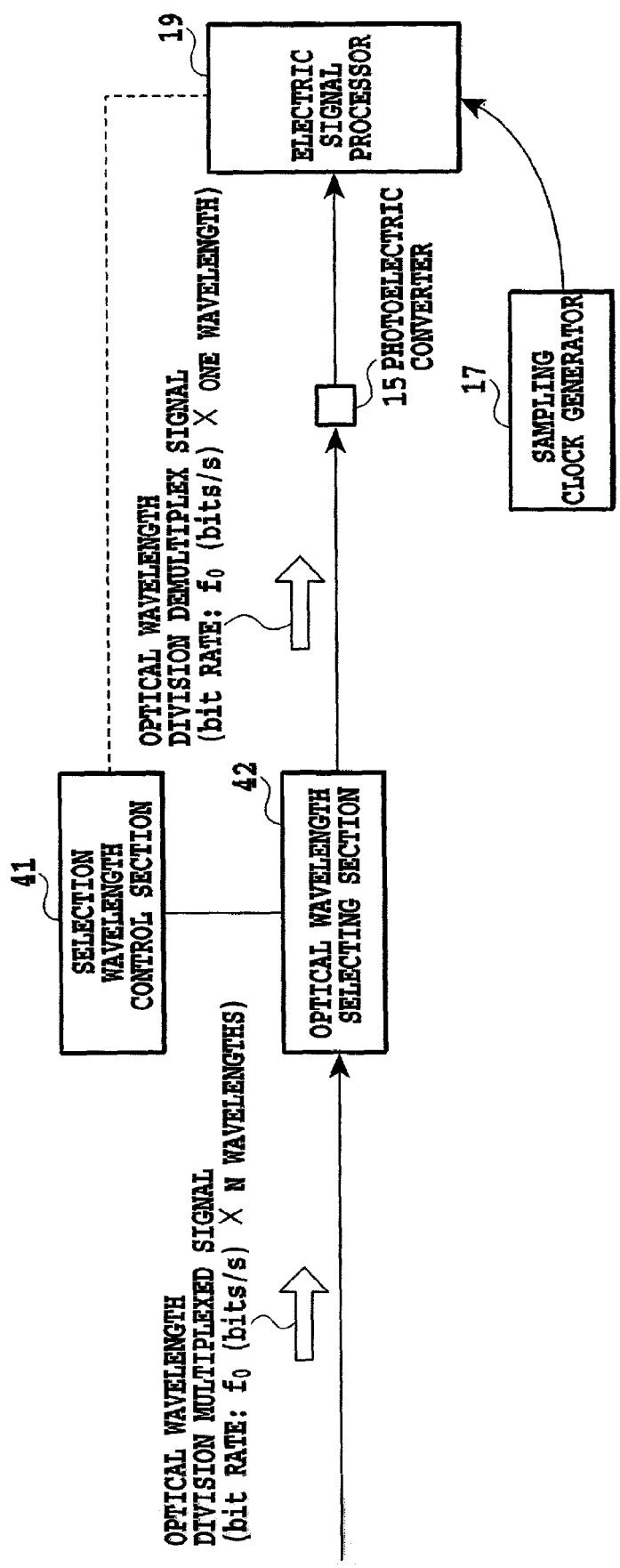
FIG. 18 is a block diagram showing a configuration of an optical wavelength division multiplexed signal monitoring apparatus of a ninth embodiment in accordance with the present invention.

FIG. 18 shows a configuration of an optical wavelength division multiplexed signal monitoring apparatus of a ninth embodiment in accordance with the present invention. The optical wavelength division multiplexed signal monitoring apparatus of the present embodiment comprises an optical wavelength selecting section 42, a selection wavelength control section 41, a single photoelectric converter 15, a sampling clock generator 17 and an electric signal processor 19.

The optical wavelength selecting section 42 selects any one of the channels from the optical wavelength division multiplexed signal consisting of N optical signals with the bit rate $f_0$ (bits/s), which are wavelength multiplexed, where N is an integer greater than one, and carries out the optical wavelength division demultiplexing. The selection wavelength control section 41 controls the wavelength the optical wavelength selecting section 42 selects. The photoelectric converter 15 receives the one-channel optical wavelength division demultiplexed singal the optical wavelength selecting section 42 selects and demultiplexes, and converts it into the electric intensity modulated signal.

The sampling clock generator 17 generates the sampling clock signal whose repetition frequency is $f_1$ (Hz) ($f_1=(n/m)f_0+a$, where n and m are a natural number, and a is an offset frequency). The electric signal processor 19 samples the one-channel electric intensity modulated signal output from the photoelectric converter 15 by the sampling clock signal supplied from the sampling clock generator 17, obtains the optical signal intensity distribution from the sampled signal, and evaluates the optical signal quality parameter from the optical signal intensity distribution. Although the detail of the evaluation method of the quality evaluation parameter will be described later, the known quality evaluation parameter evaluation method disclosed in the reference material [2] is applicable.

In the configuration, the optical wavelength selecting section 42 demultiplexes any one channel from the optical wavelength division multiplexed signal with the bit rate $f_0$ (bits/s). The photoelectric converter 15 receives the one-channel optical wavelength division demultiplexed singal, and converts it into an electric intensity modulated signal. The electric signal processor 19 employs the electric sampling method that measures the optical signal intensity distribution by sampling the intensity of the electric intensity modulated signal using the clock signal of the frequency $f_1$ (Hz) ($f_1=(N/M)f_0+a$, where a is an offset frequency) supplied from the sampling clock generator 17. The optical signal intensity distribution measurement by the electric sampling method can use a commercially available electric sampling apparatus.

The present embodiment implements the evaluation of the optical wavelength division multiplexed signal by performing the wavelength selection in the wavelength demultiplexing process using the optical wavelength selecting section 42 and selection wavelength control section 41 before the electric signal processor 19, and by sequentially evaluating the N wavelengths of the optical wavelength division multiplexed signal in the time-series fashion, thereby implementing the evaluation. As a result, the input to the electric signal processing section 19 can be composed of one channel, and the electric signal processor 19 can be composed of one buffer and one reading circuit, thereby being able to simplify the apparatus.

The present embodiment can monitor by a single circuit the optical signal quality degradation such as SNR degradation and waveform distortion regardless of the bit rate, signal format and modulation method of the target optical wavelength division multiplexed signal to be measured. In addition, the method of evaluating the optical signal quality parameter from the optical signal intensity distribution in the present embodiment has no wavelength dependence in the electric signal processing, and is a statistical method. Thus, it can carry out the processing in the time-series fashion. As a result, the electric signal processor 19 can be composed of one system, thereby being able to reduce the size and cost of the apparatus.

In addition, since the present embodiment employs the electric sampling, it can reduce the size of the apparatus as compared with the apparatus using the optical sampling method. However, the applicable optical signal bit rate is limited by the bandwidth of the photoelectric converter 15. Since the present embodiment comprises only one photoelectric converter 15, it can reduce its size and cost in its entirety.

10th Embodiment

Figure 19:
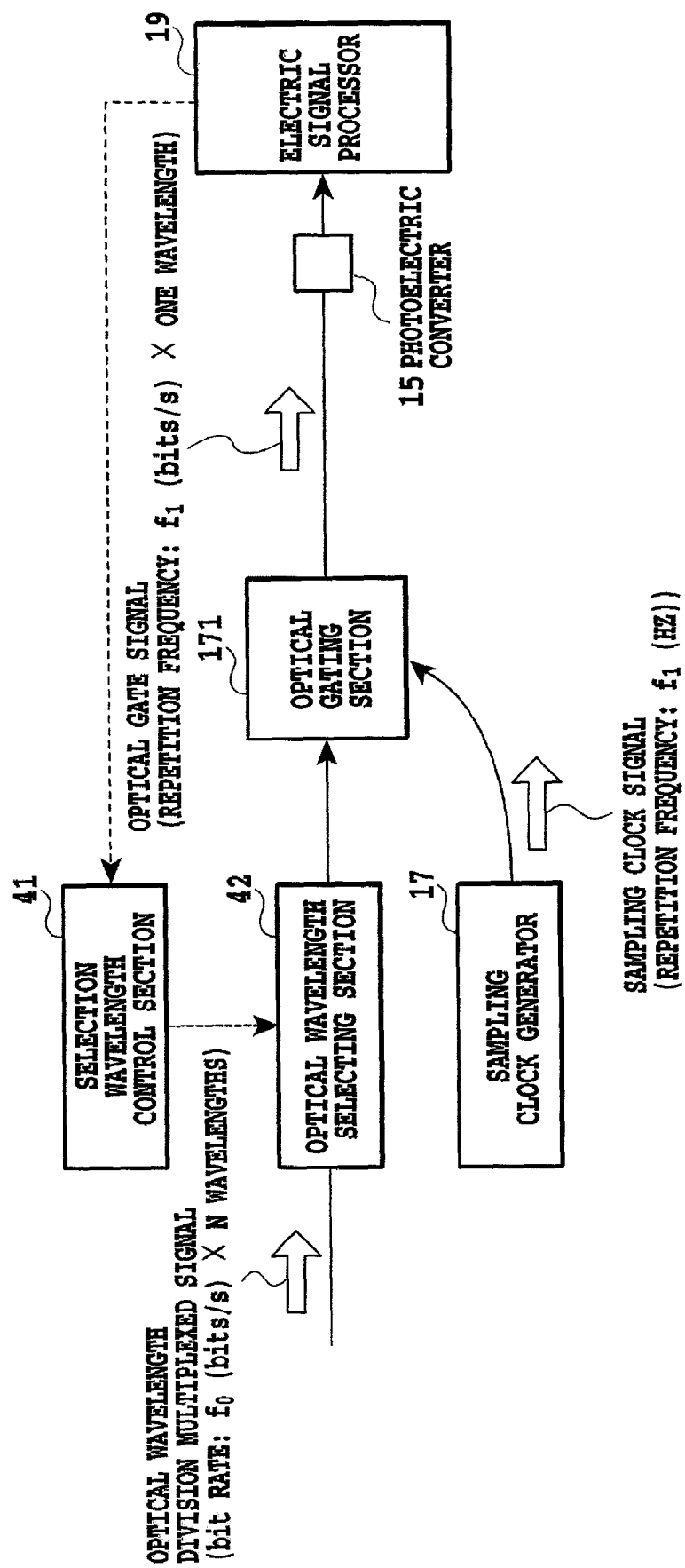
FIG. 19 is a block diagram showing a configuration of an optical wavelength division multiplexed signal monitoring apparatus of a 10th embodiment in accordance with the present invention.

FIG. 19 shows a configuration of an optical wavelength division multiplexed signal monitoring apparatus of a 10th embodiment in accordance with the present invention. The optical wavelength division multiplexed signal monitoring apparatus of the present embodiment comprises an optical wavelength selecting section 42, a selection wavelength control section 41, a sampling clock generator 17, a single optical gating section 171, a single photoelectric converter 15, and an electric signal processor 26.

Figure 20:
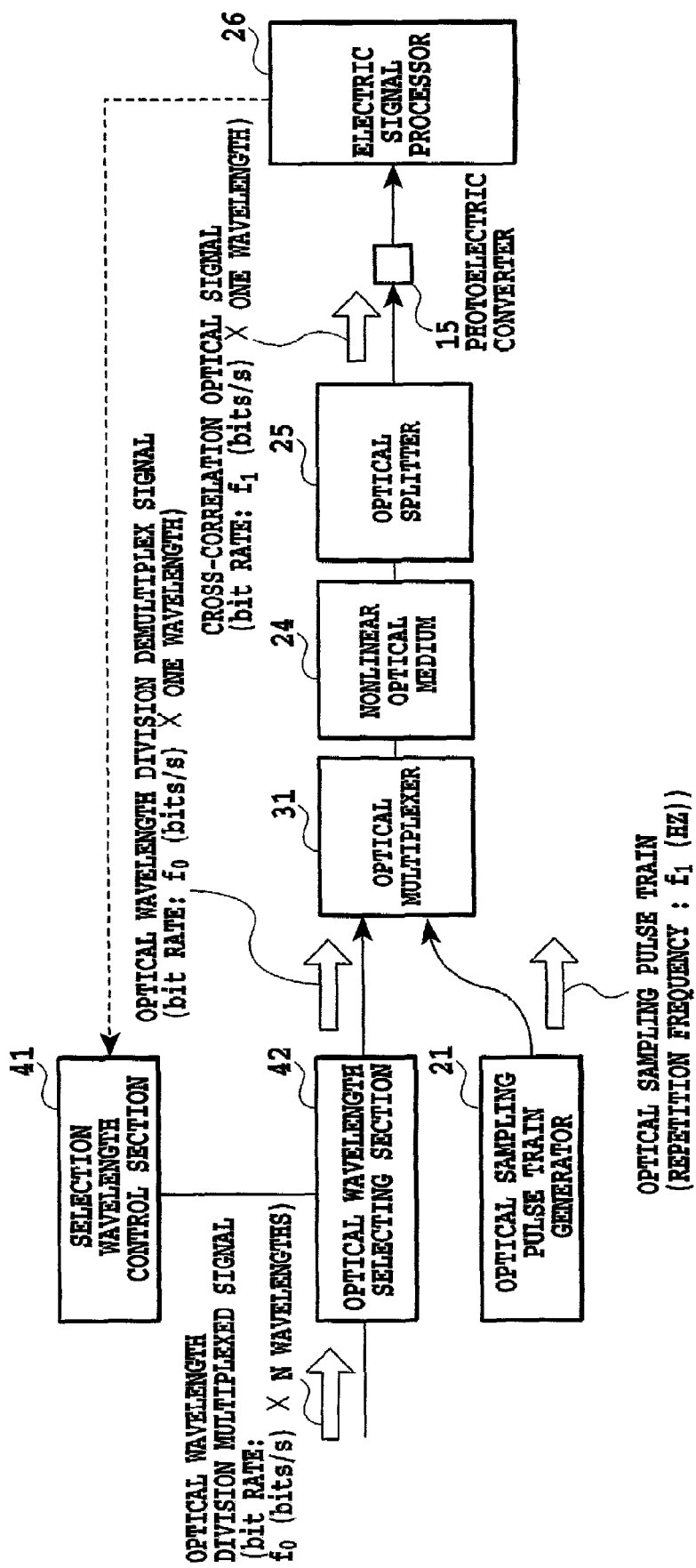
FIG. 20 is a block diagram showing a configuration of an optical wavelength division multiplexed signal monitoring apparatus of an 11th embodiment in accordance with the present invention.

The present embodiment is characterized by utilizing the optical gating section 171 and sampling clock generator 17, which are described in the fifth embodiment, instead of an optical sampling section (nonlinear optical medium 24, optical sampling pulse train generator 21 and optical splitter 25) which is shown in FIG. 20 in connection with the following 11th embodiment. As described below, the present embodiment carries out the optical sampling of the WDM signal by an optical clock signal, followed by the wavelength division demultiplexing, and the N-parallel optoelectric conversion, thereby implementing the single electric signal processor. Using the optical sampling all the way to the electric signal processing, the present embodiment can reduce the electric bandwidth of the electric signal processing.

The optical wavelength selecting section 42 selects any one of the channels from the optical wavelength division multiplexed signal consisting of N optical signals with the bit rate $f_0$ (bits/s), which are wavelength multiplexed, where N is an integer greater than one, and carries out the optical wavelength division demultiplexing. The selection wavelength control section 41 controls the wavelength the optical wavelength selecting section 42 selects. The sampling clock generator 17 generates the sampling clock signal whose repetition frequency is $f_1$ (Hz) ($f_1=(n/m)f_0+a$, where n and m are a natural number, and a is an offset frequency). The optical gating section 171 samples the intensity of the one-channel optical wavelength division demultiplexed singal, which is selected and demultiplexed by the optical wavelength selecting section 42, by using the sampling clock signal the sampling clock generator 17 outputs.

The photoelectric converter 15 receives the optical gate signal (repetition frequency of $f_1$ (bits/s)×one wavelength) the optical gating section 171 outputs, and converts it into an electric intensity modulated signal. The electric signal processor 26 obtains the optical signal intensity distribution from the one-channel electric intensity modulated signal output from the photoelectric converter 15, and evaluates the optical signal quality parameter from the optical signal intensity distribution. Although the detail of the evaluation method of the quality evaluation parameter will be described later, the known quality evaluation parameter evaluation method disclosed in the reference material [2] is applicable.

11th Embodiment

FIG. 20 shows a configuration of an optical wavelength division multiplexed signal monitoring apparatus of an 11th embodiment in accordance with the present invention. The optical wavelength division multiplexed signal monitoring apparatus of the present embodiment comprises an optical wavelength selecting section 42, a selection wavelength control section 41, an optical sampling pulse train generator 21, an optical multiplexer 31, a single nonlinear optical medium 24, a single optical splitter 25, a single photoelectric converter 15, and an electric signal processor 26.

The optical wavelength selecting section 42 selects any one of the channels from the optical wavelength division multiplexed signal consisting of N optical signals with the bit rate $f_0$ (bits/s), which are wavelength multiplexed, where N is an integer greater than one, and carries out the optical wavelength division demultiplexing. The selection wavelength control section 41 controls the wavelength the optical wavelength selecting section 42 selects. The optical sampling pulse train generator 21 generates the optical sampling pulse train whose repetition frequency is $f_1$ (Hz) ($f_1=(n/m)f_0+a$, where n and m are a natural number, and a is an offset frequency), and whose pulse width is sufficiently narrower than the time slot of the optical signal with the bit rate $f_0$ (bits/s). The optical multiplexer 31 combines one-channel optical wavelength division demultiplexed singal selected and demultiplexed by the optical wavelength selecting section 42 with the optical sampling pulse train output from the optical sampling pulse train generator 21.

The nonlinear optical medium 24 induces the nonlinear interaction between the optical wavelength division demultiplexed singal and the optical sampling pulse train combined by the optical multiplexer 31. The optical splitter 25 demultiplexes the cross-correlation optical signal, which is produced by the nonlinear interaction in the nonlinear optical medium 24, from the optical wavelength division demultiplexed singal and the optical sampling pulse train.

The photoelectric converter 15 receives the one-channel cross-correlation optical signal the optical splitter 25 outputs, and converts it to the electric intensity modulated signal. The electric signal processor 26 obtains the optical signal intensity distribution from the one-channel electric intensity modulated signal output from the photoelectric converter 15, and evaluates the optical signal quality parameter from the optical signal intensity distribution. Although the detail of the evaluation method of the quality evaluation parameter will be described later, the known quality evaluation parameter evaluation method disclosed in the reference material [2].

In the configuration, the optical wavelength selecting section 42, selection wavelength control section 41, optical sampling pulse train generator 21, optical multiplexer 31, single nonlinear optical medium 24, and single optical splitter 25, using the optical signal with the bit rate $f_0$ (bits/s) and the optical sampling pulse train whose repetition frequency is $f_1$ (Hz) ($f_1=(N/M)f_0+a$, a is an offset frequency) and whose pulse width is sufficiently narrower than the time slot of the optical signal, generates the cross-correlation signals with an optical frequency different from those of the two optical signals used.

Subsequently, after the photoelectric converter 15 carries out the opto-electric conversion of the cross-correlation optical signals, the electric signal processor 26 executes the optical sampling method of measuring the intensity distribution of the optical signals by performing the electric signal processing. The optical signal intensity distribution measurement by the optical sampling method can employ the optical sampling disclosed in the foregoing reference material [3]. The cross-correlation signals can be obtained by utilizing the second-order harmonic optical signal generation, sum frequency optical signal generation, difference frequency optical signal generation, or four wave mixing.

The present embodiment can monitor the optical signal quality degradation such as SNR degradation and waveform distortion by a single circuit regardless of the bit rate, signal format and modulation method of the target optical wavelength division multiplexed signal to be measured. Furthermore, the present embodiment implements the evaluation of the optical wavelength division multiplexed signal by sequentially evaluating the N wavelengths of the optical wavelength division multiplexed signal in the time-series fashion using the optical wavelength selecting section 42 and selection wavelength control section 41. In addition, the present embodiment can reduce the optical multiplexer 31, nonlinear optical medium 24, optical splitter 25, and photoelectric converter 15 into one system by employing as the nonlinear optical medium 24 the nonlinear optical medium with large generation efficiency of the cross-correlation signals over a wide bandwidth, and by monitoring the optical signal quality in the time-series fashion by the wavelength selecting section 42, thereby making it possible to reduce the size and cost of the entire circuit.

In addition, the present embodiment can use a wider range of the optical signal bit rate than the first and ninth embodiments where the electric sampling is used. Moreover, although the nonlinear optical medium 24 must be applicable to all the optical signal wavelengths, that is, must possess a wide wavelength range, since the number of the optical multiplexer 31, nonlinear optical medium 24 and photoelectric converter 15 is one, the present embodiment has a simpler configuration than that of the fifth or eighth embodiment.

12th Embodiment

Figure 21:
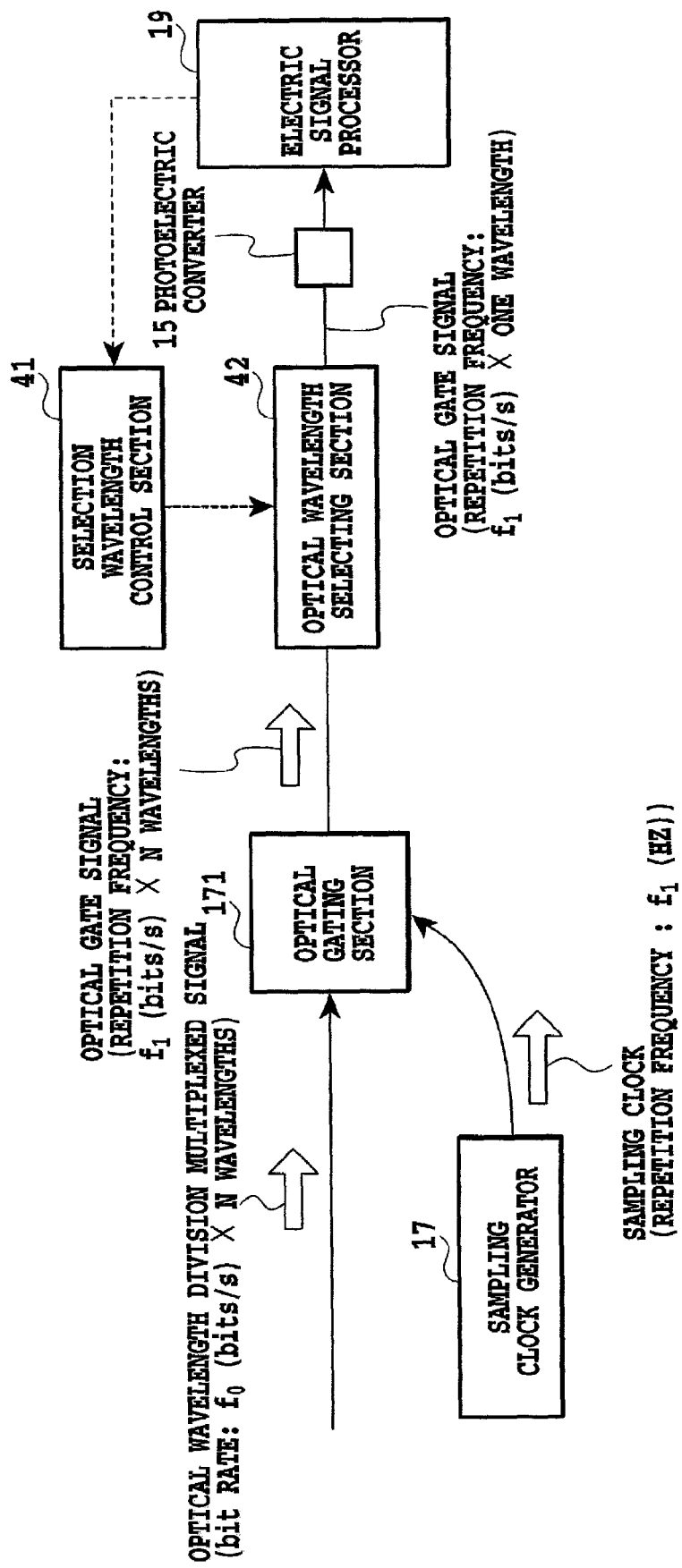
FIG. 21 is a block diagram showing a configuration of an optical wavelength division multiplexed signal monitoring apparatus of a 12th embodiment in accordance with the present invention.

FIG. 21 shows a configuration of an optical wavelength division multiplexed signal monitoring apparatus of a 12th embodiment in accordance with the present invention. The optical wavelength division multiplexed signal monitoring apparatus of the present embodiment comprises a sampling clock generator 17, a single optical gating section 171, an optical wavelength selecting section 42, a selection wavelength control section 41, a single photoelectric converter 15, and an electric signal processor 26. The present embodiment is characterized in that the optical wavelength selecting section 42 and selection wavelength control section 41 in the foregoing 10th embodiment are placed after the optical gating section 171.

The sampling clock generator 17 generates a sampling clock signal whose repetition frequency is $f_1$ (Hz) ($f_1=(n/m)f_0+a$, where n and m are a natural number, and a is an offset frequency). The optical gating section 171 samples the intensity of the optical wavelength division multiplexed signal, which consists of N optical signals with the bit rate $f_0$ (bits/s) which are wavelength multiplexed, where N is an integer greater than one, by using the sampling clock signal fed from the sampling clock generator 17. The optical wavelength selecting section 42 selects any one of the channels from the gate signals with a repetition frequency $f_1$ (bits/s)×N wavelengths, which are output from the optical gating section 171, and carries out the optical wavelength division demultiplexing. The selection wavelength control section 41 controls the wavelength the optical wavelength selecting section 42 selects.

The photoelectric converter 15 receives the optical gate signal (repetition frequency of $f_1$ (bits/s)×one wavelength) the optical wavelength selecting section 42 outputs, and converts it into an electric intensity modulated signal. The electric signal processor 26 obtains the optical signal intensity distribution from the one-channel electric intensity modulated signal output from the photoelectric converter 15, and evaluates the optical signal quality parameter from the optical signal intensity distribution. Although the detail of the evaluation method of the quality evaluation parameter will be described later, the known quality evaluation parameter evaluation method disclosed in the reference material [2] is applicable.

13th Embodiment

Figure 22:
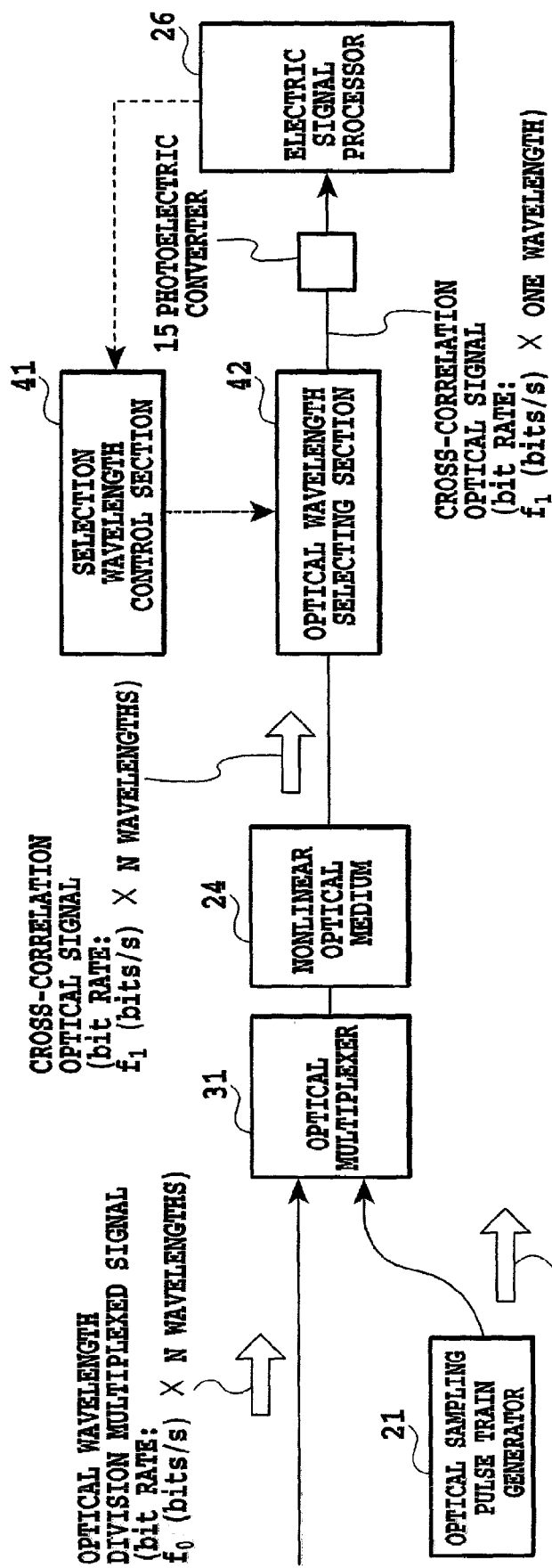
FIG. 22 is a block diagram showing a configuration of an optical wavelength division multiplexed signal monitoring apparatus of a 13th embodiment in accordance with the present invention.

FIG. 22 shows a configuration of an optical wavelength division multiplexed signal monitoring apparatus of a 13th embodiment in accordance with the present invention. The optical wavelength division multiplexed signal monitoring apparatus of the present embodiment comprises an optical sampling pulse train generator 21, an optical multiplexer 31, a single nonlinear optical medium 24, an optical wavelength selecting section 42, a selection wavelength control section 41, a single photoelectric converter 15, and an electric signal processor 26. The present embodiment is characterized in that it lacks the optical splitter of the 11th embodiment, but comprises the optical wavelength selecting section 42 and selection wavelength control section 41 after the nonlinear optical medium 24.

The optical sampling pulse train generator 21 generates an optical sampling pulse train whose repetition frequency is $f_1$ (Hz) ($f_1=(n/m)f_0+a$, where n and m are a natural number, and a is an offset frequency), and whose pulse width is sufficiently narrower than the time slot of the optical signal with the bit rate $f_0$ (bits/s). The optical multiplexer 31 combines the optical sampling pulse train generated by the optical sampling pulse train generator 21 with the optical wavelength division multiplexed signal consisting of N optical signals with the bit rate $f_0$ (bits/s) which are wavelength multiplexed, where N is an integer greater than one.

The nonlinear optical medium 24 induces the nonlinear interaction between the optical wavelength division multiplexed signal output from the optical multiplexer 31 and the optical sampling pulse train. The optical wavelength selecting section 42 selects any one of the channels from the cross-correlation optical signal with the bit rate $f_0$ (bits/s)×N wavelengths which are output from the nonlinear optical medium 24, and carries out the optical wavelength division demultiplexing. The selection wavelength control section 41 controls the wavelength to be selected by the optical wavelength selecting section 42.

The photoelectric converter 15 receives the one-channel cross-correlation optical signal the optical wavelength selecting section 42 outputs, and converts it to the electric intensity modulated signal. The electric signal processor 26 obtains the optical signal intensity distribution from the one-channel electric intensity modulated signal output from the photoelectric converter 15, and evaluates the optical signal quality parameter from the optical signal intensity distribution. Although the detail of the evaluation method of the quality evaluation parameter will be described later, the known quality evaluation parameter evaluation method disclosed in the reference material [2] is applicable.

14th Embodiment

Figure 23:
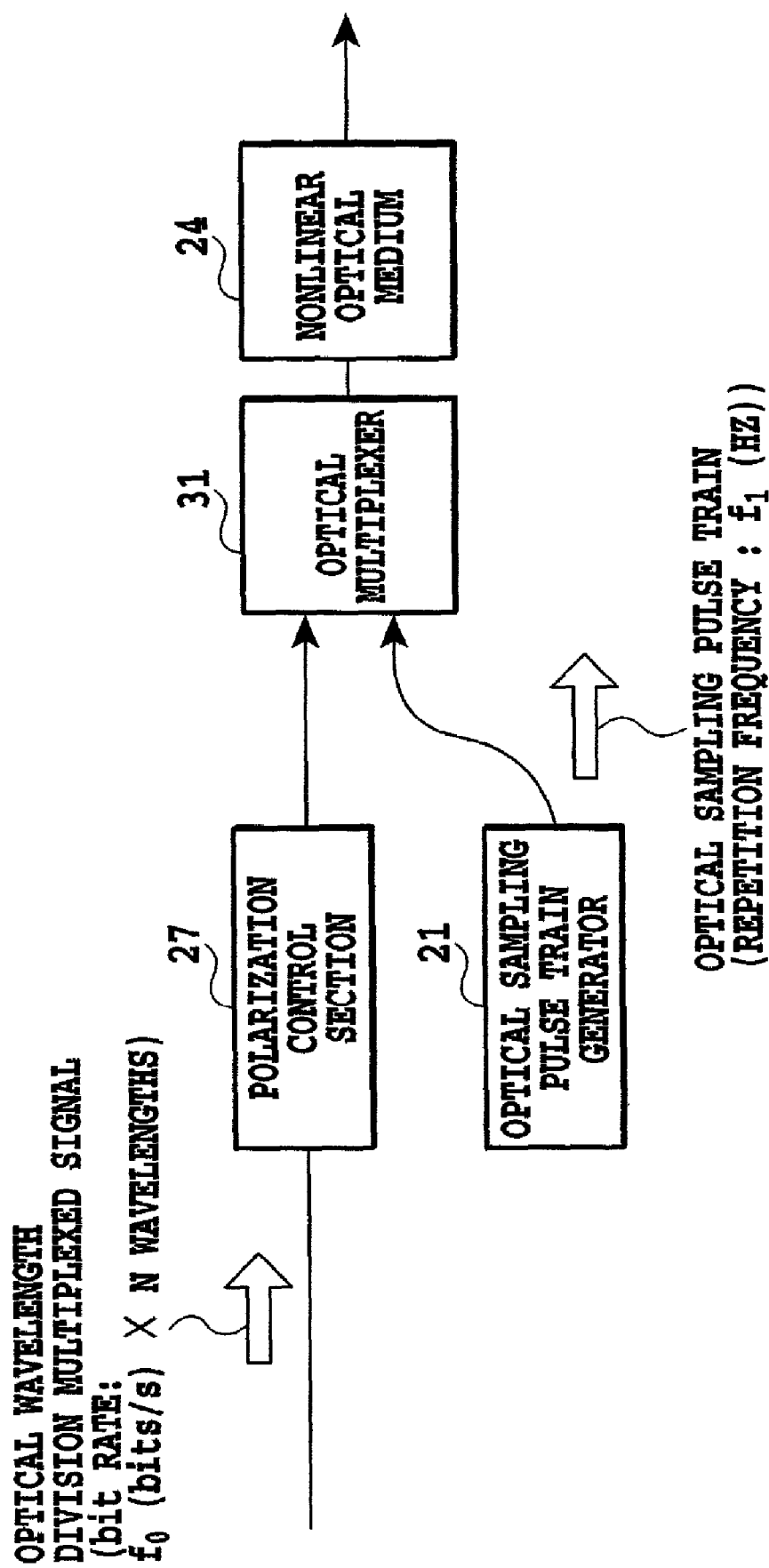
FIG. 23 is a block diagram showing a configuration of an optical wavelength division multiplexed signal monitoring apparatus of a 14th embodiment in accordance with the present invention.

FIG. 23 shows, as a 14th embodiment in accordance with the present invention, a configuration of the optical sampling process section in the optical wavelength division multiplexed signal monitoring apparatus (the portion using the optical sampling pulse train generator 21, optical multiplexer 31, and nonlinear optical medium 24) in the eighth and 13th embodiments in accordance with the present invention. The configuration of the present embodiment is characterized by comprising a polarization control section 27 for controlling the polarization state of the optical wavelength division multiplexed signal in the optical sampling process. The polarization control section 27 controls the polarization state of all the channels of the optical wavelength division multiplexed signal in their entirety, and enables them to maintain fixed polarization relationships with the polarization state of the optical sampling pulse train output from the optical sampling pulse train generator 21.

When the optical sampling process section is composed of the optical gating section 171 and sampling clock generator 17 as shown in FIGS. 16 and 21 of the seventh and 12th embodiments, the polarization control section 27 is used in accordance with the polarization dependence of the electro-absorption optical modulator the optical gating section 171 employs. As the polarization control section 27, a single polarization controller is available. When the polarization state of the individual channels of the optical wavelength division multiplexed signal differ from each other, two or more polarization controllers can be used in combination with the optical wavelength division demultiplexer, and optical wavelength division multiplexer (not shown).

In contrast, only one polarization control section 27 is required when one channel (one wavelength) optical signal rather than the optical wavelength division multiplexed signal is launched into the nonlinear optical medium as in the fourth and 11th embodiments as shown in FIGS. 10 and 20, or into the optical gating section 171 as in the fifth and 10th embodiments as shown in FIGS. 11 and 19.

15th Embodiment

Figure 24:
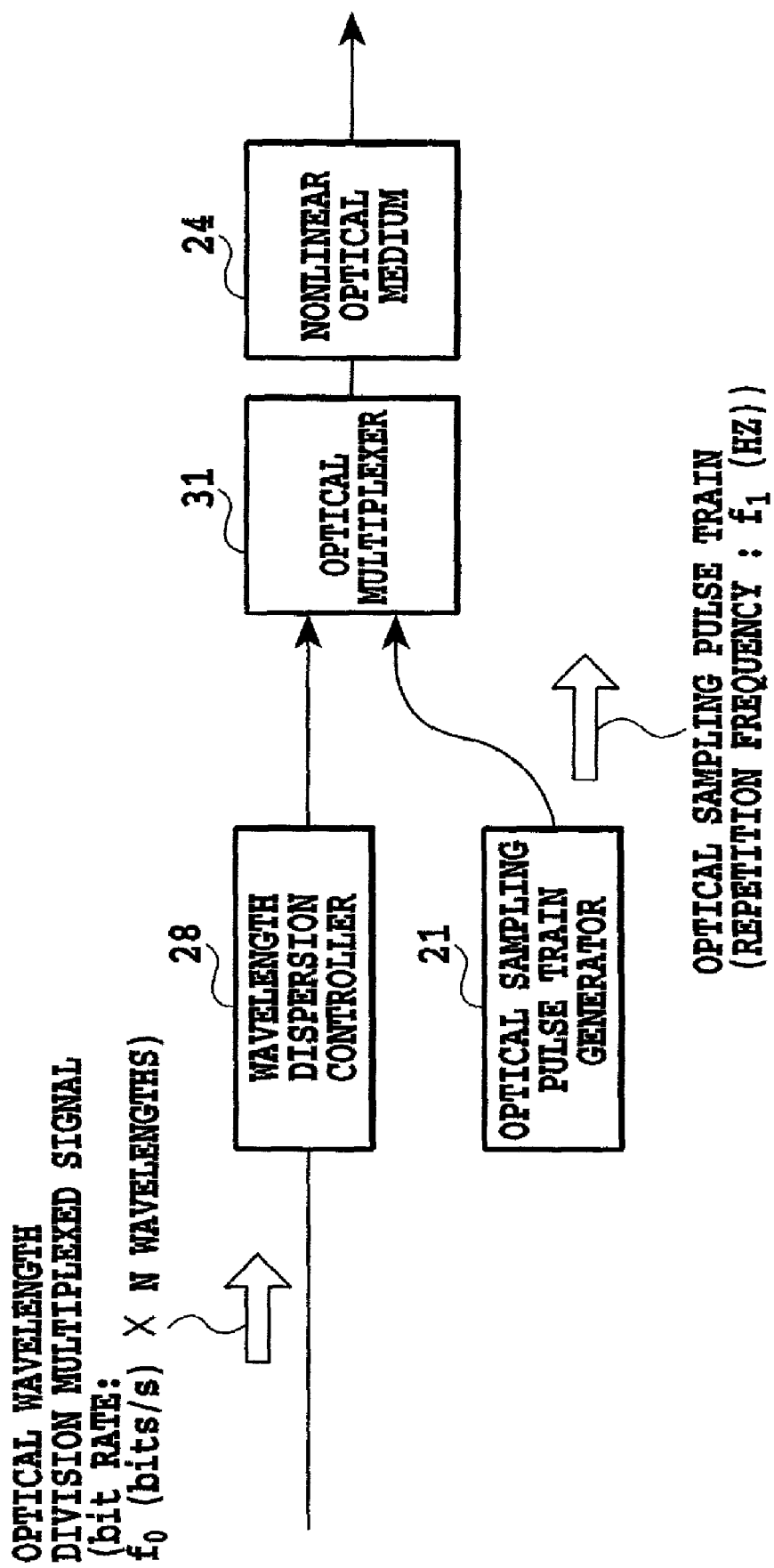
FIG. 24 is a block diagram showing a configuration of an optical wavelength division multiplexed signal monitoring apparatus of a 15th embodiment in accordance with the present invention.

FIG. 24 shows, as a 15th embodiment in accordance with the present invention, another configuration of the optical sampling process section in the optical wavelength division multiplexed signal monitoring apparatus (the portion using the optical sampling pulse train generator 21, optical multiplexer 23 or 31, and nonlinear optical medium 24) in the fifth, eighth, 11th and 13th embodiments in accordance with the present invention. The configuration of the present embodiment is characterized by comprising a wavelength dispersion controller 28 for controlling the wavelength dispersion of the optical wavelength division multiplexed signal in the optical sampling process. The wavelength dispersion controller 28 controls the wavelength dispersion of all the channels of the optical wavelength division multiplexed signal in their entirety. As the wavelength dispersion controller 28, a single wavelength dispersion compensator is available. Two or more wavelength dispersion compensators can also be used in combination with the optical wavelength division demultiplexer, and optical wavelength division multiplexer (not shown). As the wavelength dispersion compensator, an optical fiber, fiber grating, or phase control type wavelength dispersion compensator is applicable. In addition, only one wavelength dispersion compensator is required when one channel (one wavelength) optical signal rather than the optical wavelength division multiplexed signal is launched into the nonlinear optical medium as in the fourth and 11th embodiments as shown in FIGS. 10 and 20.

The following are concrete examples of the evaluation method of the quality evaluation parameter, which is carried by the electric signal processor 19 or 26 in the foregoing first to 15th embodiments.

16th Embodiment

Figure 25A:
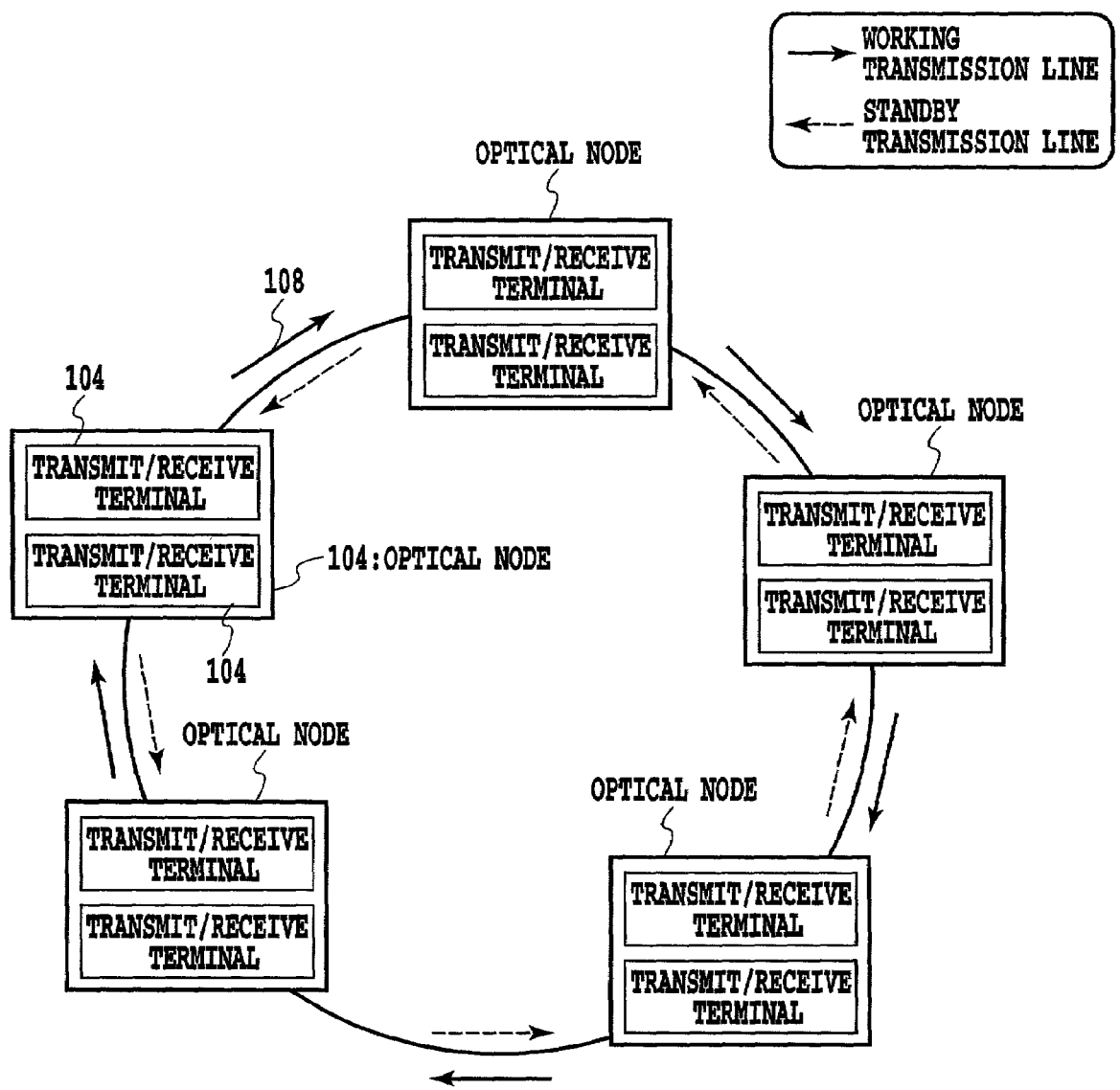
Figure 25B:
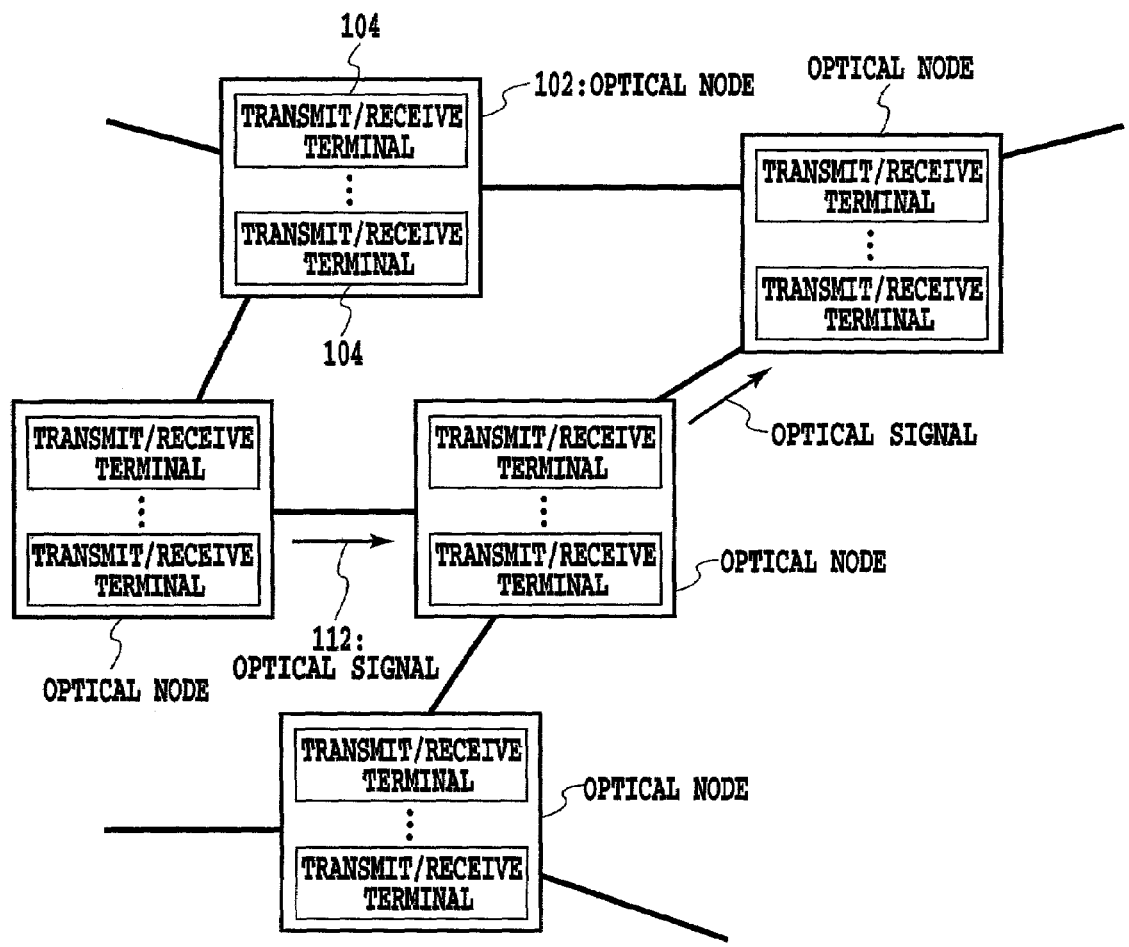

FIGS. 25A and 25B each show an optical network configuration of a 16th embodiment in accordance with the present invention: FIG. 25A shows a ring type optical network with a standby circuit, including optical ADM ring; and FIG. 25B shows a mesh type optical network.

Both the optical networks have a hierarchical structure including an optical layer that can accommodate electric signals with a variety of modulation methods, formats and bit rates such as a SONET/SDH frame, ATM cell or IP packet by converting them into an optical signal with a suitable carrier wavelength. Each optical node 102 constituting the optical network includes a pair of or multiple pairs of optical signal transmit terminal and optical signal receive terminal (transmit/receive terminal 104). An optical signal is terminated between the optical signal transmit terminal 104 of an optical node and the optical signal receive terminal 104 of another optical node. In addition, each optical signal termination forms an optical signal route independent of the modulation method, format and bit rate. The optical networks include the case where the optical signal passes through the optical node 102. Besides, it includes the case where optical amplifying repeating is carried out between the optical transmit/receive terminals 104.

As described later, the present invention carries out the optical signal monitoring in the optical signal receive terminal, transmits the monitor information to the optical signal transmit terminal using a control channel between the optical transmit/receive terminals, and performs optical signal switching in response to the monitor information.

Figure 26B:
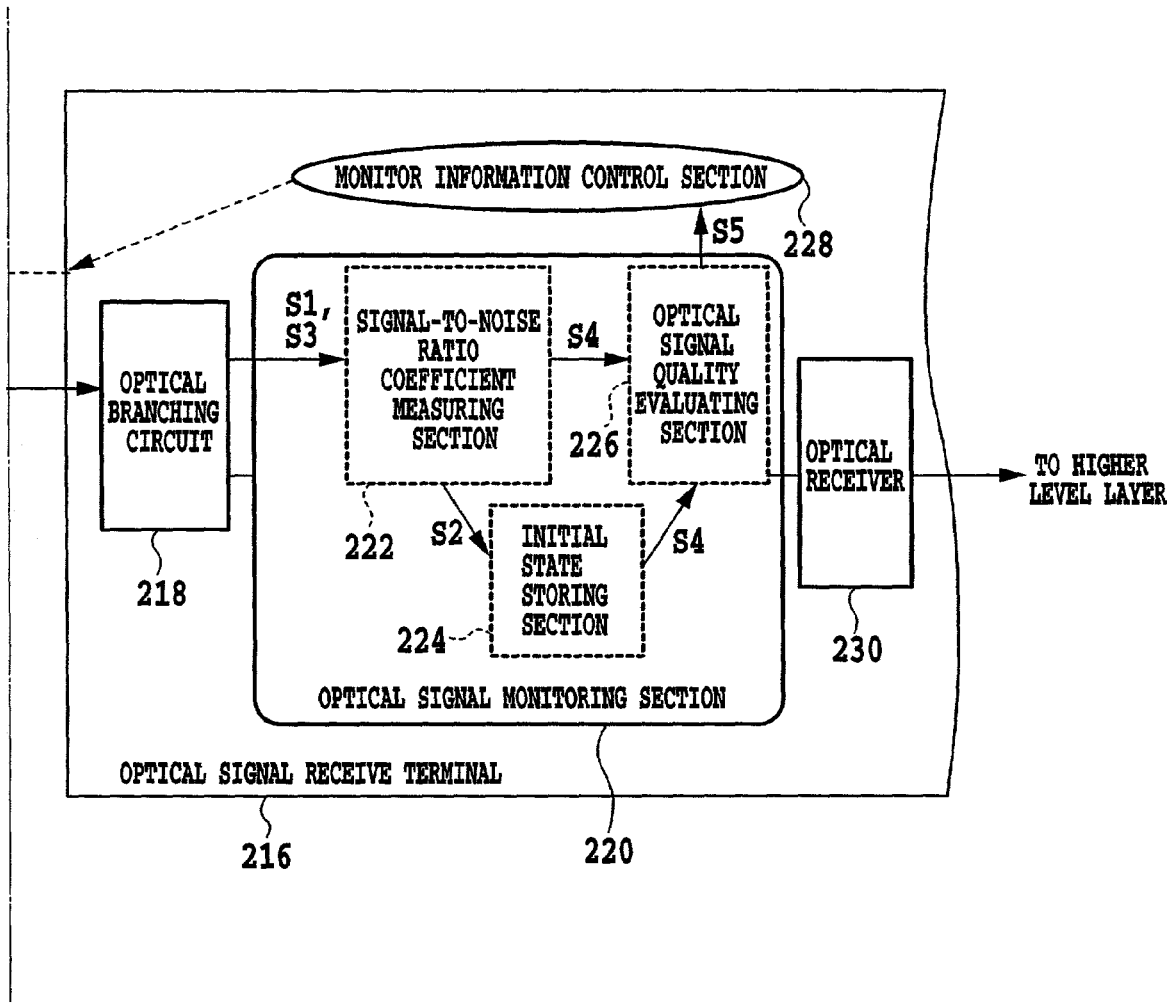

FIGS. 26A and 26B show a configuration of the optical transmit/receive terminal 104 of the present embodiment. Receiving a signal from a higher level optical layer, the optical transmitter 204 of the optical signal transmit terminal 202 sends it to the transmission line 212 via the route switching section 206. In the optical signal receive terminal 216, the optical branching circuit 218 extracts part of the input optical signal so that an optical signal monitoring section 220 monitors the optical signal by utilizing the optical signal extracted.

It is assumed here that the optical branching circuit 218 corresponds to the configuration without the electric signal processor 19 or 26 of FIGS. 10–20 of the foregoing fourth, fifth, seventh, eighth and 11th embodiments in accordance with the present invention. The optical signal monitoring section 220 corresponds to the section in the electric signal processor 19 or 26 that carries out the quality evaluation parameter of the foregoing fourth, fifth, seventh, eighth and 11th embodiments in accordance with the present invention.

The optical signal monitoring section 220, which comprises a signal-to-noise ratio coefficient measuring section 222, an initial state storing section 224 and an optical signal quality evaluating section 226, carries out the analog monitoring independent of the optical signal modulation method, format and bit rate. The signal-to-noise ratio coefficient measuring section 222 measures the signal-to-noise ratio coefficient of the optical signal transmitted through the transmission line 212 between the optical signal transmit terminal 202 of an optical node and the optical signal receive terminal 216 of another optical node. The initial state storing section 224 stores the signal-to-noise ratio coefficient the signal-to-noise ratio coefficient measuring section 222 measured at the system installation in a state without any fault. The optical signal quality evaluating section 226 compares the signal-to-noise ratio coefficient the signal-to-noise ratio coefficient measuring section 222 measures at every predetermined time interval during the system operation with the signal-to-noise ratio coefficient the initial state storing section 224 stores at the system installation.

A control channel 214 for transmitting the monitor information from the optical signal monitoring section 220 to the optical signal transmit terminal 202 is installed besides the transmission line 212 between the optical signal receive terminal 216 of an optical node and the optical signal transmit terminal 202 of another optical node. In addition, the optical signal receive terminal 216 and optical signal transmit terminal 202 comprise monitor information control sections 228 and 210, respectively. The monitor information control sections 228 and 210 each recognize a network failure from the optical signal degradation or optical signal waveform distortion caused by a fault of the transmission line 212 in accordance with the optical signal quality evaluation by the optical signal quality evaluating section 226, and exchanges the monitor information including the recognized information via the control channel 214.

The optical signal transmit terminal 202 comprises the route switching section 206. The route switching section 206 carries out the route switching of the transmission line 212 in accordance with the monitor information fed from the monitor information control section 210, thereby recovering the network failure.

Figure 27:
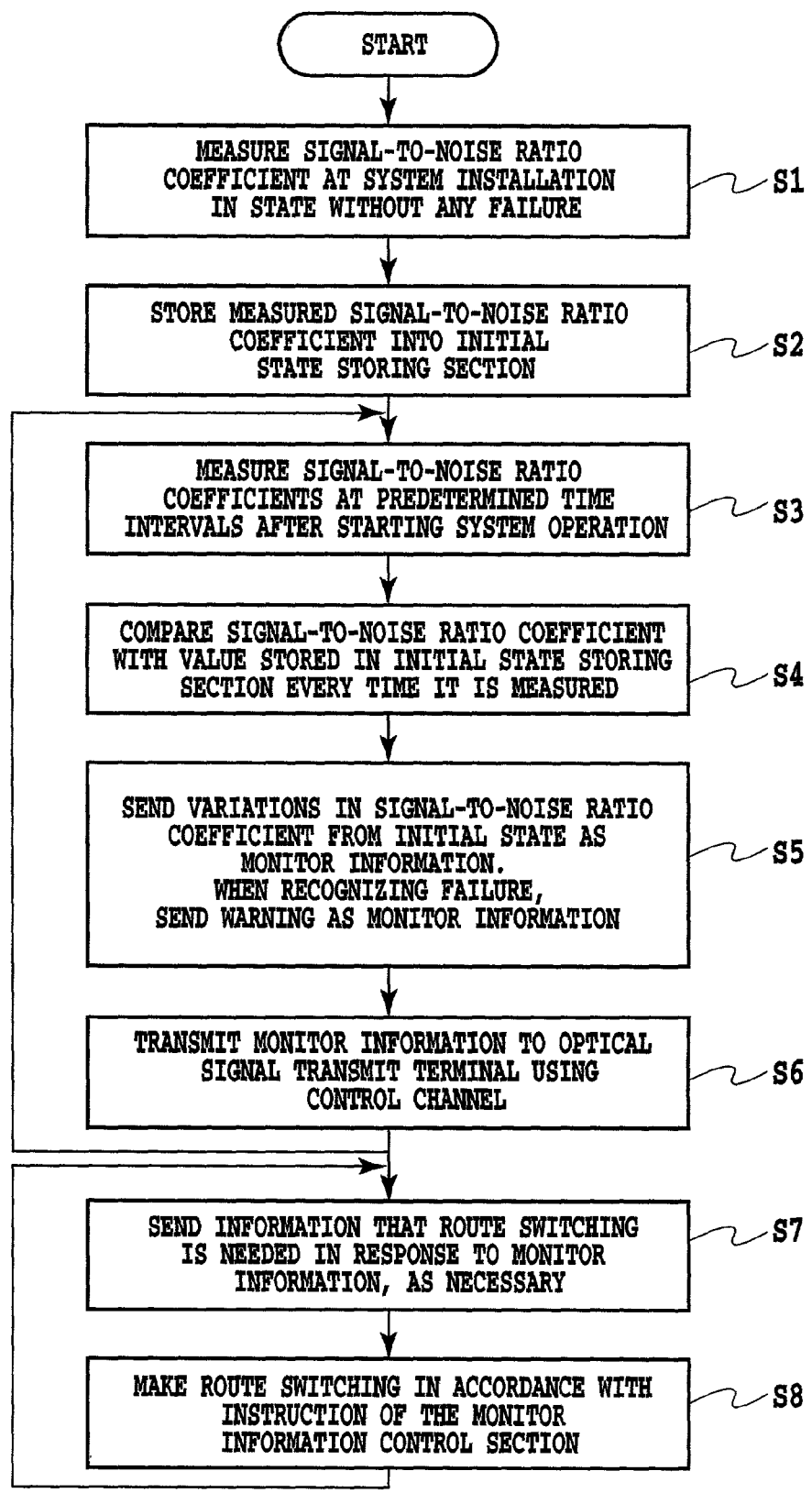
FIG. 27 is a flowchart illustrating a procedure of route control in an optical signal monitoring system of the 16th embodiment in accordance with the present invention.

FIG. 27 illustrates the operation procedure of the route control by the optical signal monitoring system in the 16th embodiment in accordance with the present invention.

Step S1: The signal-to-noise ratio coefficient measuring section 222 measures the signal-to-noise ratio coefficient at the system installation in a state without any failure.

Step S2: The initial state storing section 224 stores the signal-to-noise ratio coefficient measured at Step S1.

Step S3: The signal-to-noise ratio coefficient measuring section 222 measures the signal-to-noise ratio coefficient at the predetermined time intervals after starting the system operation.

Step S4: The optical signal quality evaluating section 226 compares the signal-to-noise ratio coefficient with that of the initial state storing section 224 every time it is measured.

Step S5: The optical signal quality evaluating section 226 supplies the monitor information control section 228 with the variations in the signal-to-noise ratio coefficient from the initial state as the monitor information. When it recognizes from the degree of variations in the signal-to-noise ratio coefficient that a failure takes place, it also supplies the monitor information control section 228 with warning information indicating that the route switching is required as the monitor information.

Step S6: The monitor information control section 228 transmits the monitor information to the monitor information control section 210 in the optical signal transmit terminal 202 via the control channel 214.

Step S7: The monitor information control section 210 of the optical signal transmit terminal 202 supplies the route switching section 206 with the information that the route switching is needed in response to the monitor information, if necessary.

Step S8: The route switching section 206 carries out the route switching of the transmission line 212 in accordance with the instruction of the monitor information control section 210.

As the signal-to-noise ratio coefficient measuring section 222, it is possible to use the optical signal quality monitoring described in the reference material [2]. It does not require receiving systems corresponding to the bit rate, signal format and modulation method (that is, the clock extracting circuit, receiving circuit, frame detection circuit, and error detection circuit consisting of a parity check circuit or comparing circuit), and can handle signals with any bit rate, signal format and modulation method by a single receiving system.

Figure 28:
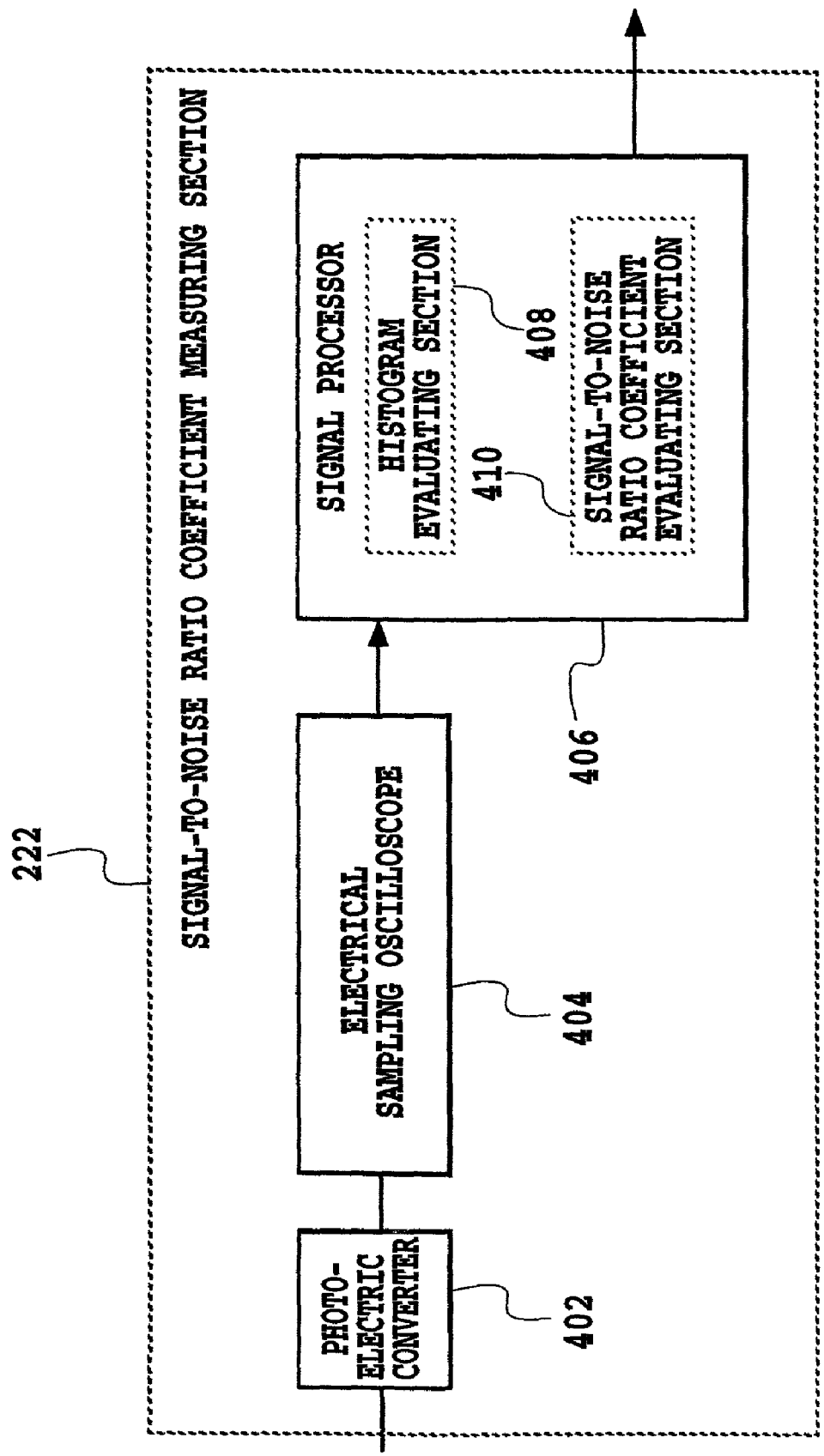
FIG. 28 is a block diagram showing a configuration of a signal-to-noise ratio coefficient measuring section when using an electrical sampling oscilloscope in the individual embodiments in accordance with the present invention.
Figure 29:
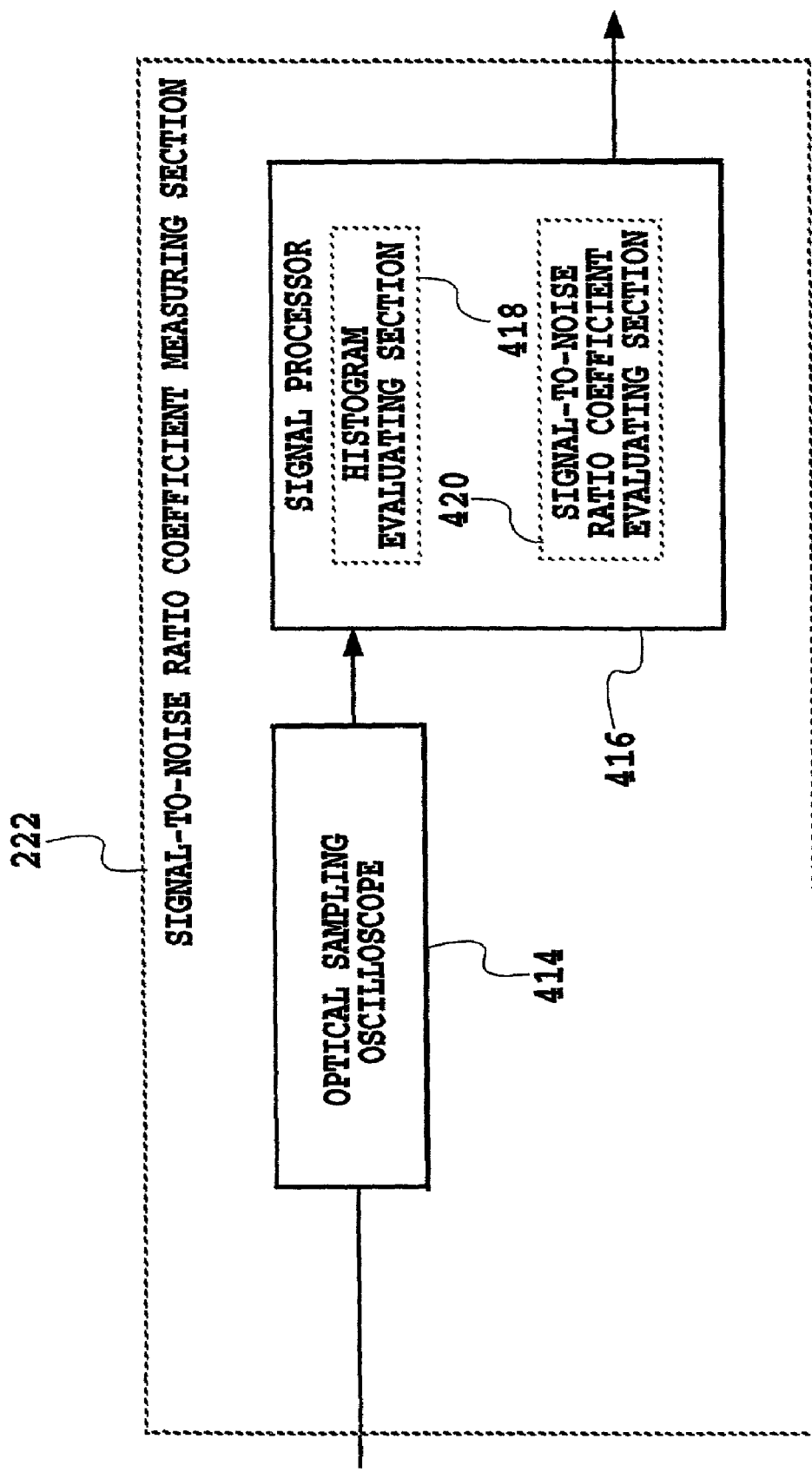
FIG. 29 is a block diagram showing a configuration of a signal-to-noise ratio coefficient measuring section when using an optical sampling oscilloscope in the individual embodiments in accordance with the present invention.

FIGS. 28 and 29 each show a configuration of the signal-to-noise ratio coefficient measuring section 222 utilizing the optical signal quality monitoring: FIG. 28 shows the configuration using an electrical sampling oscilloscope 404; and FIG. 29 shows the configuration using the optical sampling oscilloscope 414.

In the configuration of FIG. 28 using the electrical sampling oscilloscope 404, a photoelectric converter 402 converts an optical intensity modulation signal with the bit rate $f_0$ (bits/s) into an electric intensity modulated signal; an electrical sampling oscilloscope 404 samples the intensity of the electric intensity modulated signal at the clock signal frequency $f_1$ (Hz) ($f_1=(N/M)f_0+a$, where N and M are an integer, and a is an offset frequency) to obtain the signal intensity distribution in a fixed time period; and a signal processor 406 carries out the signal-to-noise ratio coefficient evaluation. The signal processor 406 comprises a histogram evaluating section 408 and a signal-to-noise ratio coefficient evaluating section 410. The histogram evaluating section 408 obtains the amplitude histogram from the signal intensity distribution the electrical sampling oscilloscope 404 produces. The signal-to-noise ratio coefficient evaluating section 410 calculates from the amplitude histogram the distributions of the binary digital code "level 1" and "level 0", and evaluates the signal-to-noise ratio coefficient that is calculated as the ratio of the difference between the mean values of the intensities at the "level 1" and "level 0" to the sum of the standard deviations at the "level 1" and "level 0".

Although the configuration of FIG. 28 is simple, the applicable optical signal bit rate is limited by the bandwidth of the photoelectric converter 402.

On the other hand, in the configuration employing the optical sampling oscilloscope 414 as shown in FIG. 29, the optical sampling oscilloscope 414 obtains the signal intensity distribution in a fixed time period, and then the signal processor 416 carries out the signal-to-noise ratio coefficient evaluation. The optical sampling oscilloscope 414 can use for the optical signal intensity distribution measurement the optical sampling described in the reference material [3].

The optical sampling is characterized by utilizing the second-order harmonic optical signal generation, sum frequency optical signal generation, difference frequency optical signal generation, or four wave mixing to obtain the cross-correlation signal, and obtains the signal intensity distribution from the cross-correlation signal.

For example, the optical sampling oscilloscope 414, using the optical signal with the bit rate $f_0$ (bits/s) and the optical sampling pulse train whose repetition frequency is $f_1$ (Hz) ($f_1=(N/M)f_0+a$, where N and M are an integer, and a is an offset frequency), and whose pulse width is sufficiently narrower than the time slot of the optical signal, generates the cross-correlation optical signal with an optical frequency different from that of the two optical signals, converts the cross-correlation optical signal into an electric signal, carries out the opto-electric conversion of the cross-correlation optical signal, and then measures the intensity distribution of the optical signal in the fixed time period by performing the electric signal processing.

The signal processor 416 comprises a histogram evaluating section 418 and a signal-to-noise ratio coefficient evaluating section 420. The histogram evaluating section 418 obtains the amplitude histogram from the signal intensity distribution the optical sampling oscilloscope 414 produces. The signal-to-noise ratio coefficient evaluating section 420 calculates from the amplitude histogram the distributions of the binary digital code at the "level 1" and "level 0", and evaluates the signal-to-noise ratio coefficient that is calculated as the ratio of the difference between the mean values of the intensities at the "level 1" and "level 0" to the sum of the standard deviations at the "level 1" and "level 0".

The configuration of FIG. 29 is applicable to faster optical signal than that of FIG. 28 is.

Next, FIGS. 30A–33B illustrate examples of the signal-to-noise ratio coefficient measurement algorithm of the signal-to-noise ratio coefficient measuring section 222 for carrying out the optical signal quality monitoring.

Figure 30A:
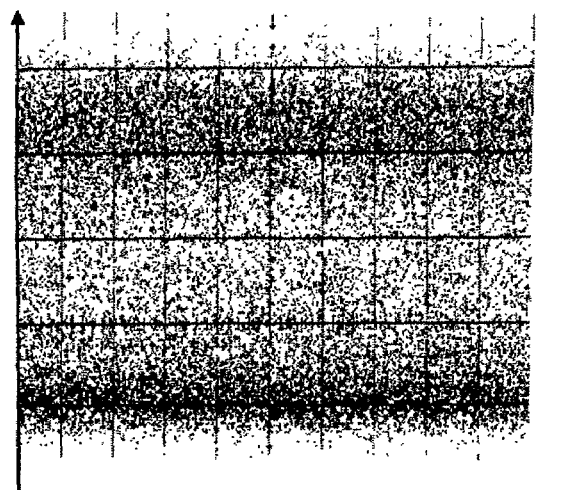
FIGS. 30A and 30B are schematic diagrams illustrating an initial stage of signal-to-noise ratio coefficient measuring algorithm of the 16th embodiment in accordance with the present invention.

FIG. 30A: The optical sampling oscilloscope 414 and the electrical sampling oscilloscope 404 obtain the intensity distribution within a certain mean time by the optical sampling and electric sampling, respectively.

Figure 30B:
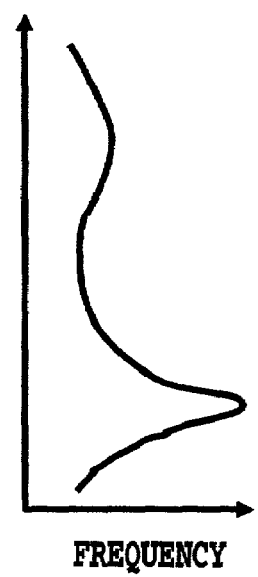
Figure 30B:
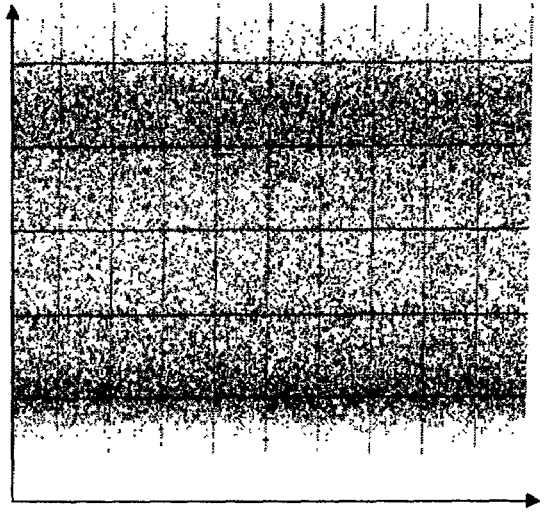

FIG. 30B: Obtain the amplitude histogram from the intensity distribution calculated.

Figure 31A:
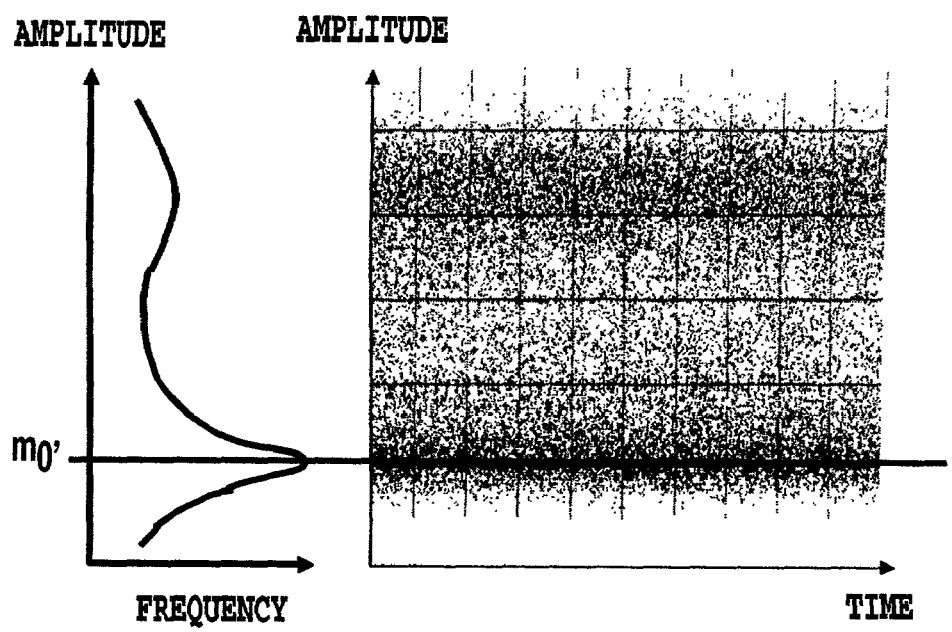
FIGS. 31A and 31B are schematic diagrams illustrating the signal-to-noise ratio coefficient measuring algorithm following that of FIGS. 30A and 30B in the 16th embodiment in accordance with the present invention.

FIG. 31A: Decide a relative maximum value m0' when searching the amplitude histogram from its smallest intensity level.

Figure 31B:
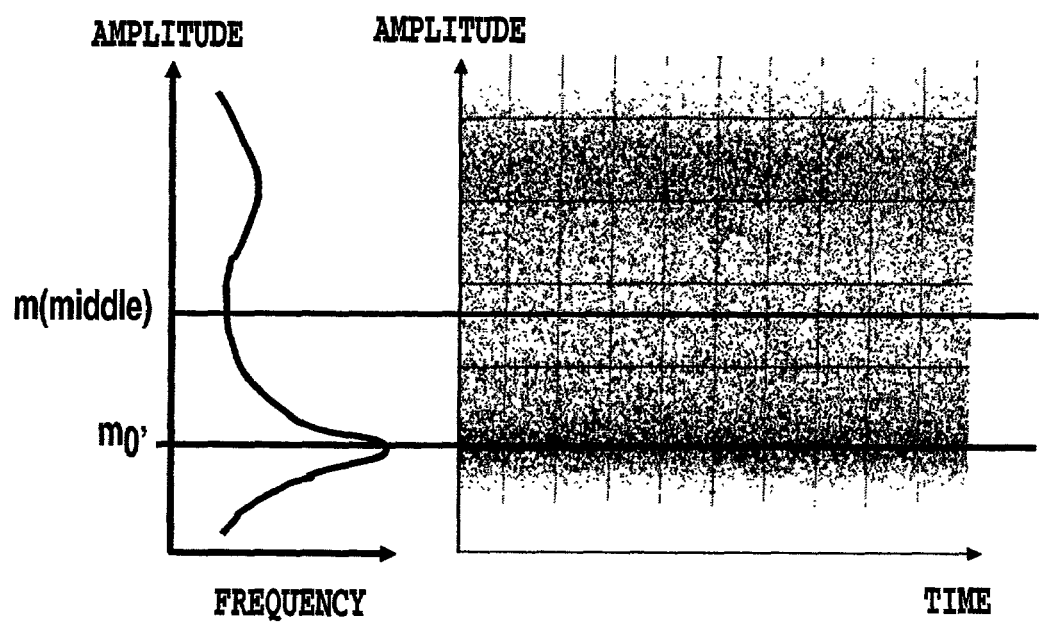

FIG. 31B: Integrate the number of the sampled points from the sampling point that has a maximum intensity level toward smaller intensity level.

$$N(middle) = N(total) \times D \times M \quad (1)$$

where N(total) is the total number of the sampling points, D is the duty ratio of the optical signal (the ratio between the pulse width and the time slot), and M is a mark ratio (the probability of the occurrence of the level 1 in the digital transmission).

When the integral value becomes equal to the number of the sampling points N(middle) obtained by expression (1), the minimum level of the integrated sampling points is denoted by m(middle).

Figure 32A:
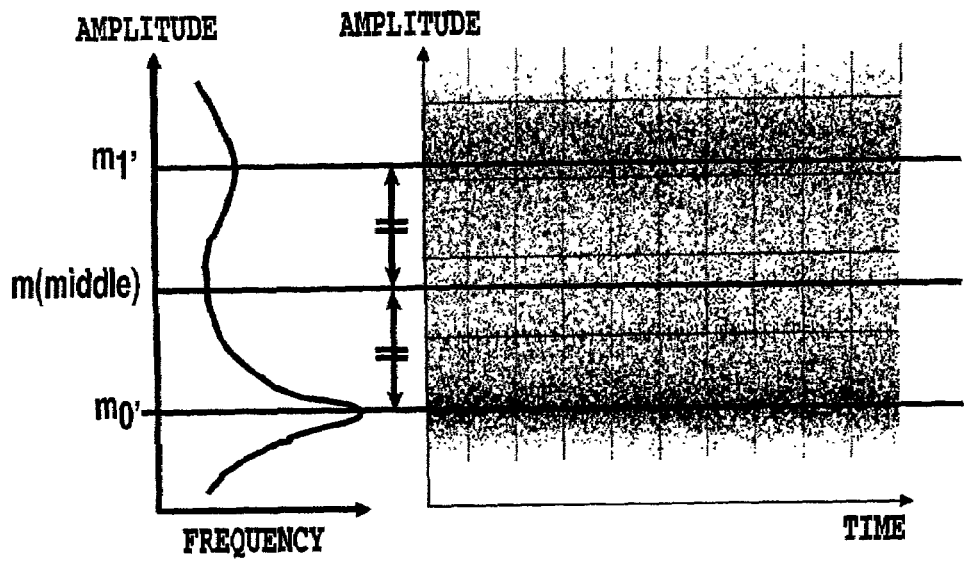
FIGS. 32A and 32B are schematic diagrams illustrating the signal-to-noise ratio coefficient measuring algorithm following that of FIGS. 31A and 31B in the 16th embodiment in accordance with the present invention.

FIG. 32A: Determine m1' by the following expression (2).

$$m1' = 2 \times \{m(middle) - m0'\} \quad (2)$$

Figure 32B:
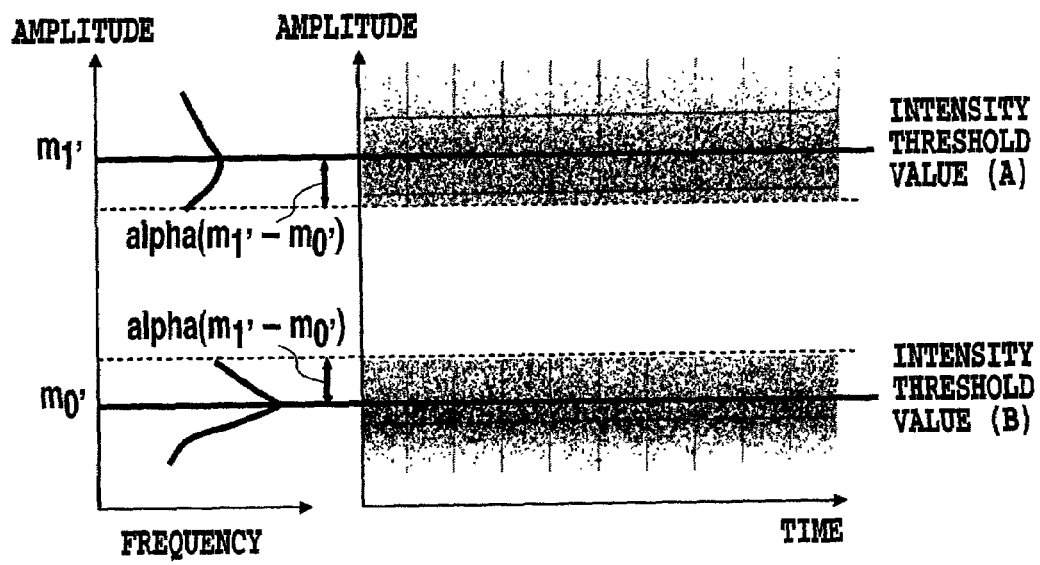

FIG. 32B: Determine the intensity levels obtained by the following equations (3) and (4) as the threshold values A and B.

$$A = m1' - \text{alpha}(m1' - m0') \quad (3)$$

$$B = m0' + \text{alpha}(m1' - m0') \quad (4)$$

where alpha is a real number of 0<alpha<0.5. The distribution whose intensity level is equal to or greater than A as the "level 1" distribution, and the distribution whose intensity level is equal to or less than B as the "level 0" distribution.

Figure 33A:
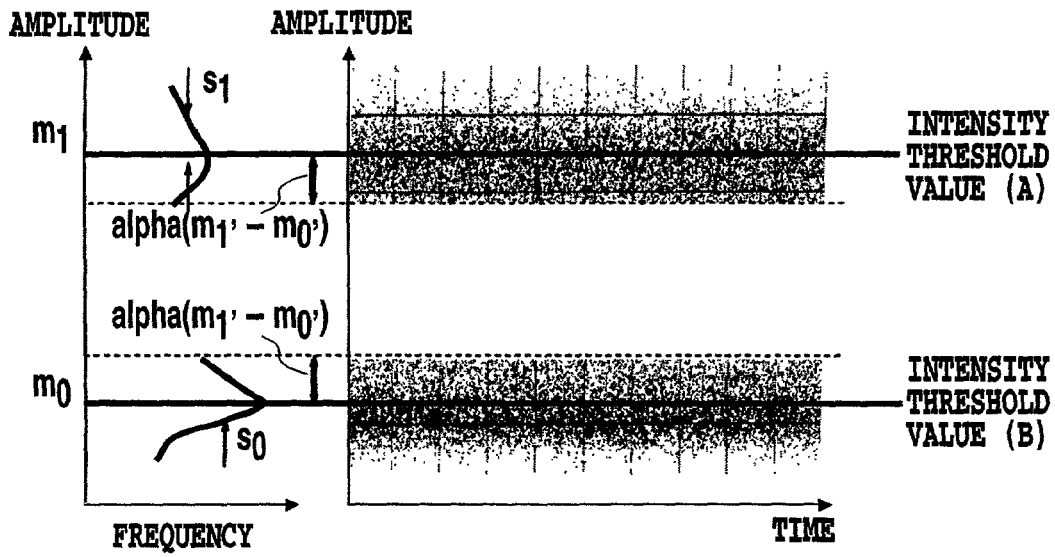
FIGS. 33A and 33B are schematic diagrams illustrating the signal-to-noise ratio coefficient measuring algorithm following that of FIGS. 32A and 32B in the 16th embodiment in accordance with the present invention.

FIG. 33A: Calculate mean values m1 and m0 and standard deviations s1 and s0 for the "level 1" and "level 0" distributions determined in FIG. 32B.

Figure 33B:
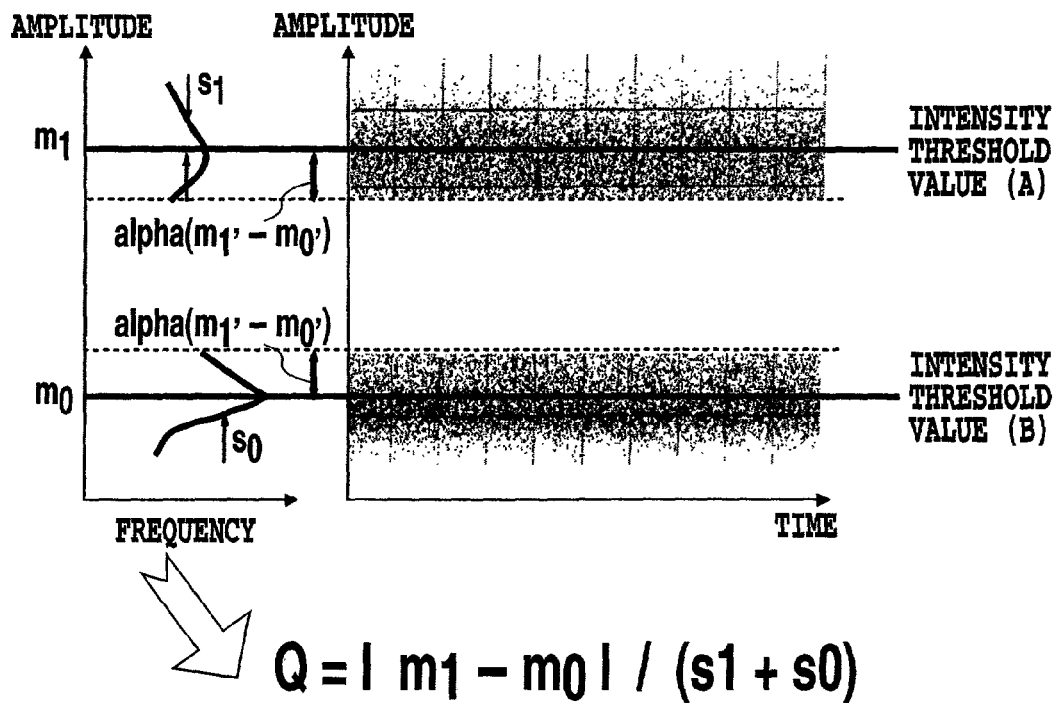

FIG. 33B: Calculate the Q value from the mean values and standard deviations obtained in FIG. 33A by the following equation (5), and make it as the signal-to-noise ratio coefficient and quality evaluation parameter.

$$Q = |m1 - m0|/(s1 + s0) \quad (5)$$

Figure 34:
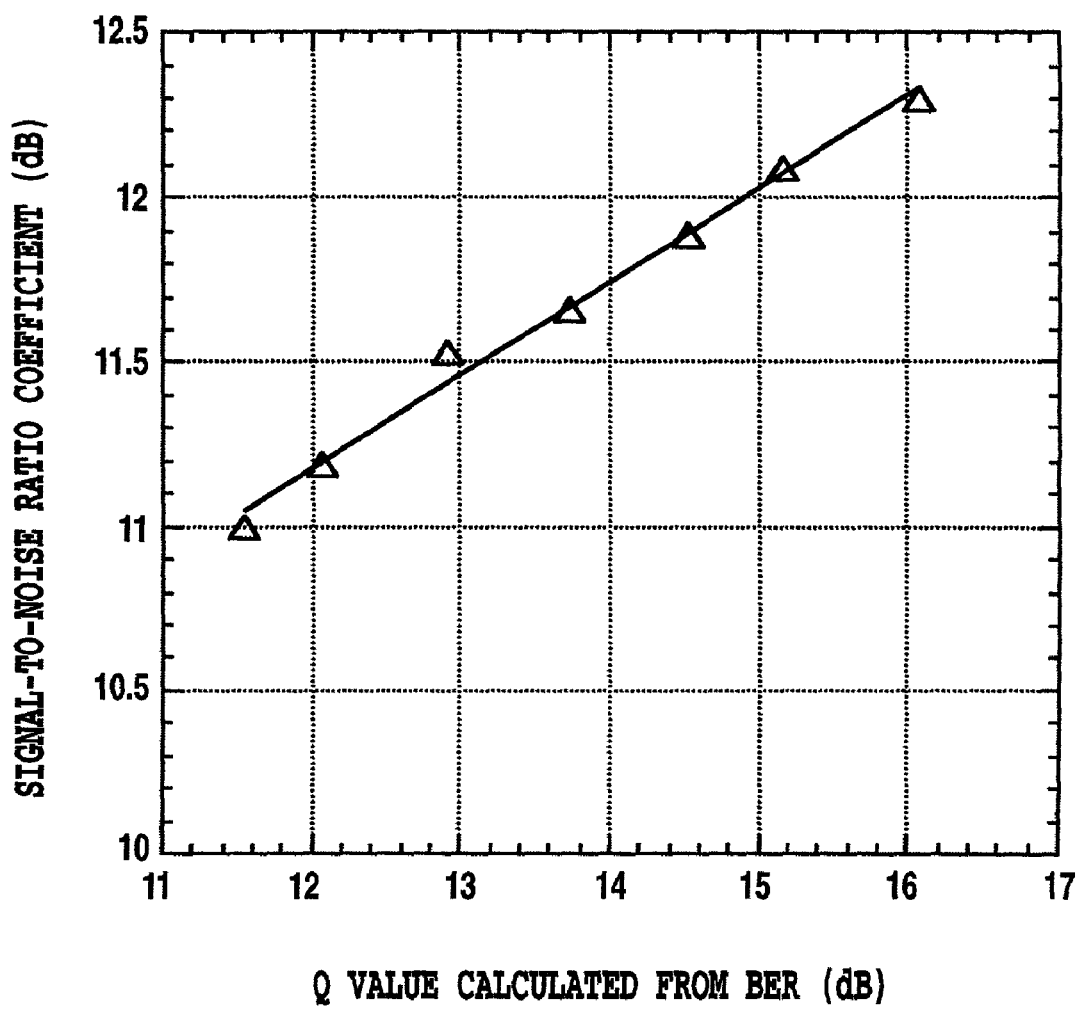
FIG. 34 is a graph illustrating experimental data of the signal-to-noise ratio coefficient obtained in the procedure as illustrating FIGS. 30A–33B, where the horizontal axis represents Q values obtained by converting the bit error rate measured, and the vertical axis represents the signal-to-noise ratio coefficients obtained by the algorithm of FIGS. 30A–33B.

FIG. 34 illustrates experimental data of the signal-to-noise ratio coefficient obtained through the procedure as illustrated in FIGS. 30A–33B. The data were obtained using a 10 Gbits/s NRZ signal and electric sampling. The value alpha was set at 0.3. The horizontal axis represents the Q values that are obtained by converting the bit error rates (BER) measured, and indicate the actual variation in the optical signal quality because of noise. The vertical axis represents the signal-to-noise ratio coefficients calculated by the algorithm of FIGS. 30A–33B.

FIG. 34 shows that the signal-to-noise ratio coefficients, which use the optical signal quality monitoring in FIG. 28 and FIGS. 33A–33B, can be utilized as the parameters for detecting the SNR degradation, and hence as the monitor information to make the route switching.

Figure 35:
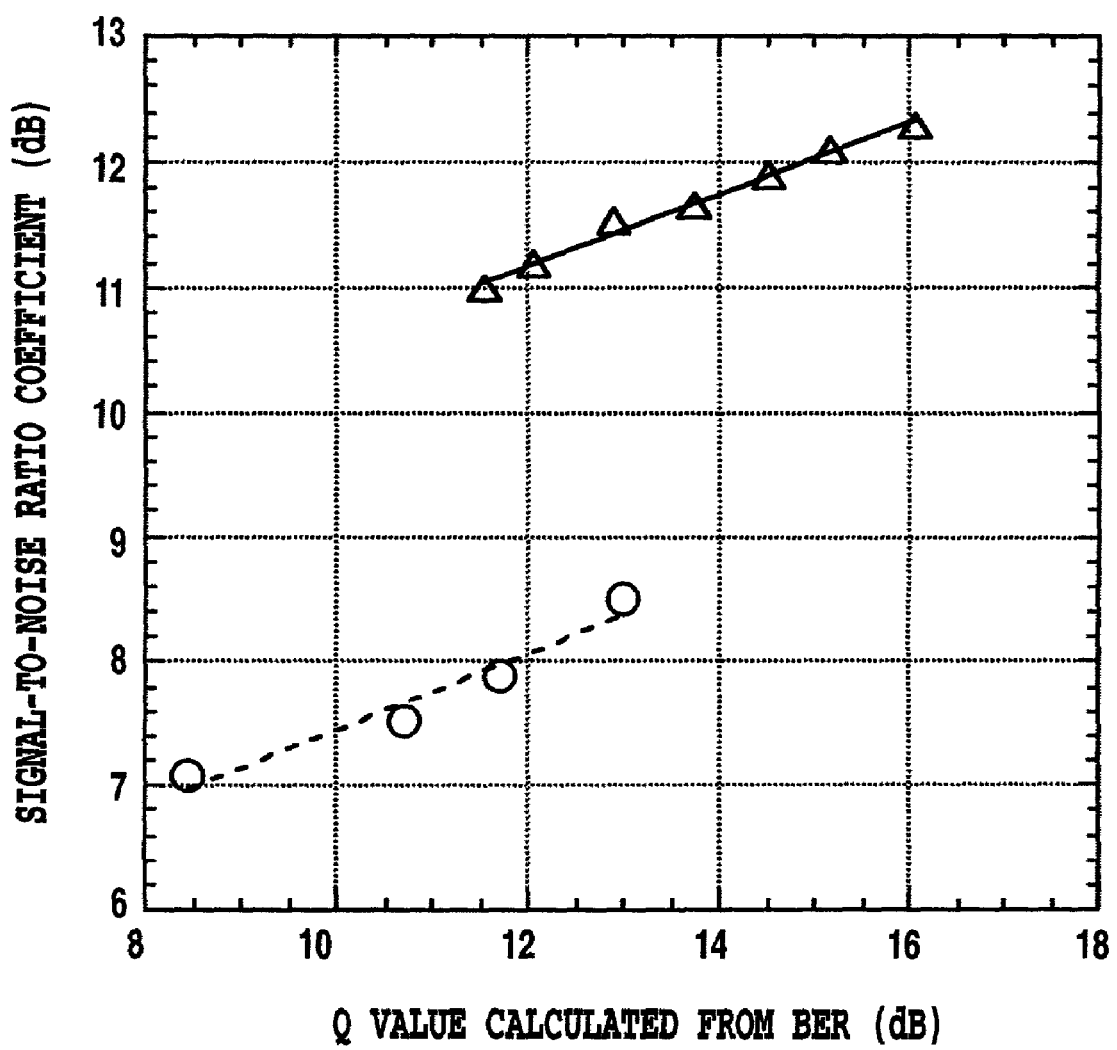
FIG. 35 is a graph illustrating experimental data when the wavelength dispersion has effect, where the horizontal axis represents Q values obtained by converting the bit error rate measured, and the vertical axis represents the signal-to-noise ratio coefficients obtained by the algorithm of FIGS. 30A–33B.

FIG. 35 illustrates experimental data under the effect of the wavelength dispersion. As in FIG. 34, the data were obtained using a 10 Gbits/s NRZ signal and electric sampling. The value alpha was set at 0.3. The horizontal axis represents the Q values that are obtained by converting the bit error rates (BER) measured, and indicate the actual variation in the optical signal quality because of noise. The vertical axis represents the signal-to-noise ratio coefficients calculated by the algorithm of FIGS. 30A–33B. In FIG. 35, triangles plotted indicate the case where the wavelength dispersion value the optical signal undergoes is 0 ps/nm, and circles plotted indicate the case where the wavelength dispersion value the optical signal undergoes is 1400 ps/nm.

FIG. 35 shows that the signal-to-noise ratio coefficient utilizing the optical signal quality monitoring has sensitivity to the waveform distortion caused by the wavelength dispersion, and to the SNR degradation in the state of the waveform distortion caused by the wavelength dispersion.

17th Embodiment

Figure 36A:
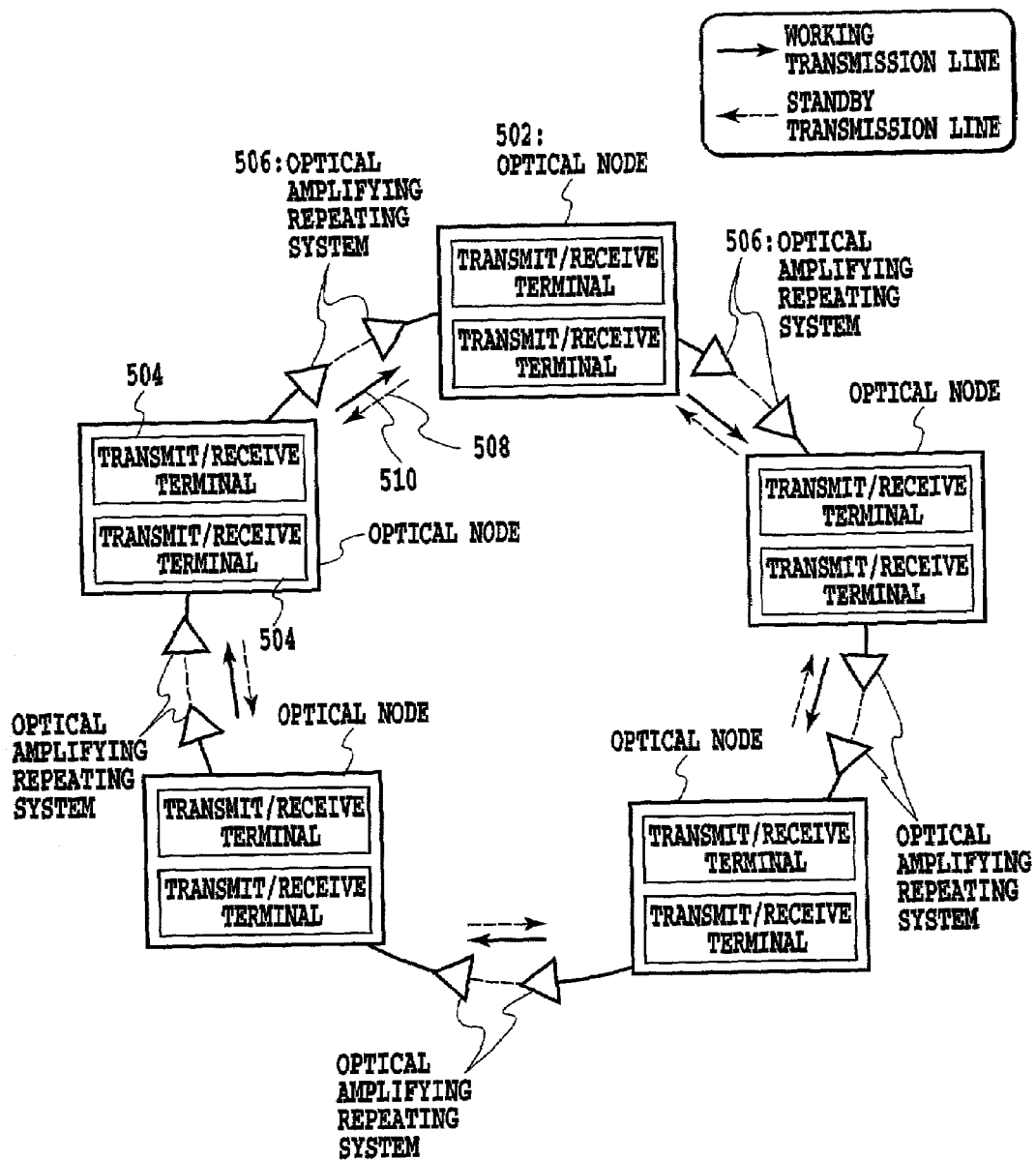
Figure 36B:
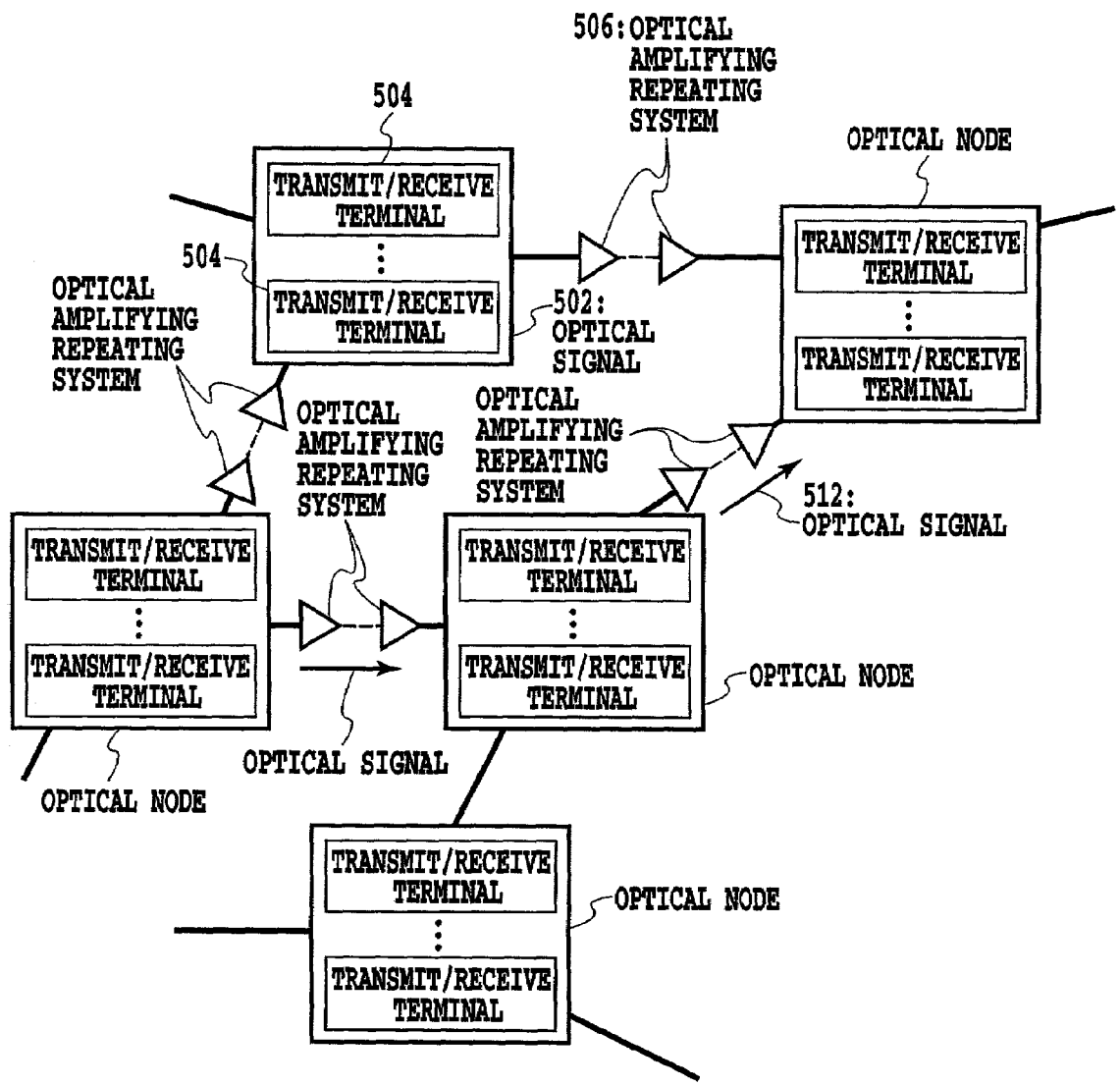

FIGS. 36A and 36B each show an optical network configuration of a 17th embodiment in accordance with the present invention. In particular, the present embodiment is an example that carries out the fault detection on an optical amplifying repeating section basis in the case where the optical amplifying repeating is performed between the optical transmit/receive terminals. FIG. 36A shows a ring type optical network with a standby circuit 510, including an optical ADM ring; and FIG. 36B shows a mesh type optical network.

In both the optical networks in FIGS. 36A and 36B, each optical node 502 constituting the optical network includes a pair of or multiple pairs of optical signal transmit terminal and optical signal receive terminal (transmit/receive terminals 504). An optical signal is terminated between the optical signal transmit terminal 504 of an optical node and the optical signal receive terminal 504 of another optical node. The optical networks include the case where the optical signal passes through the optical node 502.

As in the foregoing 16th embodiment, the optical signal receive terminal carries out the optical signal monitoring, and transmits the monitor information to the optical signal transmit terminal via the control channel between the optical transmit/receive terminals. Thus, the optical signal transmit terminal carries out the fault detection.

Figure 37:
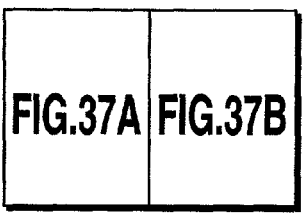
FIG. 37 is a diagram showing the relationship of FIGS. 37A and 37B.
Figure 37A:
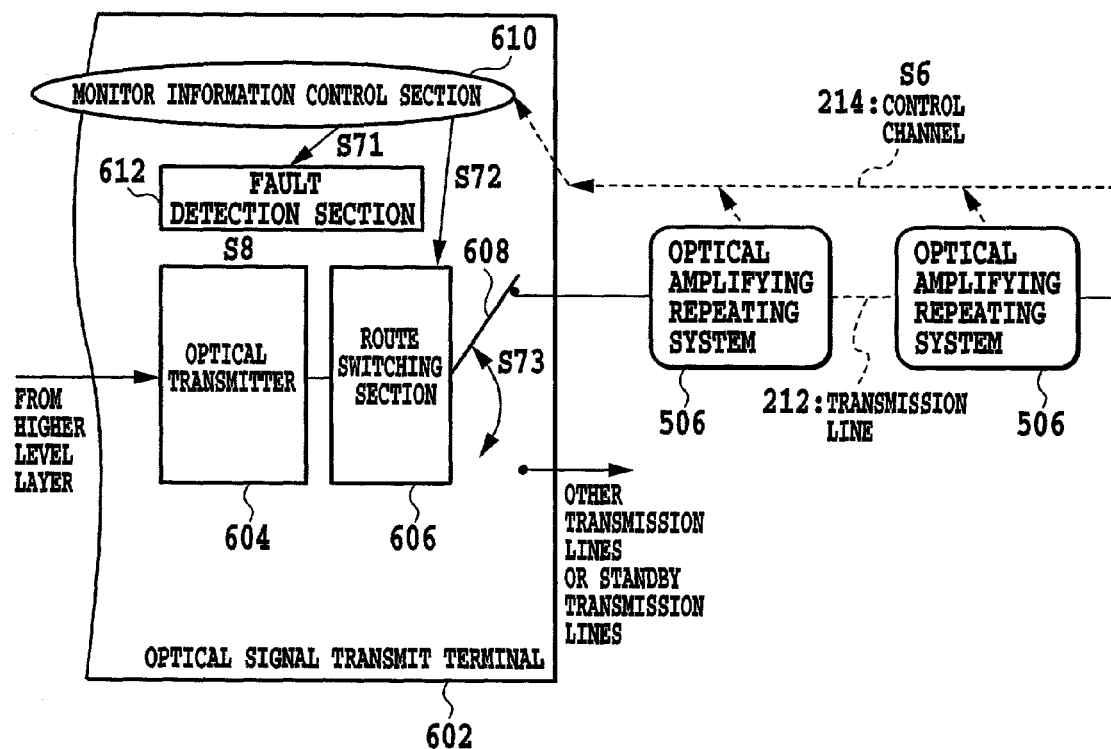
FIGS. 37A and 37B are block diagrams showing an internal configuration of a transmit/receive terminal of the 17th embodiment in accordance with the present invention.
Figure 37B:
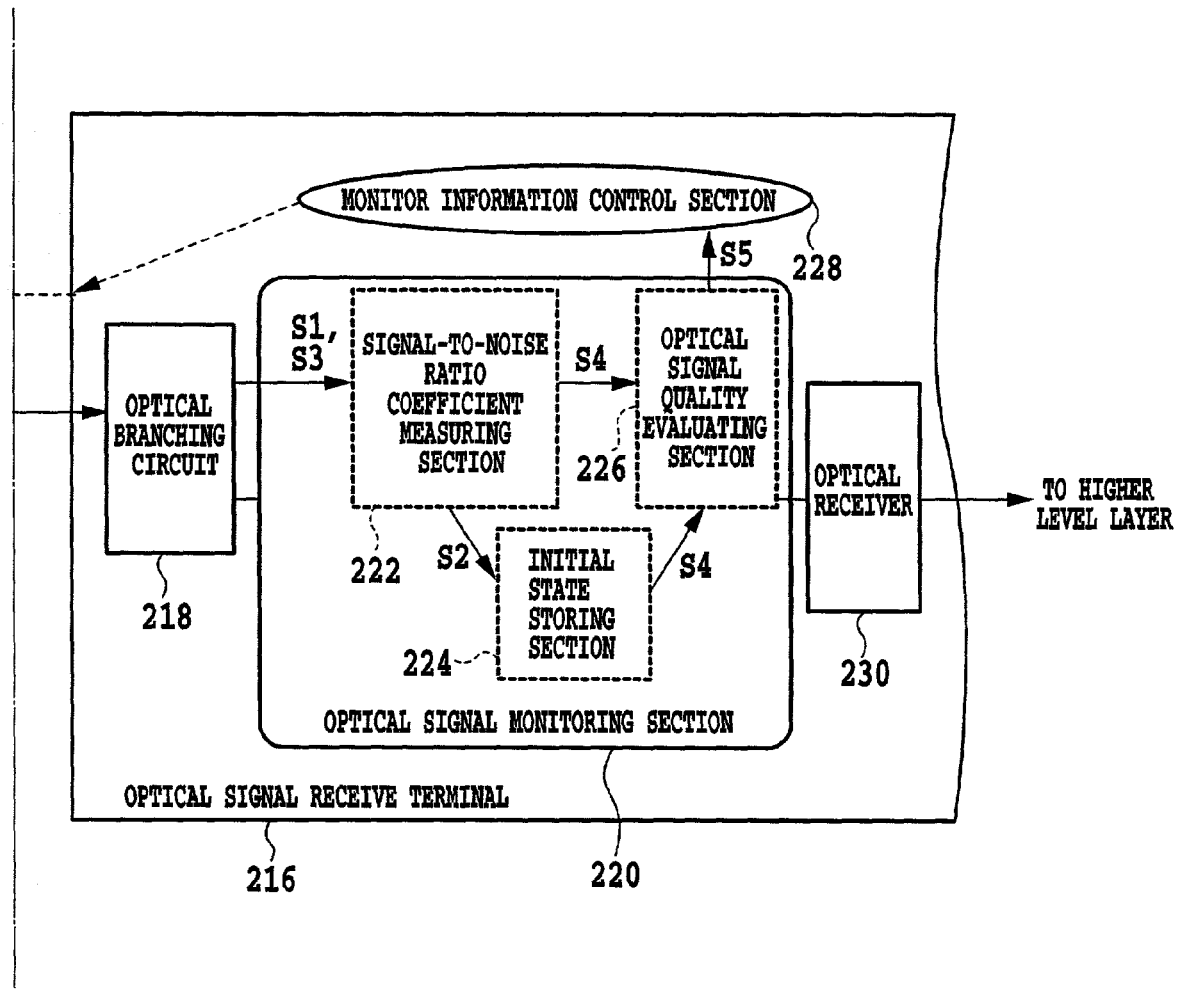

FIGS. 37A and 37B show an internal configuration of the optical transmit/receive terminal 504 of FIGS. 36A and 36B. Here, the components having the same functions as those of FIG. 26 of the 16th embodiment are designated by the same reference numerals. Receiving a signal from a higher level optical layer, the optical transmitter 604 of an optical signal transmit terminal 602 sends it to the transmission line 212 via the route switching section 606. In an optical signal receive terminal 216, an optical signal monitoring section 220 carries out the optical signal monitoring by utilizing part of the optical signal extracted. The optical signal monitoring section 220 comprises a signal-to-noise ratio coefficient measuring section 222, an initial state storing section 224 and an optical signal quality evaluating section 226, and carries out the fault detection in a procedure as shown in FIG. 39 which will be described later.

It is assumed here that the optical branching circuit 218 corresponds to the configuration without the electric signal processor 19 or 26 of FIGS. 10–20 of the foregoing fourth, fifth, seventh, eighth and 11th embodiments in accordance with the present invention. The optical signal monitoring section 220 corresponds to the section in the electric signal processor 19 or 26 that carries out the quality evaluation parameter of the foregoing fourth, fifth, seventh, eighth and 11th embodiments in accordance with the present invention.

Figure 38:
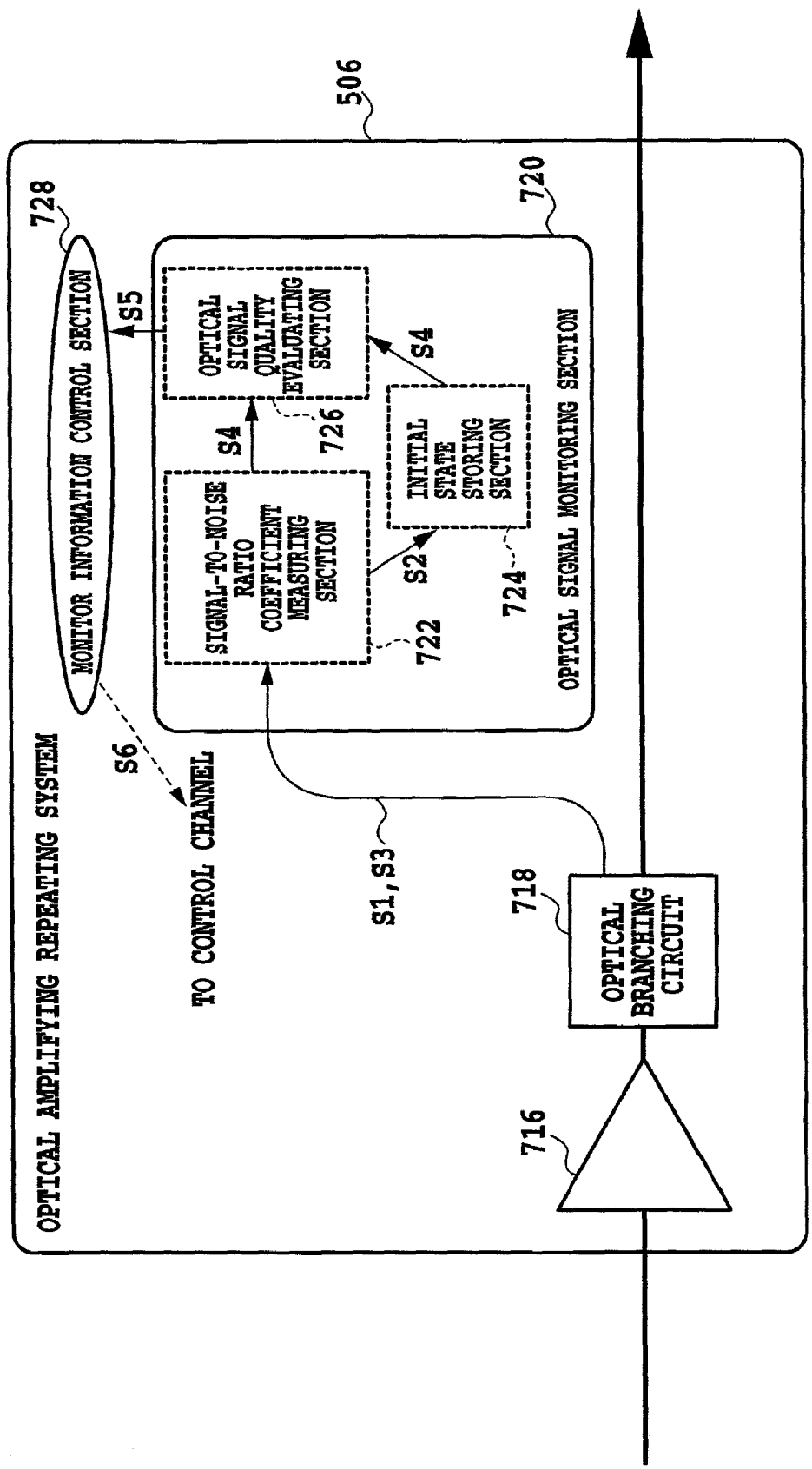
FIG. 38 is a block diagram showing an internal configuration of an optical amplifying repeating system of FIG. 37.

FIG. 38 shows an internal configuration of the optical amplifying repeating system 506 of FIG. 37. The optical amplifying repeating system 506 comprises an optical amplifier 716 for amplifying the optical signal transmitted through the transmission line 212; an optical branching circuit 718 for extracting part of the optical signal amplified; an optical signal monitoring section 720 for monitoring the optical signal branched; and a monitor information control section 728 for transmitting the monitor information from the optical signal monitoring section 720 to the optical signal transmit terminal 602 via the control channel 212. The monitor information is obtained by the optical signal monitoring section 720 that performs processing of the part of the optical signal, which is extracted by the optical branching circuit 718 from the optical signal amplified. The optical branching circuit 712 may be placed before the optical amplifier 716.

Figure 39:
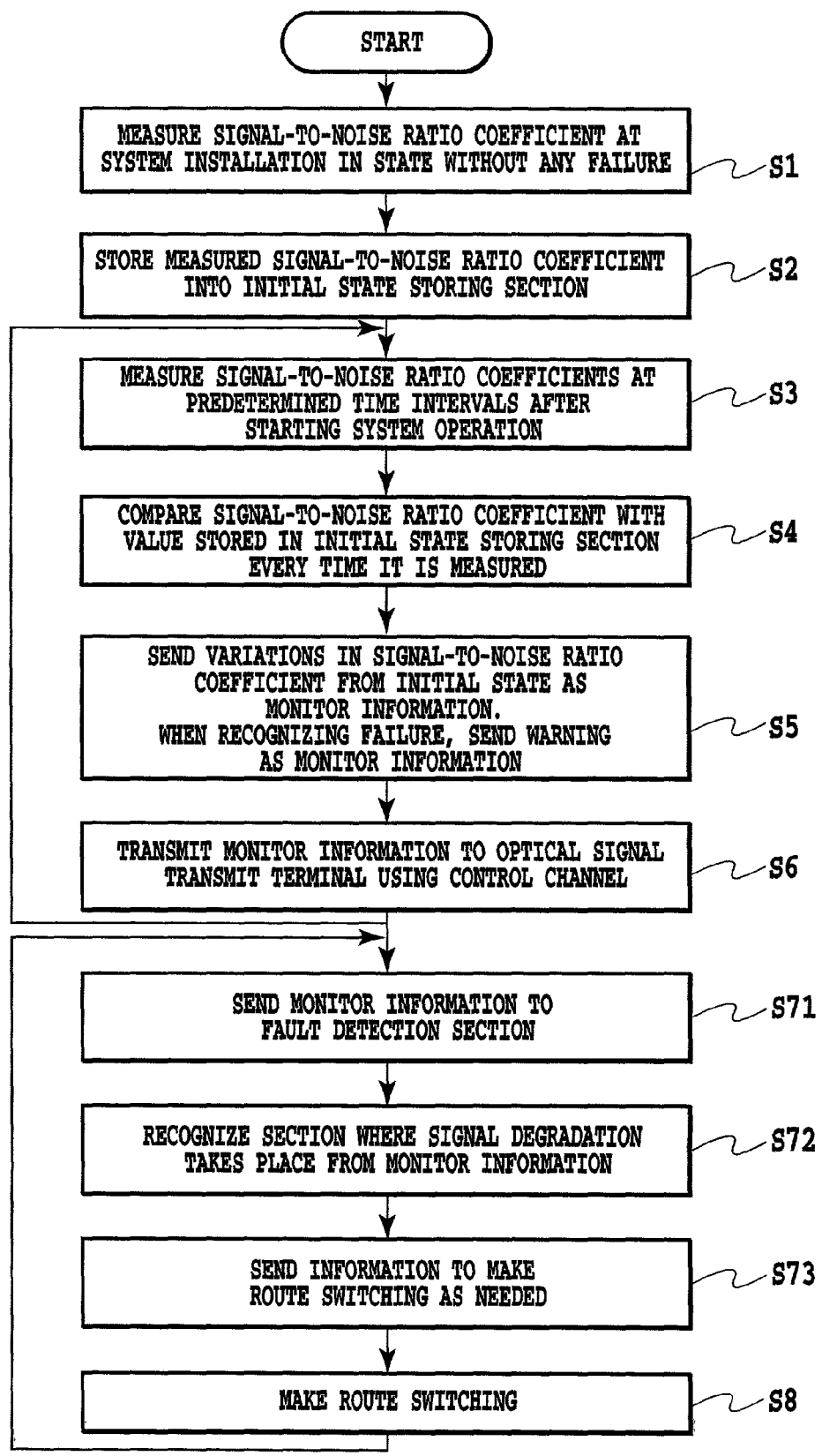
FIG. 39 is a flowchart illustrating a procedure of fault detection and route control in an optical signal monitoring system of the 17th embodiment in accordance with the present invention.

The optical signal monitoring section 720 comprises a signal-to-noise ratio coefficient measuring section 722, an initial state storing section 724 and an optical signal quality evaluating section 726 as the optical signal monitoring section 720 of the optical signal receive terminal 216, and carries out the fault detection in the procedure as illustrated in FIG. 39 which will be described below.

Next, the operation of the 17th embodiment in accordance with the present invention will now be described with reference to the flowchart of FIG. 39. Here, steps corresponding to those of the foregoing 16th embodiment of FIG. 27 are designated by the same step numbers.

Step S1: In the optical signal receive terminal 216 and optical amplifying repeating system 506, the signal-to-noise ratio coefficient measuring sections 222 and 722 measure the signal-to-noise ratio coefficients at the system installation in a state without any failure.

Step S2: The initial state storing sections 224 and 724 each store the signal-to-noise ratio coefficient measured at Step S1.

Step S3: The signal-to-noise ratio coefficient measuring sections 222 and 722 in the optical signal receive terminal 216 and optical amplifying repeating system 506 measure the signal-to-noise ratio coefficients at the predetermined time intervals after starting the system operation.

Step S4: The optical signal quality evaluating sections 226 and 726 compare the signal-to-noise ratio coefficients with those of the initial state storing sections 224 and 724 every time they are measured.

Step S5: The optical signal quality evaluating sections 226 and 726 supply the monitor information control sections 228 and 728 with the variations in the signal-to-noise ratio coefficients from the initial state as the monitor information. When it recognizes from the degree of variations in the signal-to-noise ratio coefficients that a failure takes place, it also supplies the monitor information control section 228 with warning information indicating that the route switching is required as the monitor information.

Step S6: The monitor information control sections 228 and 728 each transmit the monitor information to the monitor information control section 610 in the optical signal transmit terminal 602 via the control channel 214.

Step S71: The monitor information control section 610 of the optical signal transmit terminal 602 supplies a fault detection section 612 with the monitor information transmitted from the monitor information control sections 228 and 728 of the optical signal receive terminal 216 and optical amplifying repeating system 506.

Step S72: The fault detection section 612 of the optical signal transmit terminal 602 detects the section the signal degradation takes place from the monitor information sent from the optical amplifying repeating system 506 or optical signal receive terminal 216.

In this case, the route switching can be carried out as in the fourth embodiment in accordance with the present invention. In this case:

Step S73: The monitor information control section 610 of the optical signal transmit terminal 602 supplies the route switching section 606 with information to make the route switching as needed, in accordance with the monitor information sent from the optical amplifying repeating system 506 and optical signal receive terminal 216.

Step S8: The route switching section 606 carries out the route switching of the transmission line 212 in accordance with the instruction of the monitor information control section 610.

As the signal-to-noise ratio coefficient measuring sections 222 and 722 of FIGS. 37 and 38, it is possible to use the optical signal quality monitoring described in the reference material [2]. As for the configuration of the signal-to-noise ratio coefficient sections using the optical signal quality monitoring and the measurement algorithm, they are the same as those of the 16th embodiment in accordance with the present invention shown in FIG. 28 FIGS. 33A and 33B.

When the optical amplifying repeating system 506 employs the analog monitoring as in the 17th embodiment in accordance with the present invention, it comes to monitor the optical signal that does not undergo the dispersion compensation. As a result, it is not unlikely that it monitors the SNR degradation when the waveform distortion caused by the wavelength dispersion is large. In this case, however, the signal-to-noise ratio coefficients obtained by the optical signal quality monitoring can be utilized satisfactorily as illustrated in the data of FIG. 35. Thus, the signal-to-noise ratio coefficients obtained by the optical signal quality monitoring are available for the fault detection.

18th Embodiment

Next, FIGS. 40A–43 show, as an 18th embodiment in accordance with the present invention, another example of the algorithm of the signal-to-noise ratio coefficient measurement by the signal-to-noise ratio coefficient measuring sections 222 and 722 for carrying out the optical signal quality monitoring.

Figure 40A:
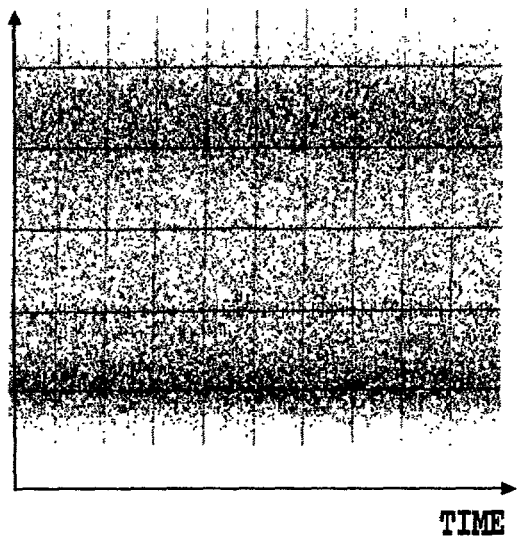
FIGS. 40A and 40B are schematic diagrams illustrating an initial stage of signal-to-noise ratio coefficient measuring algorithm of an 18th embodiment in accordance with the present invention.

FIG. 40A: Obtain the intensity distribution in a certain mean time using the optical sampling by the optical sampling oscilloscope 414 with a configuration as shown in FIG. 29, or using the electric sampling by the electrical sampling oscilloscope 404 with the configuration as shown in FIG. 28.

Figure 40B:
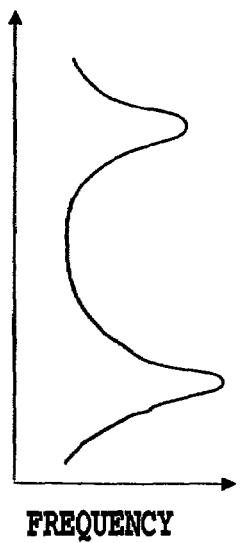
Figure 40B:
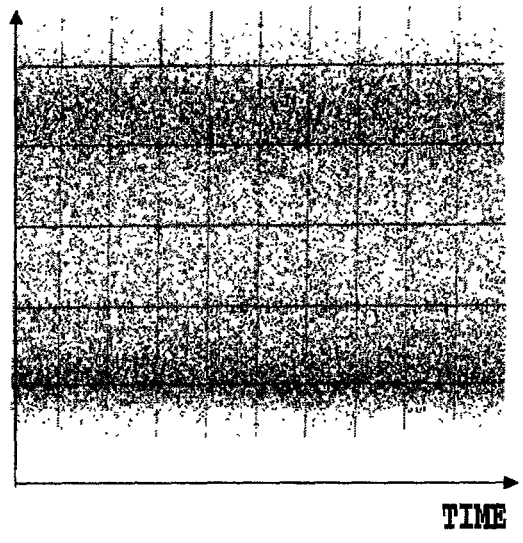

FIG. 40B: Obtain the amplitude histogram from the intensity distribution calculated.

Figure 41A:
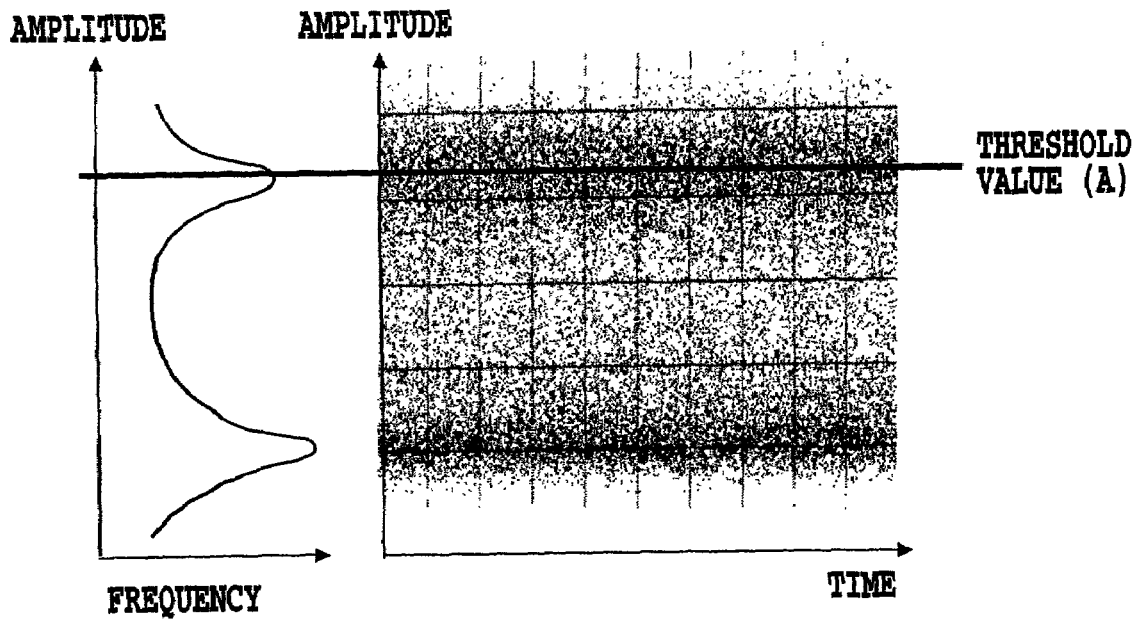
FIGS. 41A and 41B are schematic diagrams illustrating the signal-to-noise ratio coefficient measuring algorithm following that of FIGS. 40A and 40B in the 18th embodiment in accordance with the present invention.

FIG. 41A: Determine the first relative maximum value, which is obtained by searching the amplitude histogram from the greater intensity level side, as a threshold value A.

Figure 41B:
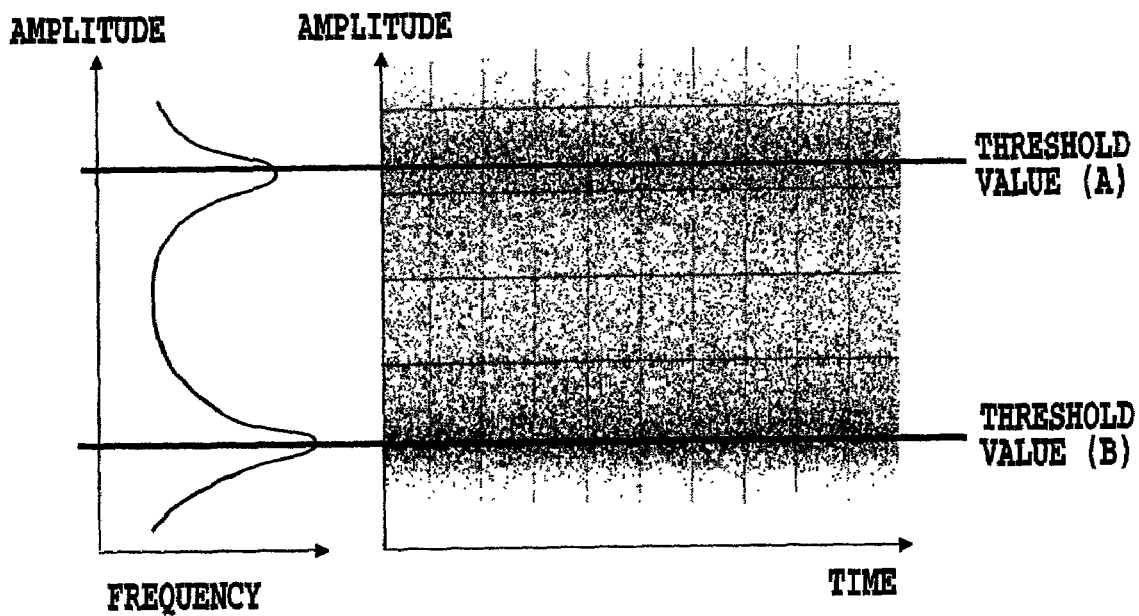

FIG. 41B: Determine the first relative maximum value, which is obtained by searching the amplitude histogram from the smaller intensity level side, as a threshold value B.

Figure 42A:
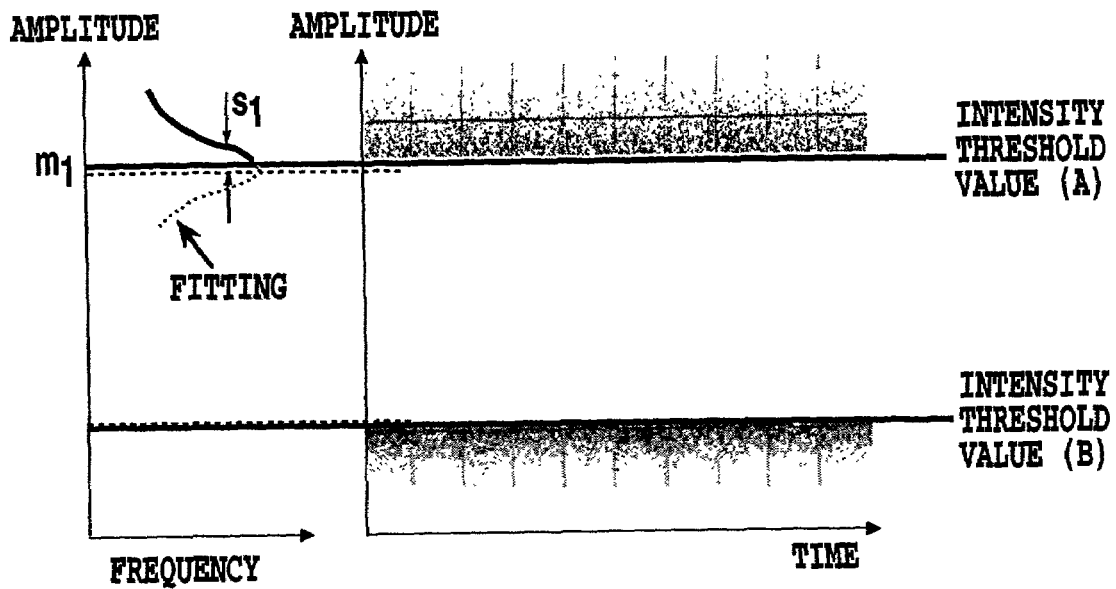
FIGS. 42A and 42B are schematic diagrams illustrating the signal-to-noise ratio coefficient measuring algorithm following that of FIGS. 41A and 41B in the 18th embodiment in accordance with the present invention.

FIG. 42A: Obtain the mean value m1 and the standard deviation s1 of the level 1 by assuming that the portion with the intensity level equal to or greater than the threshold value A in the amplitude histogram takes a normal distribution g1, and by making fitting (approximation) of the normal distribution g1 using a least squares method or the like.

Figure 42B:
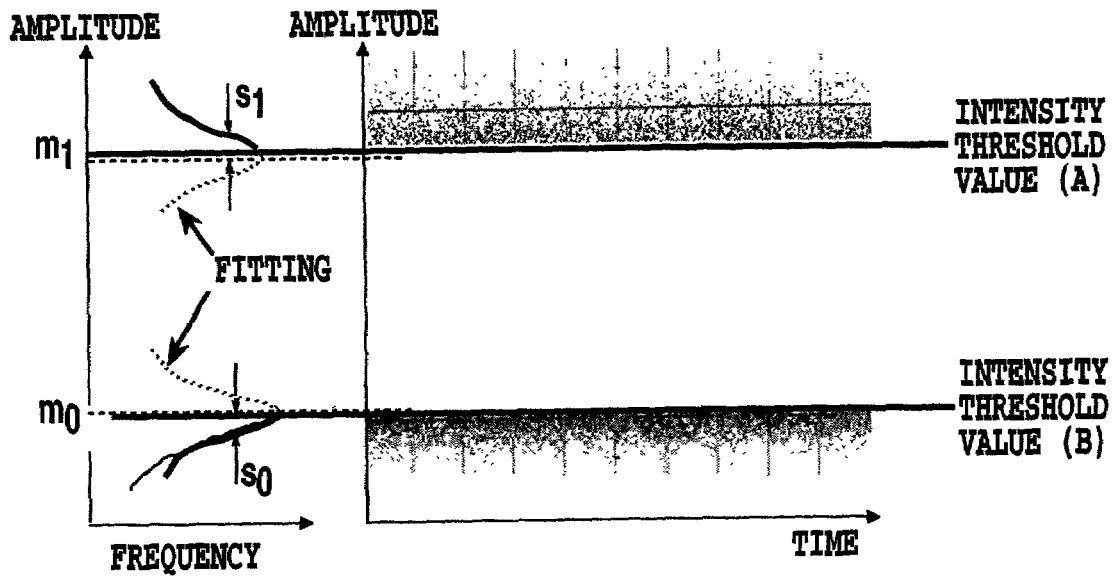

FIG. 42B: Obtain the mean value m0 and the standard deviation s0 of the level 0 by assuming as in FIG. 42A that the portion with the intensity level equal to or less than the threshold value B in the amplitude histogram takes a normal distribution g0, and by making fitting of the normal distribution g0 using a least squares method or the like.

Figure 43:
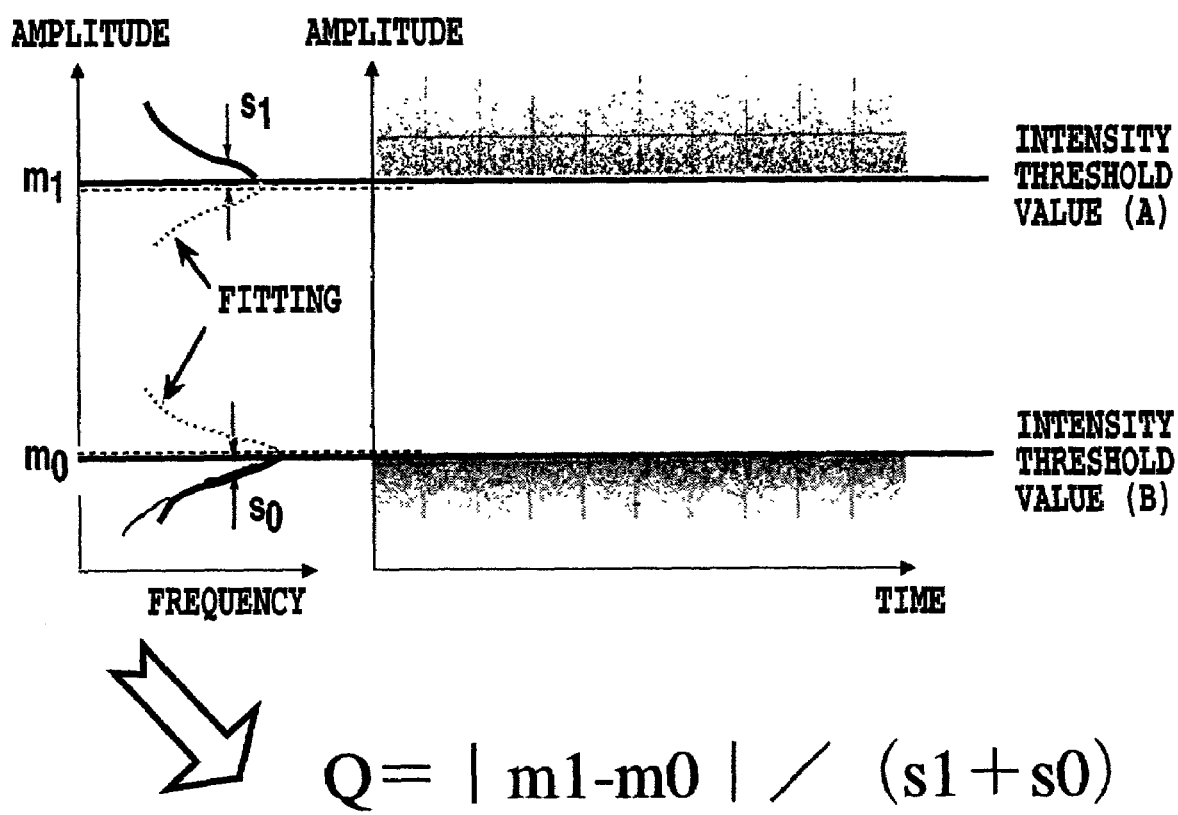
FIG. 43 is a schematic diagram illustrating the signal-to-noise ratio coefficient measuring algorithm following that of FIGS. 42A and 42B in the 18th embodiment in accordance with the present invention.

FIG. 43: Calculate the Q value from the mean values m1 and m0 and the standard deviations s1 and s0 obtained in FIGS. 42A and 42B by the following expression (6), and make the Q value a signal-to-noise ratio coefficient, and adopt it as the optical signal quality evaluation parameter.

$$Q=|m1-m0|/(s1+s0) \quad (6)$$

As the distribution functions g0 and g1, it is also possible to assume a chi-square distribution (reference material [4]: D. Marcuse, "Derivation of Analytical Expressions for the Bit-Error Probability in Lightwave Systems with Optical Amplifiers, "IEEE J. Lightwave Technol., Vol.8, No.12, pp1816–1823, 1990).

19th Embodiment

FIGS. 44A–47 shows, as a 19th embodiment in accordance with the present invention, another example of the algorithm of the signal-to-noise ratio coefficient measurement by the signal-to-noise ratio coefficient measuring sections 222 and 722 for carrying out the optical signal quality monitoring. The present embodiment differs from the foregoing 18th embodiment in accordance with the present invention in the calculation of the threshold values A and B in the entire algorithm.

Figure 44A:
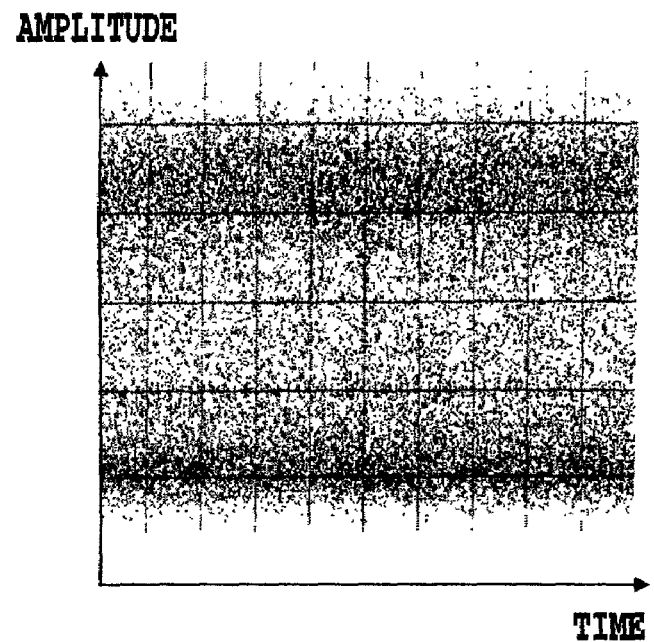
FIGS. 44A and 44B are schematic diagrams illustrating an initial stage of signal-to-noise ratio coefficient measuring algorithm of a 19th embodiment in accordance with the present invention.

FIG. 44A: Obtain the intensity distribution in a certain mean time using the optical sampling by the optical sampling oscilloscope 414 with the configuration as shown in FIG. 29, or using the electric sampling by the electrical sampling oscilloscope 404 with the configuration as shown in FIG. 28.

Figure 44B:
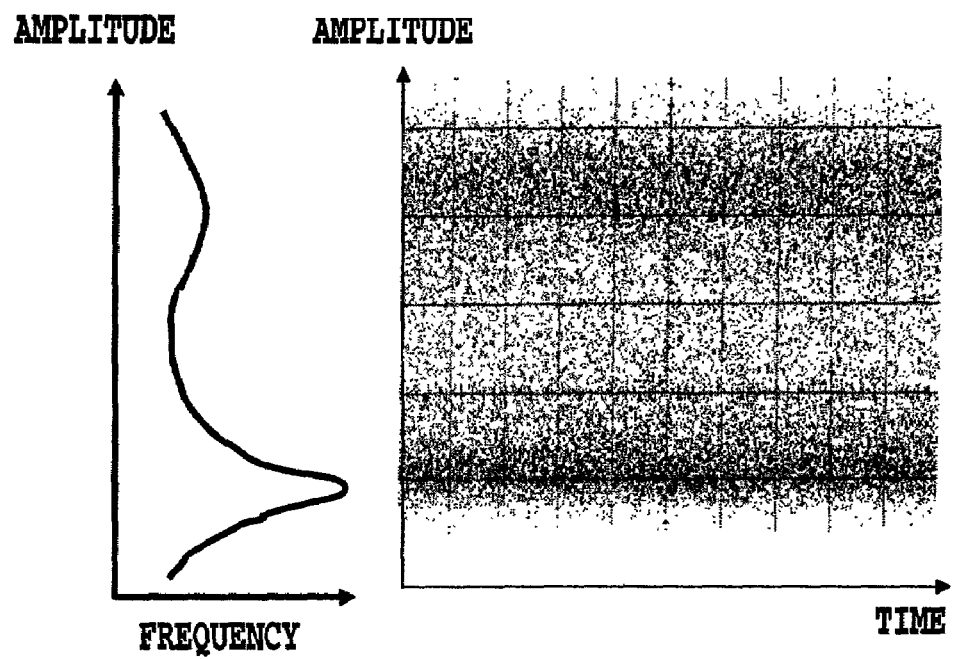

FIG. 44B: Obtain the amplitude histogram from the intensity distribution calculated.

Figure 45A:
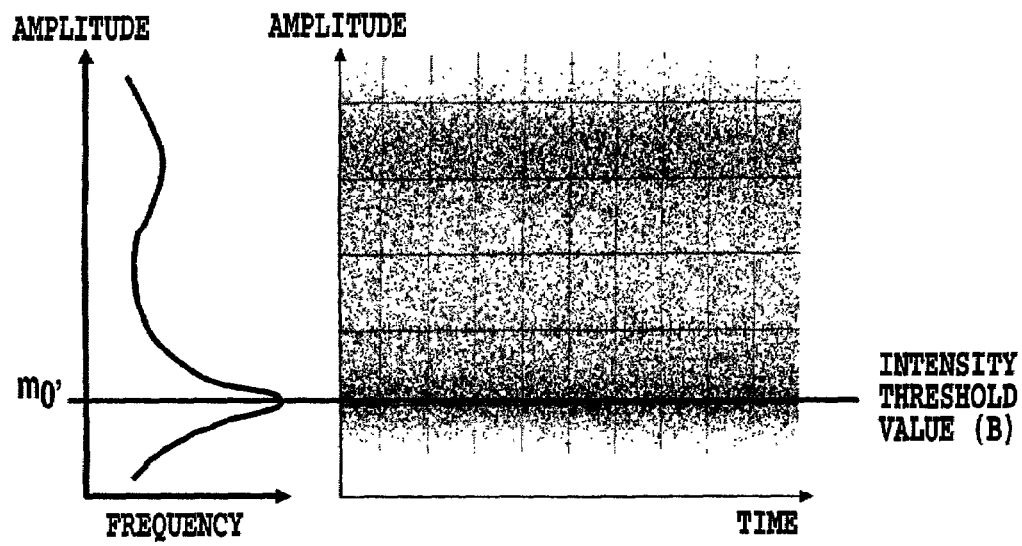
FIGS. 45A and 45B are schematic diagrams illustrating the signal-to-noise ratio coefficient measuring algorithm following that of FIGS. 44A and 44B in the 19th embodiment in accordance with the present invention.

FIG. 45A: Determine the first relative maximum value, which is obtained by searching the amplitude histogram from the smaller intensity level side, as the threshold value B.

Figure 45B:
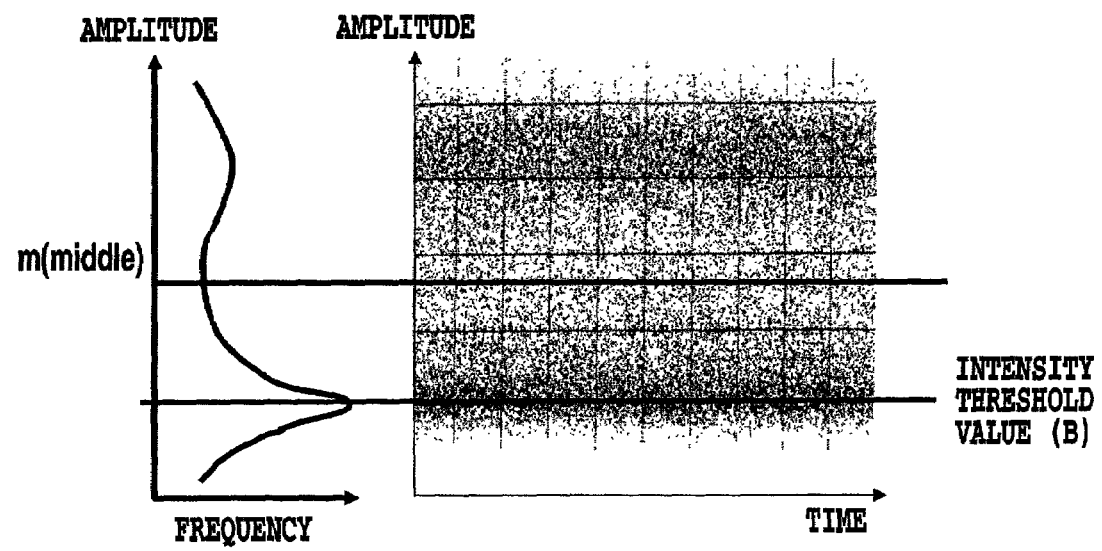

FIG. 45B: Integrate the number of the sampling points from the sampling point with the maximum intensity level toward the smaller intensity level side. When the number of the sampling points N(middle) given by the following expression (7) becomes equal to the integral value, decide the minimum level of the levels at the integrated sampling points and make it m(middle).

$$N(\text{middle})=N(\text{total})\times D\times M \quad (7)$$

where N(total) is the total number of the sampling points, D is the duty ratio of the optical signal, which is defined as a ratio between the pulse width and the time slot, and M is the mark ratio (the probability of occurrence of the "level 1" in the digital transmission).

Figure 46A:
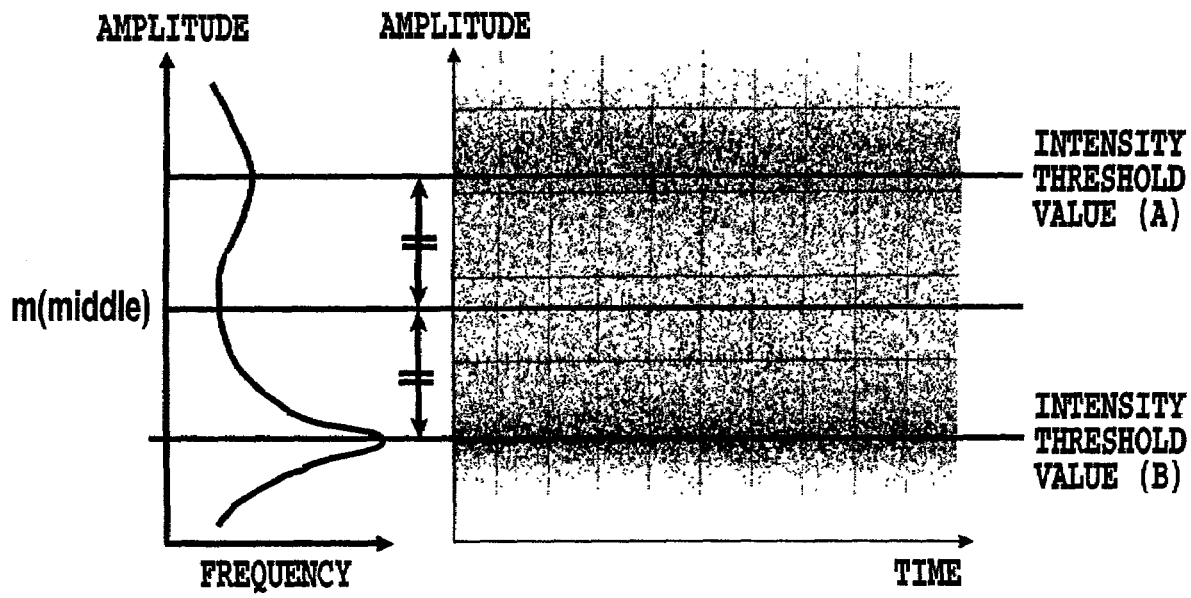
FIGS. 46A and 46B are schematic diagrams illustrating the signal-to-noise ratio coefficient measuring algorithm following that of FIGS. 45A and 45B in the 19th embodiment in accordance with the present invention.

FIG. 46A: Obtain the threshold value A by the following expression (8).

threshold value A $$=2\times\{m(\text{middle})-\text{threshold value } B\} \quad (8)$$

Figure 46B:
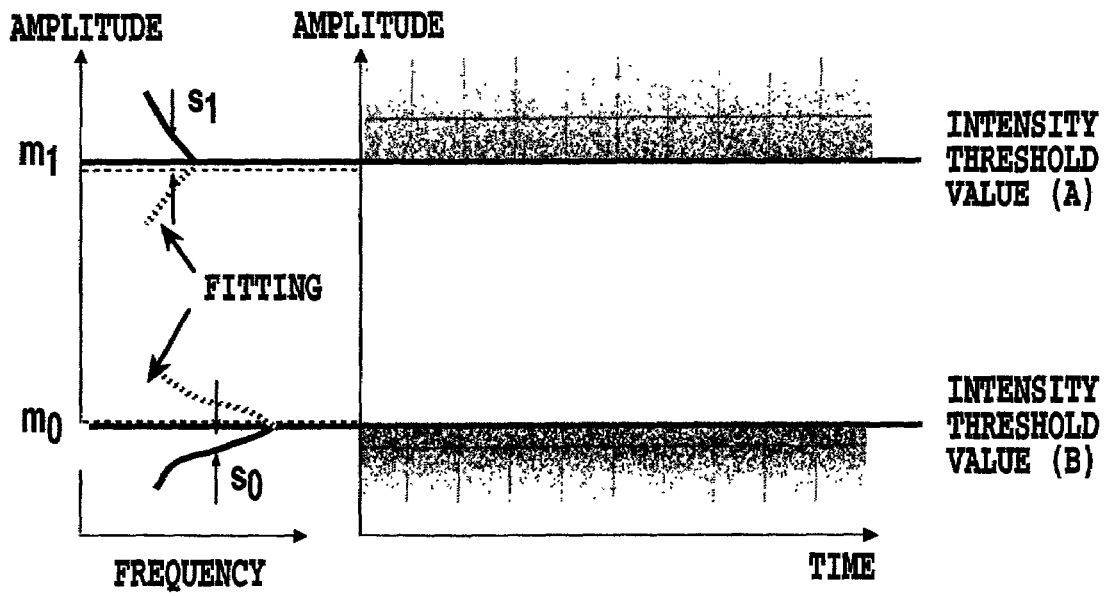

FIG. 46B: Obtain the mean values m1 and m0 and standard deviations s1 and s0 of the level 1 and level 0 by assuming that the portion with the intensity level equal to or greater than the threshold value A in the amplitude histogram is a part of a normal distribution g1, that the portion with the intensity level equal to or smaller than the threshold value B is a part of a normal distribution g0, and by making fitting of the normal distributions g1 and g0 using a least squares method or the like.

Figure 47:
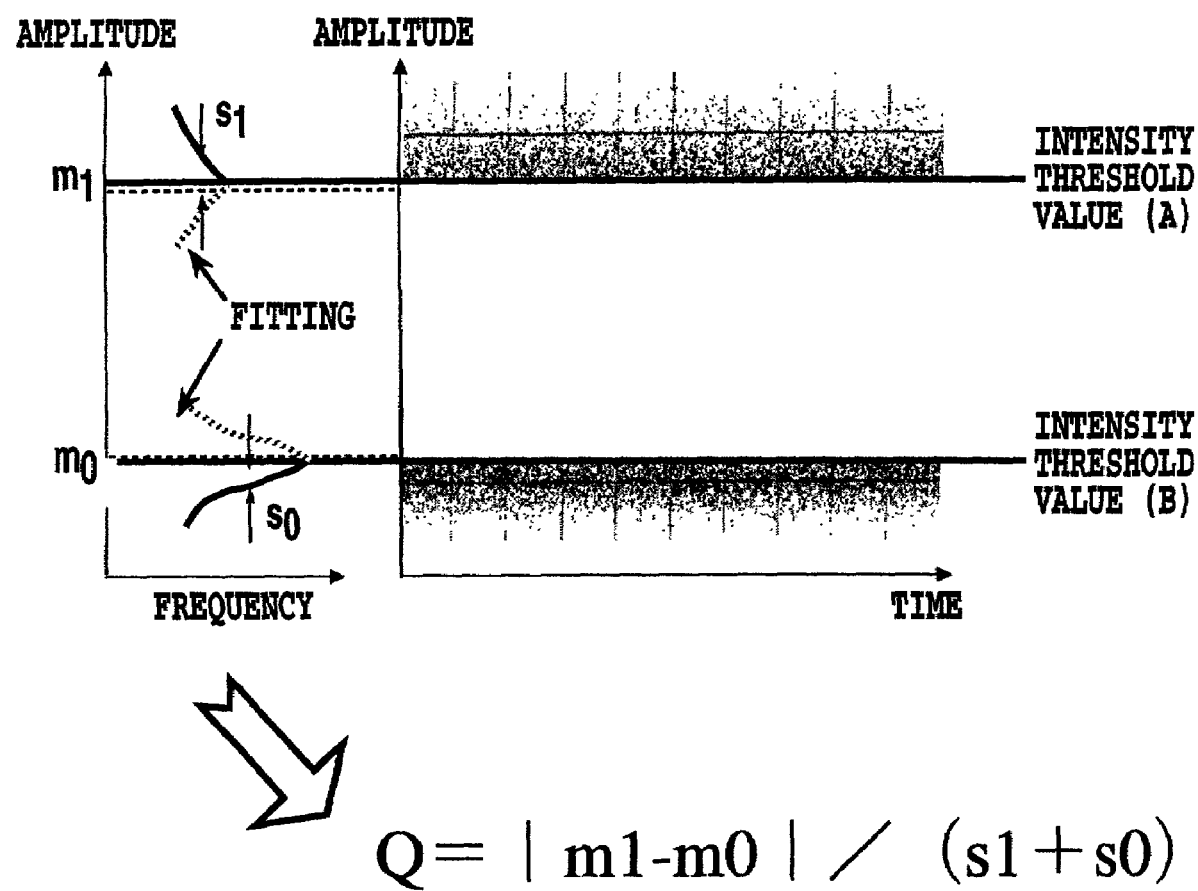
FIG. 47 is a schematic diagram illustrating the signal-to-noise ratio coefficient measuring algorithm following that of FIGS. 46A and 46B in the 19th embodiment in accordance with the present invention.

FIG. 47: Calculate the Q value from the mean values m1 and m0 and standard deviations s1 and s0 obtained in FIG. 46B by the following expression (9), and make the Q value a signal-to-noise ratio coefficient, and adopt it as the optical signal quality evaluation parameter.

$$Q=|m1-m0|/(s1+s0) \quad (9)$$

As the distribution functions g0 and g1, it is possible to assume a chi-square distribution (reference material [4]).

Although the foregoing 18th embodiment in accordance with the present invention has an advantage that it is the simplest method, it is applicable only to NRZ signals. In contrast with this, although the present 19th embodiment is more complicated than the 18th embodiment, it is applicable not only to the NRZ signals, but also to RZ signals. However, it is necessary to know the duty ratio and mark ratio of the signal pulses beforehand as shown in equation (7).

20th Embodiment

FIGS. 48A–51 shows, as a 20th embodiment in accordance with the present invention, another example of the algorithm of the signal-to-noise ratio coefficient measurement by the signal-to-noise ratio coefficient measuring sections 222 and 722 for carrying out the optical signal quality monitoring. The present embodiment differs from the foregoing 18th and 19th embodiments in accordance with the present invention in the calculation of the threshold values A and B in the entire algorithm.

Figure 48A:
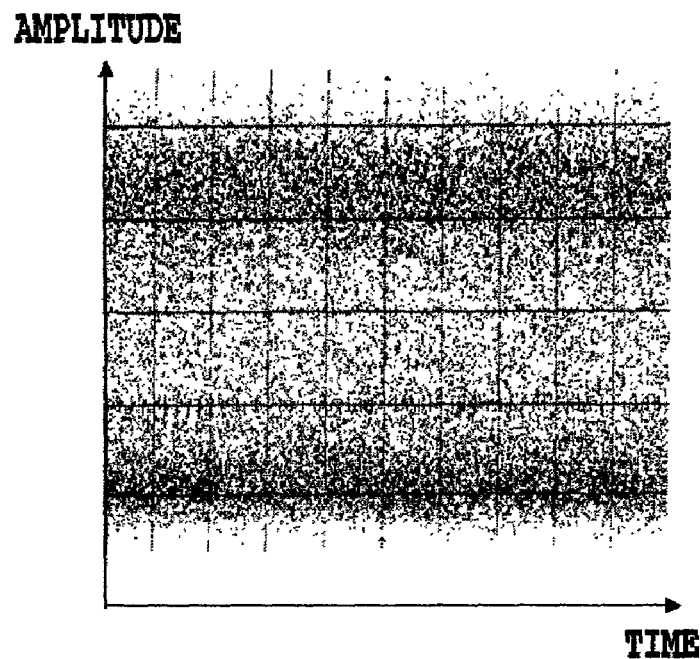
FIGS. 48A and 48B are schematic diagrams illustrating an initial stage of signal-to-noise ratio coefficient measuring algorithm of a 20th embodiment in accordance with the present invention.

FIG. 48A: Obtain the intensity distribution in a certain mean time using the optical sampling by the optical sampling oscilloscope 414 with the configuration as shown in FIG. 29, or using the electric sampling by the electrical sampling oscilloscope 404 with the configuration as shown in FIG. 28.

Figure 48B:
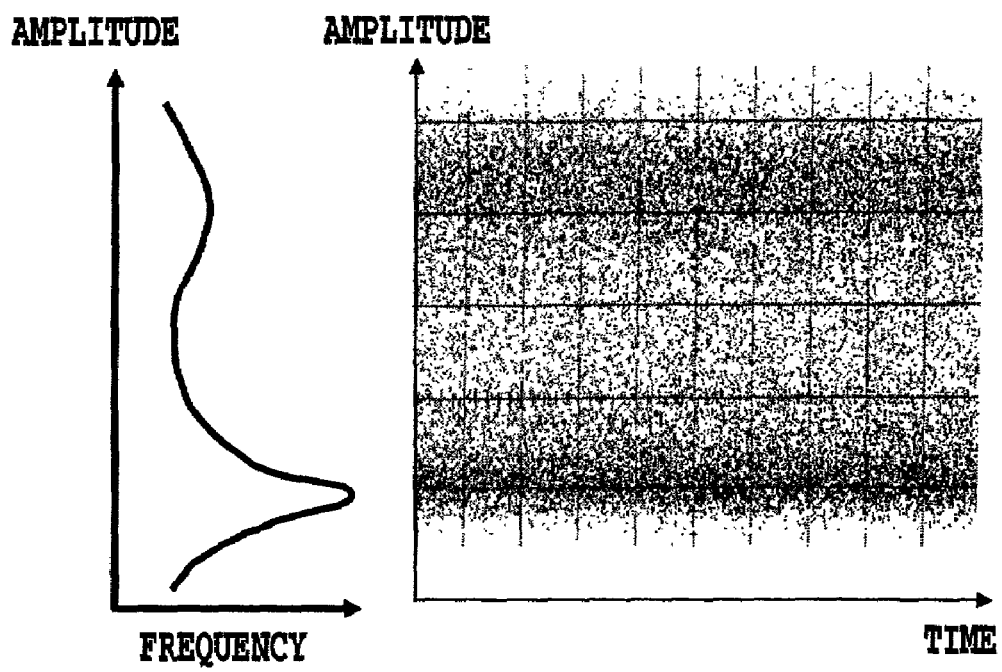

FIG. 48B: Obtain the amplitude histogram from the intensity distribution calculated.

Figure 49A:
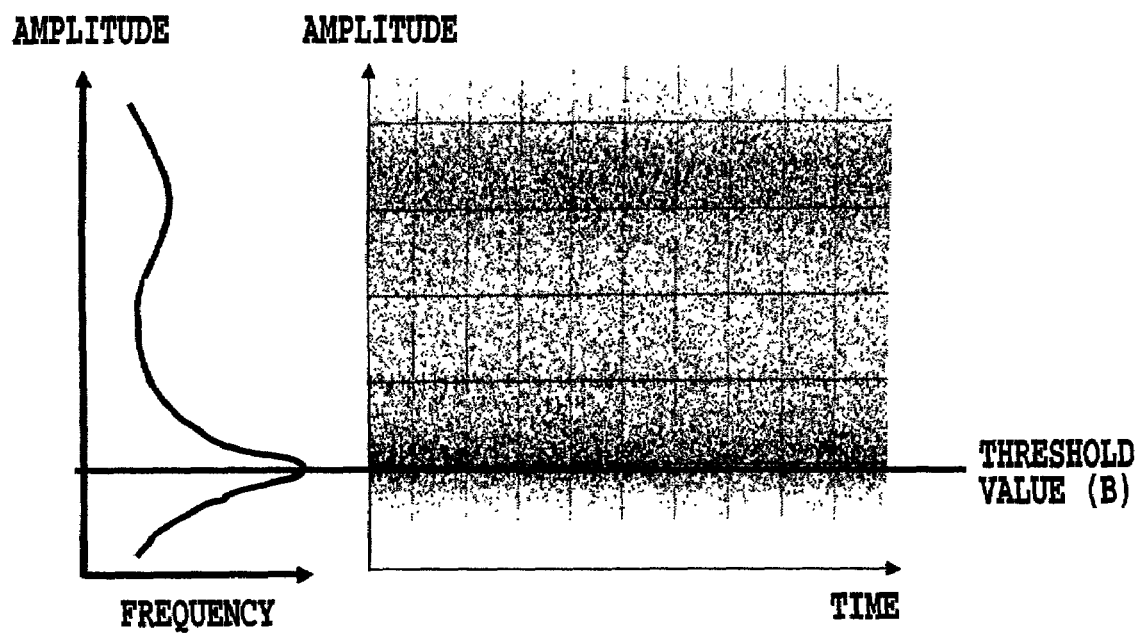
FIGS. 49A and 49B are schematic diagrams illustrating the signal-to-noise ratio coefficient measuring algorithm following that of FIGS. 48A and 48B in the 20th embodiment in accordance with the present invention.

FIG. 49A: Determine the first relative maximum value, which is obtained by searching the amplitude histogram from the smaller intensity level side, as the threshold value B.

Figure 49B:
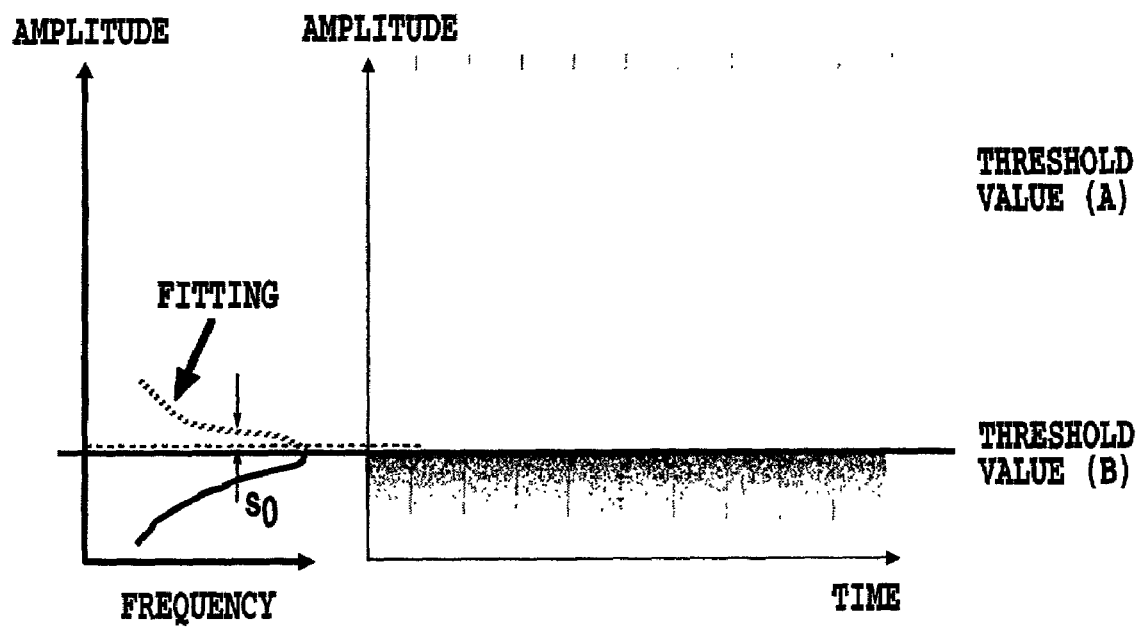

FIG. 49B: Obtain the mean value m0 and standard deviation s0 of the level 0 by assuming that the portion with the intensity level equal to or less than the threshold value B in the amplitude histogram is a part of the normal distribution g0, and by making fitting of the normal distribution g0 using a least squares method or the like.

Figure 50A:
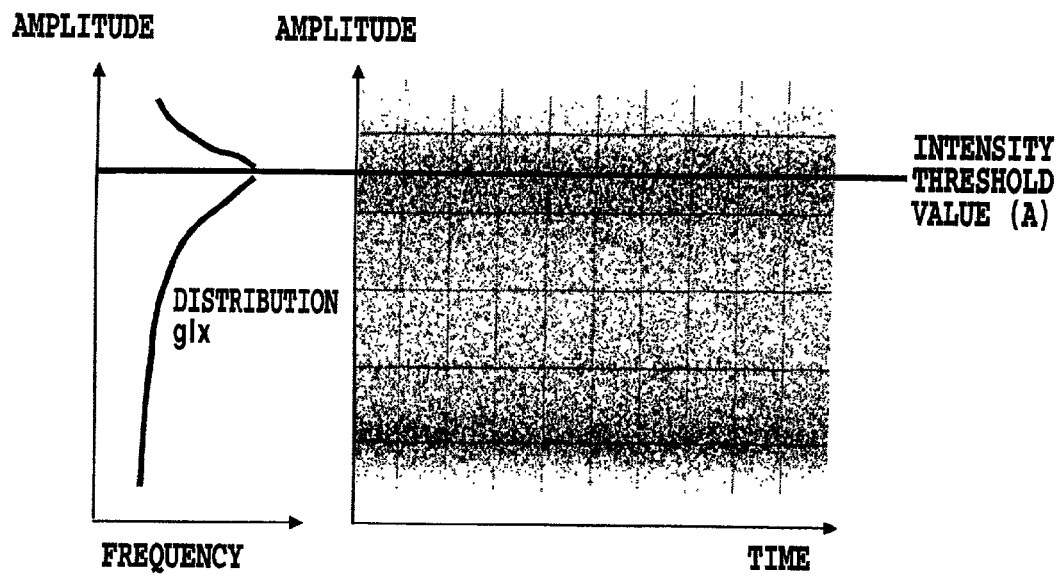
FIGS. 50A and 50B are schematic diagrams illustrating the signal-to-noise ratio coefficient measuring algorithm following that of FIGS. 49A and 49B in the 20th embodiment in accordance with the present invention.

FIG. 50A: Obtain distribution g1x by subtracting the function g0 obtained in FIG. 49B from the entire amplitude histogram, and determine the first maximum value, which is detected by searching the distribution g1x from the greater intensity level side, as the threshold value A. The function g1x is considered to be a superimposed function of the distribution function g1 of the level 1 and the distribution function gx of cross-points.

Figure 50B:
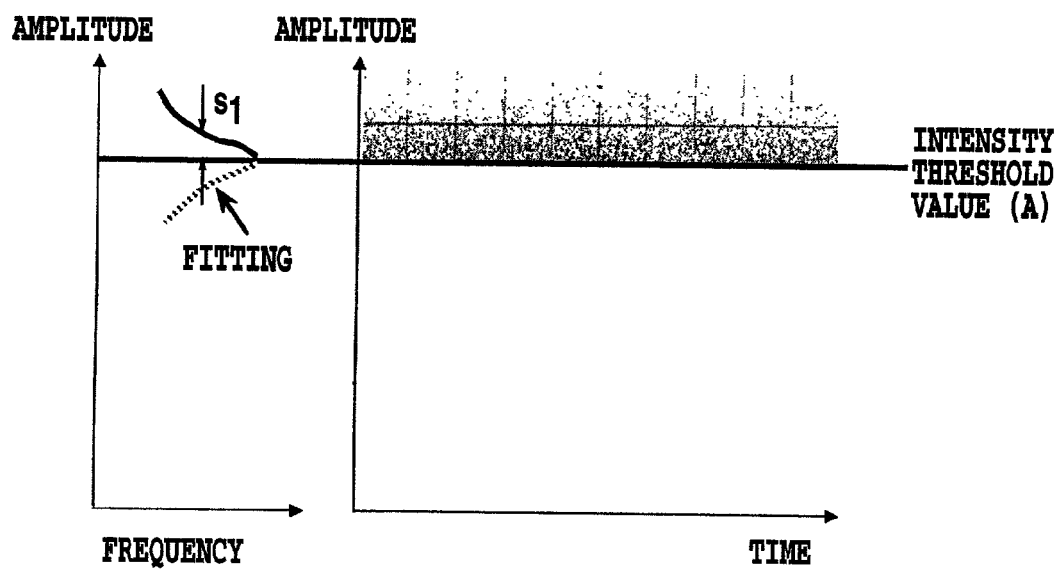

FIG. 50B: Obtain the mean value m1 and standard deviation s1 of the level 1 by assuming that the portion with the intensity level equal to or less than the threshold value A in the distribution g1x is a part of the normal distribution g1, and by making fitting of the normal distribution g1 using a least squares method or the like.

Figure 51:
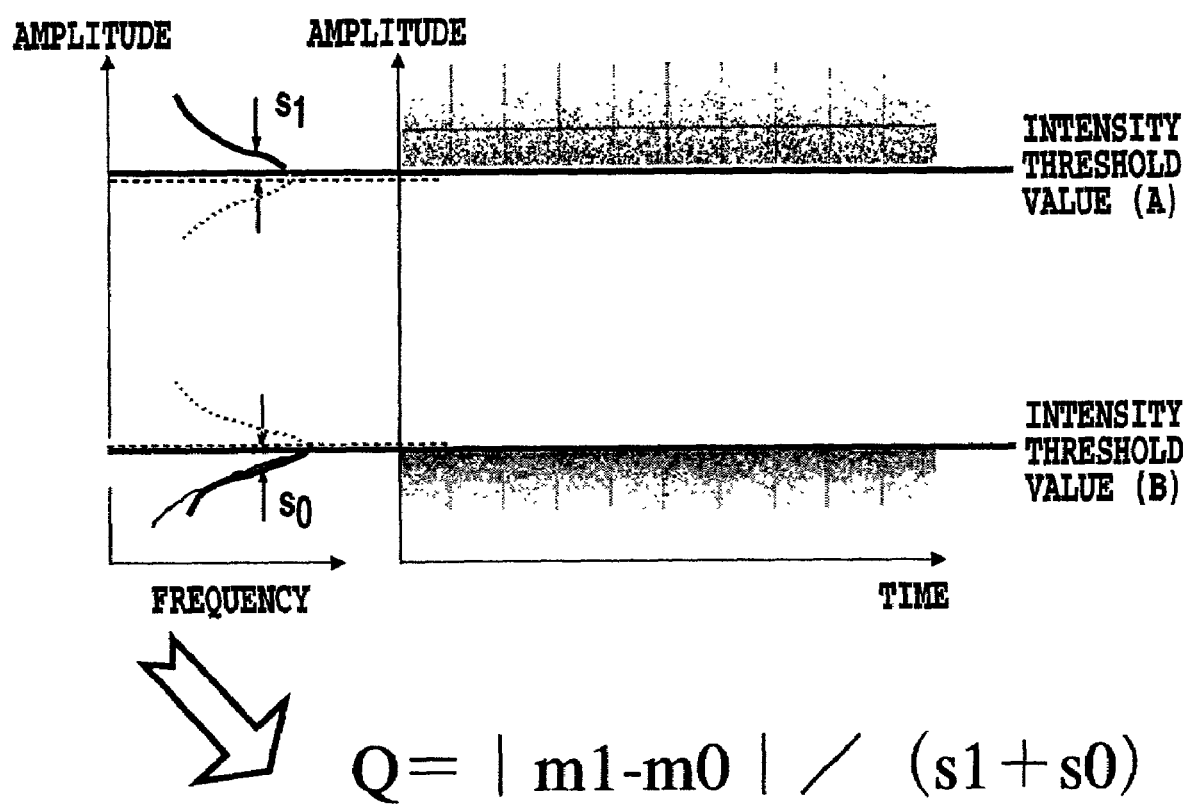
FIG. 51 is a schematic diagram illustrating the signal-to-noise ratio coefficient measuring algorithm following that of FIGS. 50A and 50B in the 20th embodiment in accordance with the present invention.

FIG. 51: Calculate the Q value from the mean values m1 and m0 and standard deviations s1 and s0 obtained in FIGS.

50B and 49B by the following expression (10), and make the Q value a signal-to-noise ratio coefficient, and adopt it as the optical signal quality evaluation parameter.

$$Q=|m1-m0|/(s1+s0) \quad (9)$$

As the distribution functions g0 and g1, it is possible to assume a chi-square distribution (reference material [4]).

Although the present 20th embodiment is more complicated than the foregoing 19th embodiment, it is not only applicable to the RZ signals, but also has an advantage that it is not necessary to know the duty ratio and mark ratio of the signal pulses beforehand.

21ST Embodiment

Figure 52:
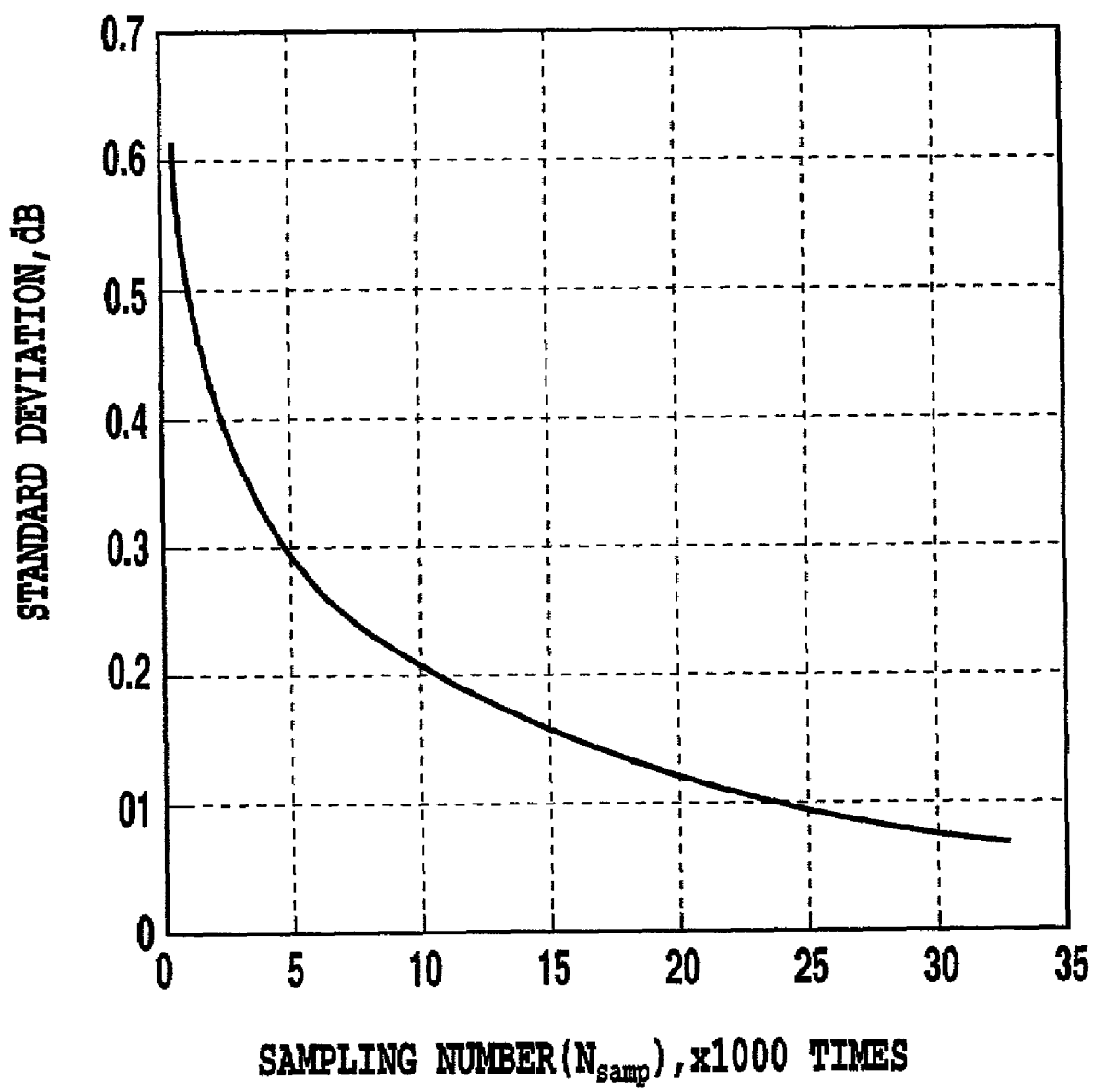
FIG. 52 is a graph illustrating the relationship between the standard deviation for eight repeated evaluation points (vertical axis) and the total number of samplings used for the average Q factor evaluation (horizontal axis) of a B bit/s NRZ optical signal of a 21st embodiment in accordance with the present invention.

This embodiment shows an example of the system design for evaluating the average Q factor using asynchronous sampling. The system parameters are the sampling resolution, the total number of samplings, the optical band-pass filter bandwidth, and the lowest BER limit which is optimized by using numerical calculation. FIG. 52 shows the relationship between the standard deviation for eight repeated evaluation points (vertical axis) and the total number of samplings used for the average Q factor evaluation (horizontal axis) of a B bit/s NRZ optical signal, when alpha is 0.3, the optical band-pass filter bandwidth is 4×B Hz, the receiver bandwidth is 0.7×B Hz, the sampling resolution is 1/256×1/B s, and the BER is $10^{-10}$. As shown in FIG. 52, the required number of total sampling points is approximately 15,000 points, when the standard deviation of 0.18 of less (this is converted into BER under the above-mentioned conditions and corresponds to the maximum fluctuation between BER $10^{-9}$ and $10^{-10}$) is assumed to be the requirement.

Figure 53A:
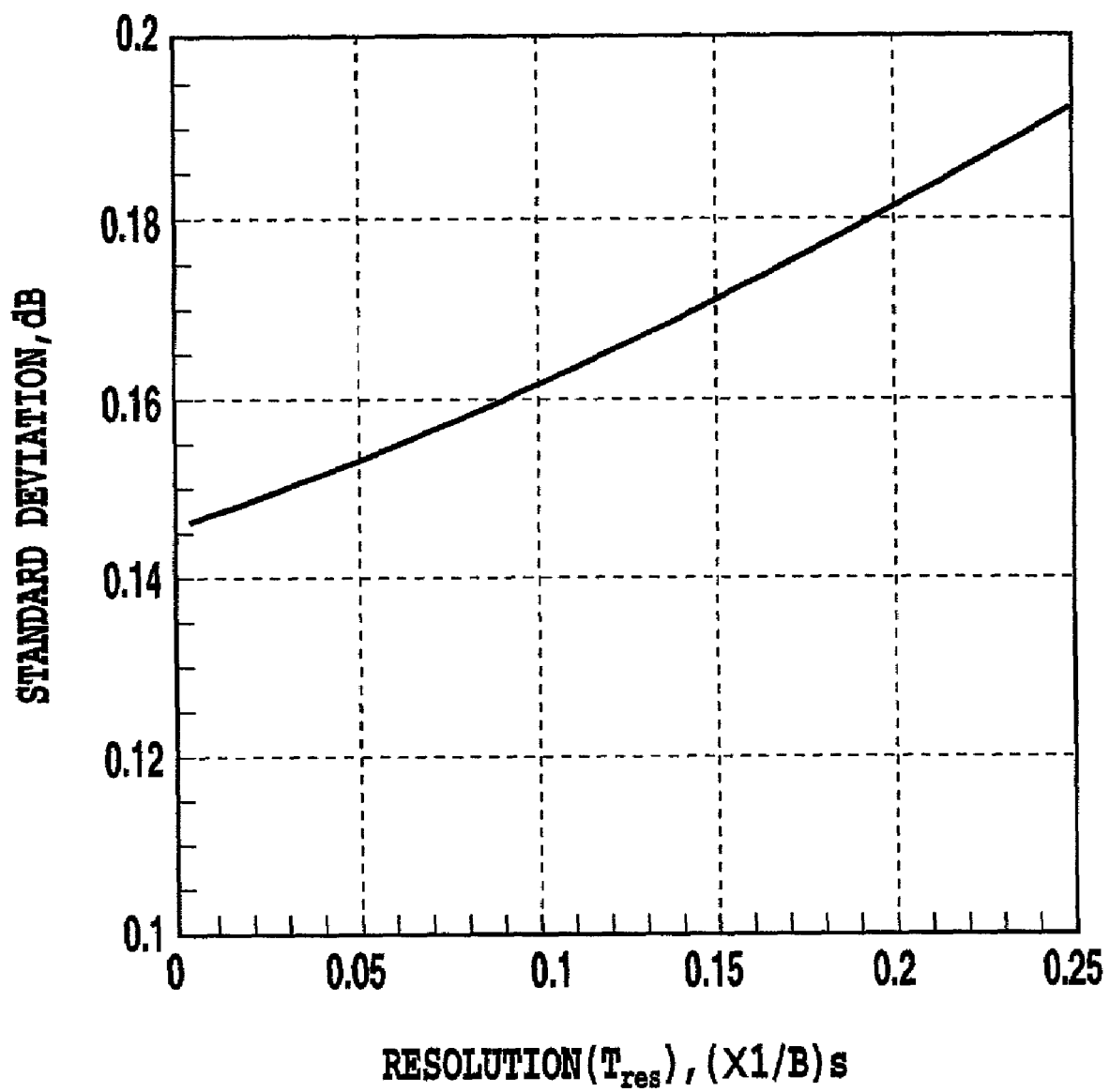
FIG. 53A and 53B are graphs illustrating the standard deviation and the average value for eight repeated evaluation points (vertical axis) depending on the sampling resolution (horizontal axis), respectively of a 21st embodiment in accordance with the present invention.
Figure 53B:
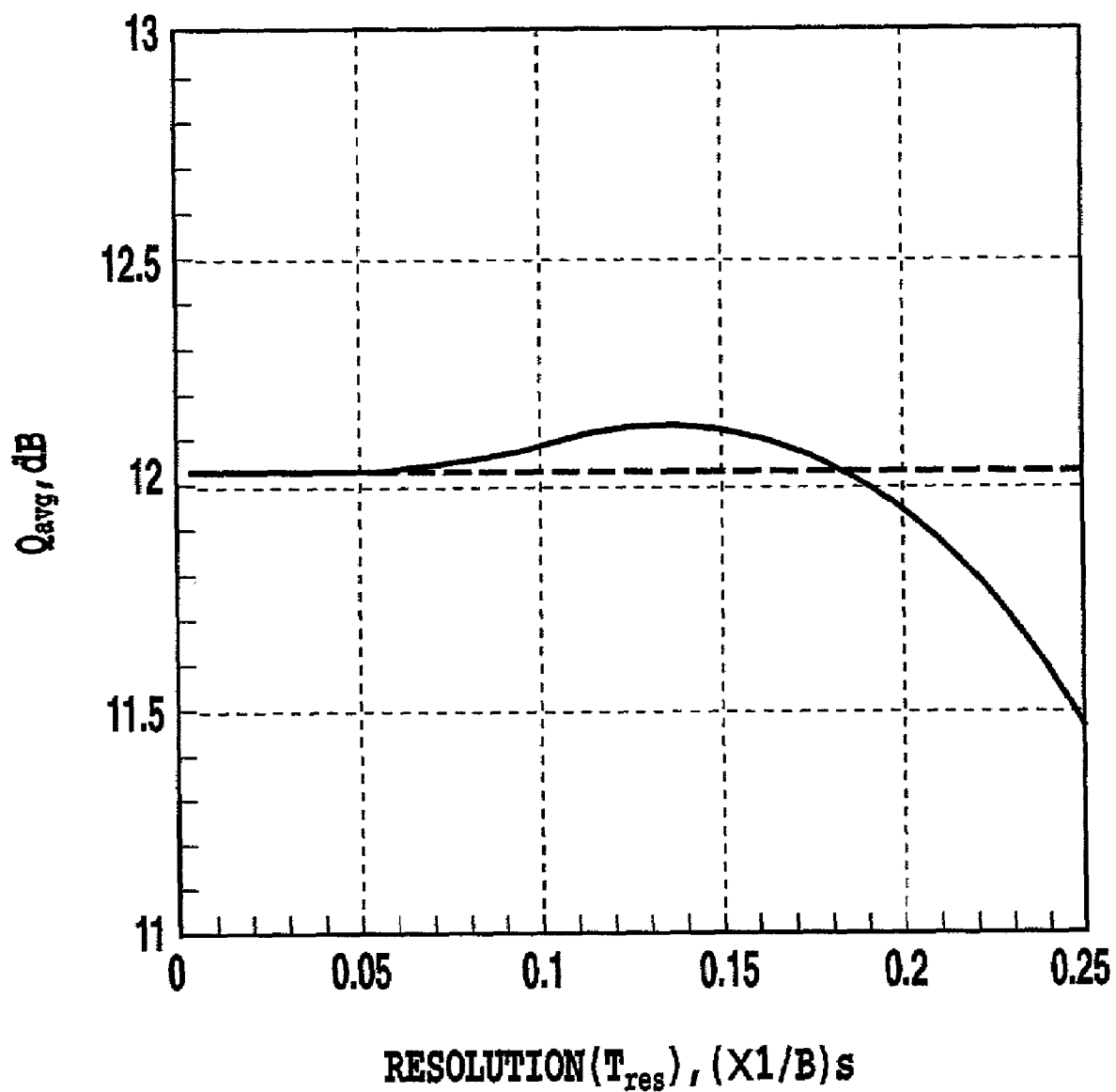

FIGS. 53A and 53B show the graph of the standard deviation and the average value for eight repeated evaluation points (vertical axis) depending on the sampling resolution (horizontal axis), respectively, when the total number of samplings is 16,384 and the other conditions are the same as in FIG. 52. Although the required resolution so that the standard deviation may achieve 0.18 or less is approximately 20 ps as shown in FIG. 53A, when the gap of the average Q factor is considered as shown in FIG. 53B, the required resolution becomes approximately 10 ps or less.

Figure 54A:
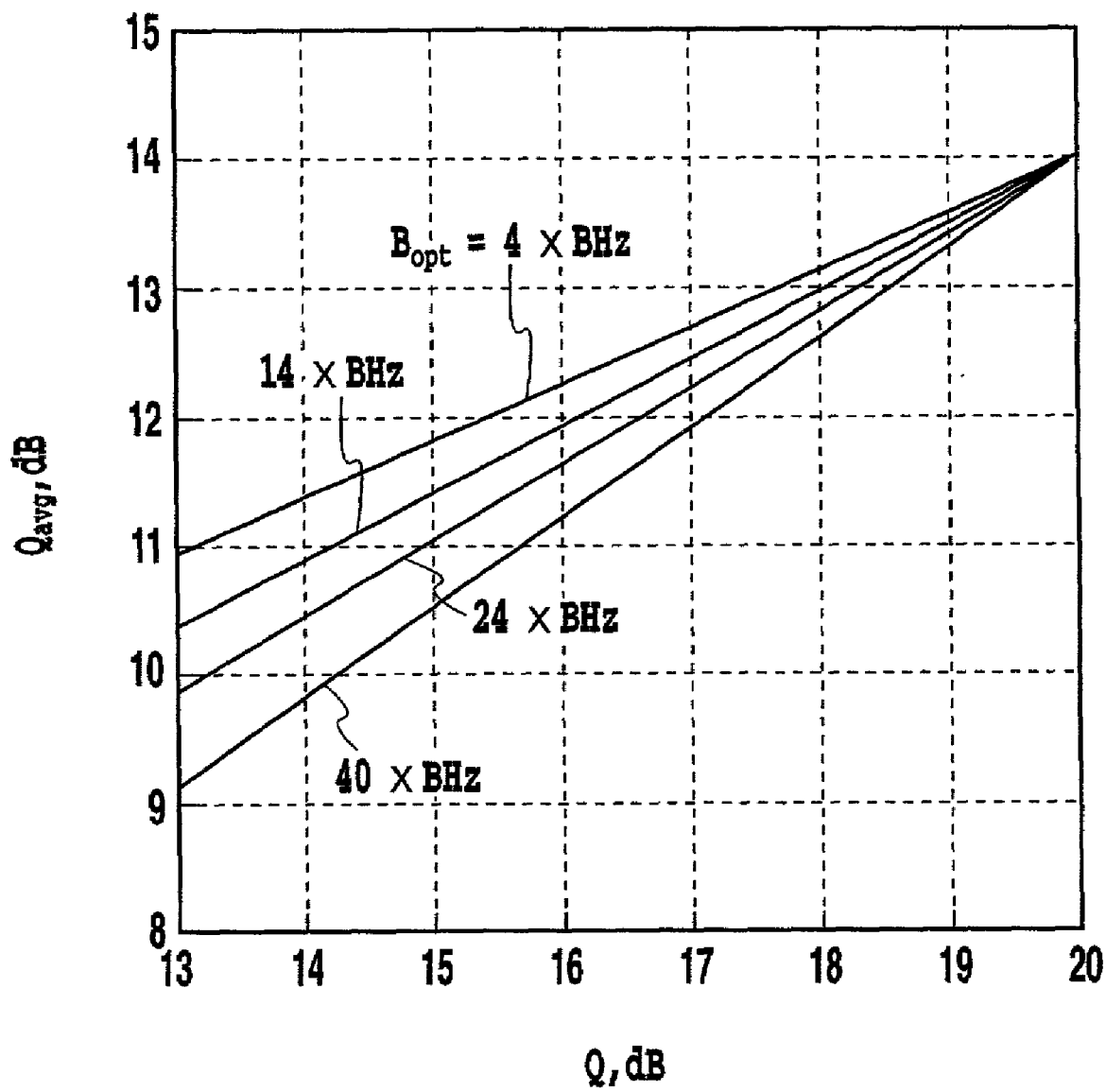
FIG. 54A is a graph illustrating the dependence of the average Q factor on the Q factor of a B bit/s NRZ optical signal of a 21st embodiment in accordance with the present invention.
Figure 54B:
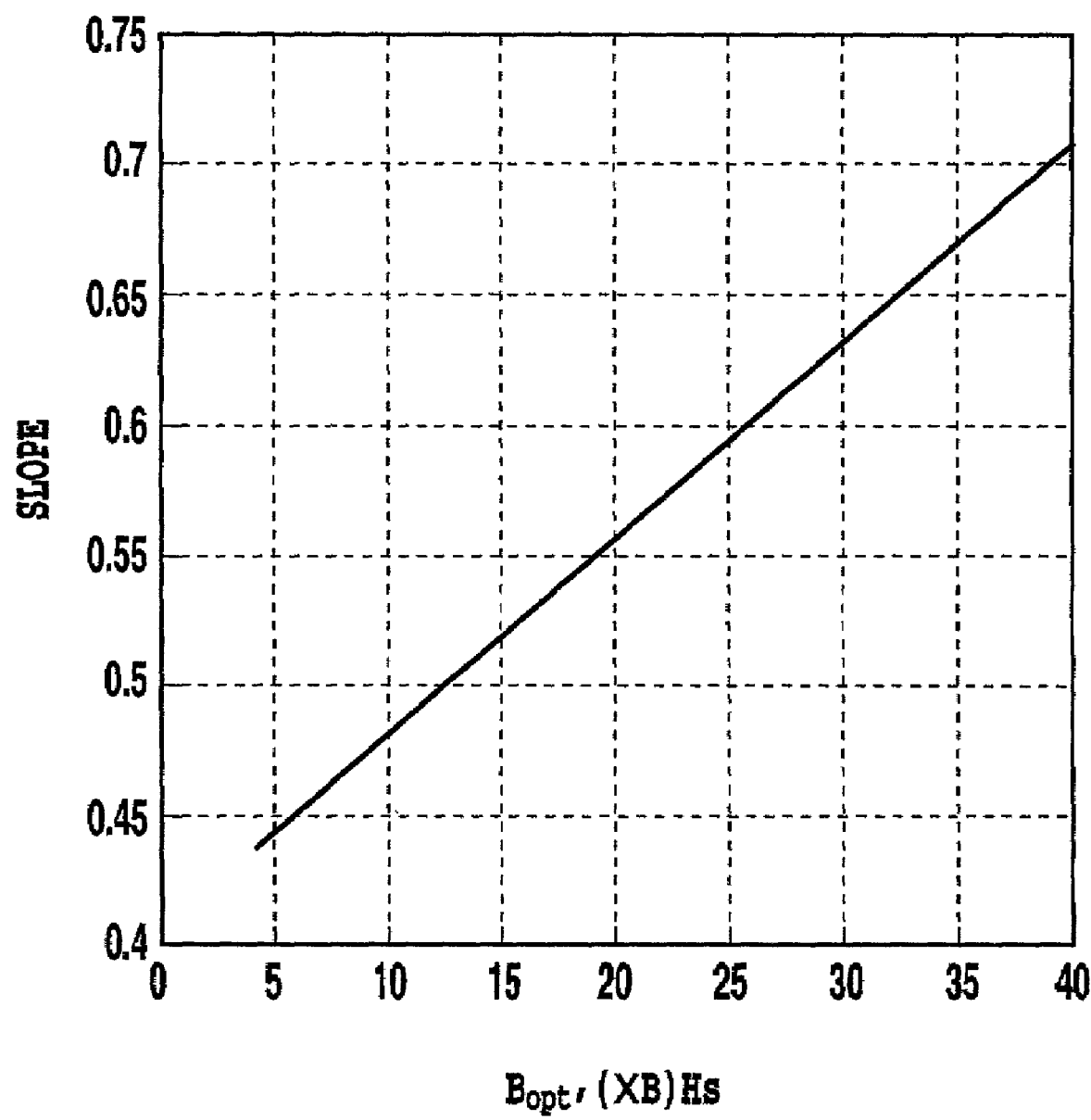
FIG. 54B is a graph illustrating the dependence of the linear fitting slope of the average Q and Q relationship on the optical band-pass filter.

FIG. 54A shows the dependence of the average Q factor on the Q factor of a B bit/s NRZ optical signal when alpha is 0.3, the receiver bandwidth is 0.7×B Hz, the sampling resolution is 1/256×1/B s, the number of samplings is 16,384, and the optical band-pass filter bandwidth is 4×B, 14×B, 24×B, or 40×B Hz. FIG. 54B shows the dependence of the linear fitting slope of the average Q and Q relationship on the optical band-pass filter. The optical band-pass filter bandwidth can be set by referring to the figure.

As shown in the FIG. 54B, linear fitting is possible between the average Q and the Q when Q is up to 20 dB, that is to say, the average Q factor evaluation is sufficiently sensitive to measure a signal with a considerably low BER (about $10^{-24}$).

Other Embodiments

It is obvious that the object of the present invention is also achieved by supplying a system or apparatus with a recording medium that stores the program code of software for implementing the functions of the foregoing embodiments, and by causing a computer (or CPU or MPU) of the system or apparatus to read the program code stored in the storing medium, and to execute it. In this case, the program code itself read from the storing medium implements the functions of the foregoing embodiments, and the storing medium that stores the program code constitutes the present invention. As the storing medium for storing the program code and variable data such as tables, a floppy disk or hard disk can be used, for example.

The present invention has been described in detail with respect to preferred embodiments, and it will now be apparent from the foregoing to those skilled in the art that changes and modifications may be made without departing from the invention in its broader aspect, and it is the intention, therefore, in the appended claims to cover all such changes and modifications as fall within the true spirit of the invention.

What is claimed is:

1. An optical wavelength division multiplexed signal monitoring apparatus comprising:
   optical wavelength division demultiplexing means for carrying out optical wavelength division demultiplexing of an optical wavelength division multiplexed signal including N optical signals with a bit rate $f_0$ (bits/s), which are wavelength multiplexed, where N is an integer greater than one;
   one or N opto-electric conversion means for receiving optical wavelength division demultiplexed signals demultiplexed by said optical wavelength division demultiplexing means, and for converting the optical wavelength division demultiplexed signals into electric intensity modulated signals;
   electric signal processing means for carrying out optical signal quality evaluation based on the electric intensity modulated signals output from said one or N opto-electric conversion means; and
   sampling clock generating means for generating a sampling clock signal whose repetition frequency is $f_1$ (Hz) ($f_1=(n/m)f_0+a$, where n and m are a natural number, and a is an offset frequency), wherein
   said electric signal processing means is a single system, and samples electric intensity modulated signals supplied from said one or N opto-electric conversion means by the sampling clock signal generated by the sampling clock generating means, obtains optical signal intensity distribution from sampled signals generated thereby, and evaluates an optical signal quality parameter based on the optical signal intensity distribution.

2. The optical wavelength division multiplexed signal monitoring apparatus as claimed in claim 1, wherein said electric signal processing means has N inputs, stores N channel electric signals supplied from said one or N opto-electric conversion means by N buffers for a predetermined time period, and processes the electric signals by sequentially reading them from said buffers.

3. The optical wavelength division multiplexed signal monitoring apparatus as claimed in claim 1, wherein said electric signal processing means has N inputs, and processes N channel analog electric signals supplied from said one or N opto-electric conversion means by sequentially reading the analog electric signals by sequentially switching connections with the analog electric signals.

4. The optical wavelength division multiplexed signal monitoring apparatus as claimed in claim 1, further comprising wavelength selection means for selecting and carrying out optical wavelength division demultiplexing of any one of channels of the optical wavelength division multiplexed signal consisting of N optical signals with a bit rate $f_0$ (bits/s), which are wavelength multiplexed, where N is an integer greater than one; and selection wavelength control means for controlling a wavelength to be selected by said optical wavelength selection means, wherein said one or N means is a single opto-electric conversion means, and receives one-channel optical wavelength division demultiplexed signal said optical wavelength selection means selects and demultiplexes, and converts it into one-channel electric intensity modulated signal which is processed by said electric signal processing means.

5. An optical wavelength division multiplexed signal monitoring apparatus comprising:

optical wavelength division demultiplexing means for carrying out optical wavelength division demultiplexing of an optical wavelength division multiplexed signal including N optical signals with a bit rate $f_0$ (bits/s), which are wavelength multiplexed, where N is an integer greater than one;

sampling clock generating means for generating a sampling clock signal whose repetition frequency is $f_1$ (Hz) ($f_1=(n/m)f_0+a$, where n and m are a natural number, and a is an offset frequency);

one or N optical gating means for sampling intensities of the optical wavelength division multiplexed signal or the optical wavelength division demultiplexed signals by using the sampling clock signal generated by said sampling clock generating means;

one or N opto-electric conversion means for receiving optical signals output by said optical gating means, and for converting the optical signals into said electric intensity modulated signals; and electric signal processing means for carrying out optical signal quality evaluation based on the electric intensity modulated signals output from said one or N opto-electric conversion means, wherein said electric signal processing means is a single system, and obtains optical signal intensity distribution from the electric intensity modulated signals output by said one or N opto-electric conversion means, and evaluates an optical signal quality parameter based on the optical signal intensity distribution.

6. The optical wavelength division multiplexed signal monitoring apparatus as claimed in claim 5, wherein said electric signal processing means has N inputs, stores N channel electric signals supplied from said one or N opto-electric conversion means by N buffers for a predetermined time period, and processes the electric signals by sequentially reading them from said buffers.

7. The optical wavelength division multiplexed signal monitoring apparatus as claimed in claim 6, wherein said optical gating means are N pieces, each of which is disposed for one of N channels, for sampling intensities of optical wavelength division demultiplexed signals with a bit rate of $f_0$ (bits/s), which are demultiplexed by said optical wavelength division demultiplexing means, by using the sampling dock signal generated by said sampling clock generating means, and said one or N opto-electric conversion means receive optical signals sampled by said optical gating means disposed for respective channels, and convert the optical signals into said electric intensity modulated signals.

8. The optical wavelength division multiplexed signal monitoring apparatus as claimed in claim 6, wherein said optical gating means is single, and samples N channels of the optical wavelength division multiplexed signal all at once, said optical wavelength division demultiplexing means carries out optical wavelength division of the optical signals sampled by said optical gating means, and said one or N opto-electric conversion means consists of N opto-electric conversion means, and receives N-channel optical signals demultiplexed by said optical wavelength division demultiplexing means, and converts it into said electric intensity modulated signal.

9. The optical wavelength division multiplexed signal monitoring apparatus as claimed in claim 5, wherein said electric signal processing means has N inputs, and processes N channel analog electric signals supplied from said one or N opto-electric conversion means by sequentially reading the analog electric signals by sequentially switching connections with the analog electric signals.

10. The optical wavelength division multiplexed signal monitoring apparatus as claimed in claim 9, wherein said optical gating means are N pieces, each of which is disposed for one of N channels, for sampling intensities of optical wavelength division demultiplexed signals with a bit rate of $f_0$ (bits/s), which are demultiplexed by said optical wavelength division demultiplexing means, by using the sampling clock signal generated by said sampling clock generating means, and said one or N opto-electric conversion means receive optical signals sampled by said optical gating means disposed for respective channels, and convert the optical signals into said electric intensity modulated signals.

11. The optical wavelength division multiplexed signal monitoring apparatus as claimed in claim 9, wherein said optical gating means is single, and samples N channels of the optical wavelength division multiplexed signal all at once, said optical wavelength division demultiplexing means carries out optical wavelength division of the optical signals sampled by said optical gating means, and said one or N opto-electric conversion means consists of N opto-electric conversion means, and receives N-channel optical signals demultiplexed by said optical wavelength division demultiplexing means, and converts it into said electric intensity modulated signal.

12. The optical wavelength division multiplexed signal monitoring apparatus as claimed in claim 5, further comprising:

optical wavelength selection means for selecting and carrying out optical wavelength division demultiplexing of any one of channels of the optical wavelength division multiplexed signal consisting of N optical signals with a bit rate $f_0$ (bits/s), which are wavelength multiplexed, where N is an integer greater than one; and selection wavelength control means for controlling a wavelength to be selected by said optical wavelength selection means, wherein said single optical gating means is single, and samples one optical signal selected by said optical wavelength selection means under the control of said selection wavelength control means, and said one or N opto-electric conversion means is a single opto-electric conversion means, and receives one-channel optical getting signal output by said optical gating means, and converts it into said electric intensity modulated signal.

13. The optical wavelength division multiplexed signal monitoring apparatus as claimed in claim 5, further comprising:
- optical wavelength selection means for selecting and carrying out optical wavelength division demultiplexing of any one of channels of N channel optical signal; and
- selection wavelength control means for controlling a wavelength to be selected by said optical wavelength selection means,
- wherein said optical gating means is single, and samples the optical wavelength division multiplexed signal all at once,
- said optical wavelength selection means carries out optical wavelength selecting of the optical signals sampled by said optical gating means, and
- said one or N opto-electric conversion means is a single opto-electric conversion means, and receives one-channel optical signal selected by said optical wavelength selection means, and converts it into said electric intensity modulated signal.

14. An optical wavelength division multiplexed signal monitoring apparatus comprising:
- optical wavelength division demultiplexing means for carrying out optical wavelength division demultiplexing of an optical wavelength division multiplexed signal including N optical signals with a bit rate $f_0$ (bits/s), which are wavelength multiplexed, where N is an integer greater than one;
- optical sampling pulse train generating means for generating an optical sampling pulse train whose repetition frequency is $f_1$ (Hz) ($f_1=(n/m)f_0+a$, where n and m are a natural number, and a is an offset frequency) and whose pulse width is sufficiently narrower than a time slot of the optical signal with the bit rate $f_0$ (bits/s);
- one or N combination of optical combining means and nonlinear optical media, the optical combining means for combining the optical wavelength division multiplexed signal or the optical wavelength division demultiplexed signal with the optical sampling pulse train, and the nonlinear optical media for inducing nonlinear interaction between the optical sampling pulse train and the optical wavelength division multiplexed signal or the optical wavelength division demultiplexed singal combined by said optical combining means;
- one or N opto-electric conversion means for receiving the cross-correlation optical signals generated by the nonlinear interaction in said nonlinear optical media, and for converting the cross-correlation optical signals into electric intensity modulated signals; and
- electric signal processing means for carrying out optical signal quality evaluation based on the electric intensity modulated signals output from said one or N opto-electric conversion means,
- wherein said electric signal processing means is a single system, and obtains optical signal intensity distribution from the electric intensity modulated signals output by said one or N opto-electric conversion means, and evaluates an optical signal quality parameter based on the optical signal intensity distribution.

15. The optical wavelength division multiplexed signal monitoring apparatus as claimed in claim 14, wherein said electric signal processing means has N inputs, stores N channel electric signals supplied from said one or N opto-electric conversion means by N buffers for a predetermined time period, and processes the electric signals by sequentially reading them from said buffers.

16. The optical wavelength division multiplexed signal monitoring apparatus as claimed in claim 15, further comprising:
- optical sampling pulse train splitting means for splitting said optical sampling pulse train, wherein
- said combination of optical combining means and nonlinear optical media are N set, and combines N-channel optical wavelength division demultiplexed signals with N sequence optical sampling pulse trains splitted by said optical sampling pulse train splitting means to induce cross-correlation for both optical beams,
- said optical splitting means splits cross-correlation optical signals generated by the nonlinear interaction in said nonlinear optical media from the optical wavelength division multiplexed signal and from the optical sampling pulse trains, and
- said one or N opto-electric conversion means consists of N opto-electric conversion means for receiving said cross-correlation optical signal, and for converting it into said electric intensity modulated signal.

17. The optical wavelength division multiplexed signal monitoring apparatus as claimed in claim 16, further comprising polarization control means for controlling a polarization state of all channels of the optical wavelength division multiplexed signal in their entirety, wherein said polarization control means controls the polarization state of all channels such that it maintains a fixed polarization relationship with a polarization state of the optical sampling pulse train said optical sampling pulse train generating means outputs.

18. The optical wavelength division multiplexed signal monitoring apparatus as claimed in claim 16, further comprising optical signal wavelength dispersion control means for controlling wavelength dispersion of the optical wavelength division multiplexed signal to compensate for wavelength dispersion of all channels of the optical wavelength division multiplexed signal in their entirety.

19. The optical wavelength division multiplexed signal monitoring apparatus as claimed in claim 15, wherein
- said combination of optical combining means and nonlinear optical media is single, and combines said optical wavelength division multiplexed signal with said optical sampling pulse train to induce cross-correlation all at once, and
- said optical wavelength division demultiplexing means carries out wavelength division demultiplexing of a cross-correlation optical signal, which is generated by the nonlinear interaction in said nonlinear optical medium, into N channels, and
- said one or N opto-electric conversion means consists of N opto-electric conversion means for receiving N-channel cross-correlation optical signal, and for converting it into N-channel electric intensity modulated signal.

20. The optical wavelength division multiplexed signal monitoring apparatus as claimed in claim 19, further comprising polarization control means for controlling a polarization state of all channels of the optical wavelength division multiplexed signal in their entirety, wherein said polarization control means controls the polarization state of all channels such that it maintains a fixed polarization relationship with a polarization state of the optical sampling pulse train said optical sampling pulse train generating means outputs.

21. The optical wavelength division multiplexed signal monitoring apparatus as claimed in claim 19, further comprising optical signal wavelength dispersion control means for controlling wavelength dispersion of the optical wavelength division multiplexed signal to compensate for wavelength dispersion of all channels of the optical wavelength division multiplexed signal in their entirety.

22. The optical wavelength division multiplexed signal monitoring apparatus as claimed in claim 14, wherein said electric signal processing means has N inputs, and processes N channel analog electric signals supplied from said one or N opto-electric conversion means by sequentially reading the analog electric signals by sequentially switching connections with the analog electric signals.

23. The optical wavelength division multiplexed signal monitoring apparatus as claimed in claim 22, further comprising:
   optical sampling pulse train splitting means for splitting said optical sampling pulse train, wherein
   said combination of optical combining means and nonlinear optical media are N set, and combines N-channel optical wavelength division demultiplexed signals with N sequence optical sampling pulse trains splitted by said optical sampling pulse train splitting means to induce cross-correlation for both optical beams,
   said optical splitting means splits cross-correlation optical signals generated by the nonlinear interaction in said nonlinear optical media from the optical wavelength division multiplexed signal and from the optical sampling pulse trains, and
   said one or N opto-electric conversion means consists of N opto-electric conversion means for receiving said cross-correlation optical signal, and for converting it into said electric intensity modulated signal.

24. The optical wavelength division multiplexed signal monitoring apparatus as claimed in claim 23, further comprising polarization control means for controlling a polarization state of all channels of the optical wavelength division multiplexed signal in their entirety, wherein said polarization control means controls the polarization state of all channels such that it maintains a fixed polarization relationship with a polarization state of the optical sampling pulse train said optical sampling pulse train generating means outputs.

25. The optical wavelength division multiplexed signal monitoring apparatus as claimed in claim 23, further comprising optical signal wavelength dispersion control means for controlling wavelength dispersion of the optical wavelength division multiplexed signal to compensate for wavelength dispersion of all channels of the optical wavelength division multiplexed signal in their entirety.

26. The optical wavelength division multiplexed signal monitoring apparatus as claimed in claim 22, wherein
   said combination of optical combining means and nonlinear optical media is single, and combines said optical wavelength division multiplexed signal with said optical sampling pulse train to induce cross-correlation all at once, and
   said optical wavelength division demultiplexing means carries out wavelength division demultiplexing of a cross-correlation optical signal, which is generated by the nonlinear interaction in said nonlinear optical medium, into N channels, and
   said one or N opto-electric conversion means consists of N opto-electric conversion means for receiving N-channel cross-correlation optical signal, and for converting it into N-channel electric intensity modulated signal.

27. The optical wavelength division multiplexed signal monitoring apparatus as claimed in claim 26, further comprising polarization control means for controlling a polarization state of all channels of the optical wavelength division multiplexed signal in their entirety, wherein said polarization control means controls the polarization state of all channels such that it maintains a fixed polarization relationship with a polarization state of the optical sampling pulse train said optical sampling pulse train generating means outputs.

28. The optical wavelength division multiplexed signal monitoring apparatus as claimed in claim 26, further comprising optical signal wavelength dispersion control means for controlling wavelength dispersion of the optical wavelength division multiplexed signal to compensate for wavelength dispersion of all channels of the optical wavelength division multiplexed signal in their entirety.

29. The optical wavelength division multiplexed signal monitoring apparatus as claimed in claim 14, further comprising:
   optical wavelength selection means for selecting and carrying out optical wavelength division demultiplexing of any one of channels of the optical wavelength division multiplexed signal consisting of N optical signals with a bit rate $f_0$ (bits/s), which are wavelength multiplexed, where N is an integer greater than one;
   selection wavelength control means for controlling a wavelength to be selected by said optical wavelength selection means; and
   single optical splitting means, wherein
   said combination of optical combining means and nonlinear optical media is single, and combines one channel optical signal selected by said optical wavelength selection means with said optical sampling pulse train to induce cross-correlation for both optical beams,
   said optical splitting means splits a cross-correlation optical signal generated by the nonlinear interaction in said nonlinear optical medium form the optical wavelength selected signal and from the optical sampling pulse train, and
   said one or N opto-electric conversion means is a single opto-electric conversion means, and receives said cross-correlation optical signal split by said optical splitting means, and converts it into said electric intensity modulated signal.

30. The optical wavelength division multiplexed signal monitoring apparatus as claimed in claim 29, further comprising polarization control means for controlling a polarization state of all channels of the optical wavelength division multiplexed signal in their entirety, wherein said polarization control means controls the polarization state of all channels such that it maintains a fixed polarization relationship with a polarization state of the optical sampling pulse train said optical sampling pulse train generating means outputs.

31. The optical wavelength division multiplexed signal monitoring apparatus as claimed in claim 29, further comprising optical signal wavelength dispersion control means for controlling wavelength dispersion of the optical wavelength division multiplexed signal to compensate for wavelength dispersion of all channels of the optical wavelength division multiplexed signal in their entirety.

32. The optical wavelength division multiplexed signal monitoring apparatus as claimed in claim 14, further comprising:
   optical wavelength selection means for selecting any one of channels of N-channel optical signals; and selection wavelength control means for controlling a wavelength to be selected by said optical wavelength selection means, wherein said combination of optical combining means and nonlinear optical media is single, and combines said optical wavelength division multiplexed signal with said optical sampling pulse train to induce cross-correlation all at once, said optical wavelength selection means selects any one of channels of N-channel cross-correlation optical signals generated by the nonlinear interaction in said nonlinear optical medium, and said one or N opto-electric conversion means is a single opto-electric conversion means, and receives said cross-correlation optical signal selected by said optical wavelength selection means, and converts it into said electric intensity modulated signal.

33. The optical wavelength division multiplexed signal monitoring apparatus as claimed in claim 32, further comprising polarization control means for controlling a polarization state of all channels of the optical wavelength division multiplexed signal in their entirety, wherein said polarization control means controls the polarization state of all channels such that it maintains a fixed polarization relationship with a polarization state of the optical sampling pulse train said optical sampling pulse train generating means outputs.

34. The optical wavelength division multiplexed signal monitoring apparatus as claimed in claim 32, further comprising optical signal wavelength dispersion control means for controlling wavelength dispersion of the optical wavelength division multiplexed signal to compensate for wavelength dispersion of all channels of the optical wavelength division multiplexed signal in their entirety.

35. The optical wavelength division multiplexed signal monitoring apparatus as claimed in any one of claims 1–4 or 5–34, wherein said electric signal processing means is disposed in an optical signal receive terminal, and comprises:

a signal-to-noise ratio coefficient measuring section for measuring a signal-to-noise ratio coefficient of an optical signal transmitted on an optical signal route between an optical signal transmit terminal of a first optical node and an optical signal receive terminal of a second optical node;

an initial state storing section for storing an initial signal-to-noise ratio coefficient said signal-to-noise ratio coefficient measuring section measures in a state without any failure at a system installation; and an optical signal quality evaluating section for comparing the initial signal-to-noise ratio coefficient stored in said initial state storing section with a signal-to-noise ratio coefficient said signal-to-noise ratio coefficient measuring section measures at every predetermined time interval during system operation, wherein said optical wavelength division multiplexed signal monitoring apparatus carries out analog monitoring independent of an optical signal modulation method, format and bit rate.

36. The optical wavelength division multiplexed signal monitoring apparatus as claimed in any one of claims 1–4 or 5–34, wherein said electric signal processing means is disposed in an optical signal receive terminal, and comprises:

a signal-to-noise ratio coefficient measuring section for measuring a signal-to-noise ratio coefficient of an optical signal transmitted on an optical signal route between an optical signal transmit terminal of a first optical node and an optical signal receive terminal of a second optical node;

an initial state storing section for storing an initial signal-to-noise ratio coefficient said signal-to-noise ratio coefficient measuring section measures in a state without any failure at a system installation; and an optical signal quality evaluating section for comparing the initial signal-to-noise ratio coefficient stored in said initial state storing section with a signal-to-noise ratio coefficient said signal-to-noise ratio coefficient measuring section measures at every predetermined time interval during system operation, wherein said signal-to-noise ratio coefficient measuring section comprises:

optical signal intensity distribution measurement means for measuring intensity distribution of the optical signal by sampling intensity of the electric intensity modulated signal at a clock signal frequency $f_1$ (Hz) ($f_1=(N/M)f_0+a$, where N and M are positive numbers, and a is an offset frequency);

signal-to-noise ratio coefficient evaluation means for evaluating the signal-to-noise ratio coefficient using an amplitude histogram obtained from the optical signal intensity distribution within a mean time, and wherein said signal-to-noise ratio coefficient evaluation means comprises:

histogram evaluation means for obtaining the amplitude histogram from the intensity distribution of the optical signal within the mean time;

distribution function evaluation means for estimating an amplitude histogram distribution function g1 corresponding to "level 1" from an amplitude histogram portion that is greater than a predetermined intensity threshold value A, and for estimating an amplitude histogram distribution function g0 corresponding to "level 0" from an amplitude histogram portion that is smaller than another predetermined intensity threshold value B; and optical signal quality evaluation means for obtaining mean value intensities and standard deviations of the "level 1" and "level 0" from the amplitude histogram distribution functions g1 and g0, and for evaluating the signal-to-noise ratio coefficient that is obtained as a ratio of a difference between the mean value intensities of the "level 1" and "level 0" to a sum of the standard deviations at the "level 1" and "level 0", and wherein said optical wavelength division multiplexed signal monitoring apparatus carries out analog monitoring independent of an optical signal modulation method, format and bit rate.

37. The optical wavelength division multiplexed signal monitoring apparatus as claimed in any one of claims 1–4 or 5–34, wherein said electric signal processing means is disposed in an optical signal receive terminal, and comprises:

a signal-to-noise ratio coefficient measuring section for measuring a signal-to-noise ratio coefficient of an optical signal transmitted on an optical signal route between an optical signal transmit terminal of a first optical node and an optical signal receive terminal of a second optical node;

an initial state storing section for storing an initial signal-to-noise ratio coefficient said signal-to-noise ratio coefficient measuring section measures in a state without any failure at a system installation; and an optical signal quality evaluating section for comparing the initial signal-to-noise ratio coefficient stored in said initial state storing section with a signal-to-noise ratio coefficient said signal-to-noise ratio coefficient measuring section measures at every predetermined time interval during system operation, wherein said signal-to-noise ratio coefficient measuring section comprises:

optical signal intensity distribution measurement means for measuring intensity distribution of the optical signal by sampling intensity of the electric intensity modulated signal at a clock signal frequency $f_1$ (Hz) ($f_1=(N/M)f_0+a$, where N and M are positive numbers, and a is an offset frequency);

signal-to-noise ratio coefficient evaluation means for evaluating the signal-to-noise ratio coefficient using an amplitude histogram obtained from the optical signal intensity distribution within a mean time, and wherein said signal-to-noise ratio coefficient evaluation means comprises:

histogram evaluation means for obtaining the amplitude histogram from the intensity distribution of the optical signal within the mean time;

distribution function evaluation means for estimating an amplitude histogram distribution function g1 corresponding to "level 1" from an amplitude histogram portion that is greater than a predetermined intensity threshold value A, and for estimating an amplitude histogram distribution function g0 corresponding to "level 0" from an amplitude histogram portion that is smaller than another predetermined intensity threshold value B; and optical signal quality evaluation means for obtaining mean value intensities and standard deviations of the "level 1" and "level 0" from the amplitude histogram distribution functions g1 and g0, and for evaluating the signal-to-noise ratio coefficient that is obtained as a ratio of a difference between the mean value intensities of the "level 1" and "level 0" to a sum of the standard deviations at the "level 1" and "level 0", and wherein said distribution function evaluation means obtains two relative maximum values from the amplitude histogram obtained from the intensity distribution of the optical signal to be measured, and makes the relative maximum value with greater amplitude intensity the intensity threshold value A, and the relative maximum value with smaller amplitude intensity the intensity threshold value B, and wherein said optical wavelength division multiplexed signal monitoring apparatus carries out analog monitoring independent of an optical signal modulation method, format and bit rate.

\* \* \* \* \*